(12) United States Patent
Haslem

(10) Patent No.: US 7,703,613 B2
(45) Date of Patent: Apr. 27, 2010

(54) ADJUSTABLE HEIGHT INLET/OUTLET LIQUID LEVEL MANAGEMENT TOOLS AND SYSTEMS

(76) Inventor: Keith R. Haslem, P.O. Box 638, Duchesne, UT (US) 84021

( * ) Notice: Subject to any disclaimer, the term of this patent is extended or adjusted under 35 U.S.C. 154(b) by 67 days.

(21) Appl. No.: 11/884,100

(22) PCT Filed: Feb. 8, 2006

(86) PCT No.: PCT/US2006/004479

§ 371 (c)(1),
(2), (4) Date: Aug. 8, 2007

(87) PCT Pub. No.: WO2007/089246

PCT Pub. Date: Aug. 9, 2007

(65) Prior Publication Data

US 2008/0099414 A1  May 1, 2008

Related U.S. Application Data

(60) Provisional application No. 60/651,239, filed on Feb. 9, 2005, provisional application No. 60/688,462, filed on Jun. 8, 2005, provisional application No. 60/707,698, filed on Aug. 12, 2005, provisional application No. 60/713,627, filed on Sep. 2, 2005.

(51) Int. Cl.
*B01D 17/032* (2006.01)

(52) U.S. Cl. ................ 210/513; 137/577; 137/590; 137/592

(58) Field of Classification Search ............... 210/740, 210/746, 800, 86, 513, 515, 739, 744, 745, 210/112, 114, 115, 525, 540, 776, DIG. 5; 137/577, 590, 592; 166/75.12
See application file for complete search history.

(56) References Cited

U.S. PATENT DOCUMENTS

| 1,660,835 | A | | 2/1928 | Folds | |
|---|---|---|---|---|---|
| 4,867,872 | A | * | 9/1989 | Russell et al. | 210/104 |
| 5,372,711 | A | * | 12/1994 | Sill | 210/122 |
| 5,490,920 | A | * | 2/1996 | Fruchtbaum et al. | 210/112 |
| 5,640,994 | A | | 6/1997 | Jacobsen | |
| 5,824,228 | A | | 10/1998 | Bolomier | |
| 2003/0159986 | A1 | * | 8/2003 | Amado et al. | 210/521 |

FOREIGN PATENT DOCUMENTS

BE          506 659 A        3/1953

(Continued)

OTHER PUBLICATIONS

DE19825045A1—English machine translation obtained from EPO.*

(Continued)

*Primary Examiner*—Matthew O Savage
*Assistant Examiner*—Paul J Durand

(57) ABSTRACT

Apparatus for managing layers of different density includes an enclosed tank for holding the liquids so that they stratify into separate layers of different levels in the tank. A conduit for liquid in the tank is open at an inner end to the tank interior, and is open at an outer end to the tank exterior. A drive moves the inner end of the conduit to different levels within tank so liquid can be transferred into or out of different levels in the tank.

7 Claims, 73 Drawing Sheets

FOREIGN PATENT DOCUMENTS

| | | |
|---|---|---|
| DE | 40 07 599 A1 | 9/1991 |
| DE | 19825045 A1 * | 12/1998 |
| DE | 197 42 594 A1 | 4/1999 |
| DE | 200 08 422 U1 | 7/2000 |
| DE | 199 59 820 A1 | 6/2001 |

OTHER PUBLICATIONS

Engineering Toolbox (water-density-specific-weight), http://www.engineeringtoolbox.com/water-density-specific-weight-d_595.html, Aug. 27, 2009.*

* cited by examiner

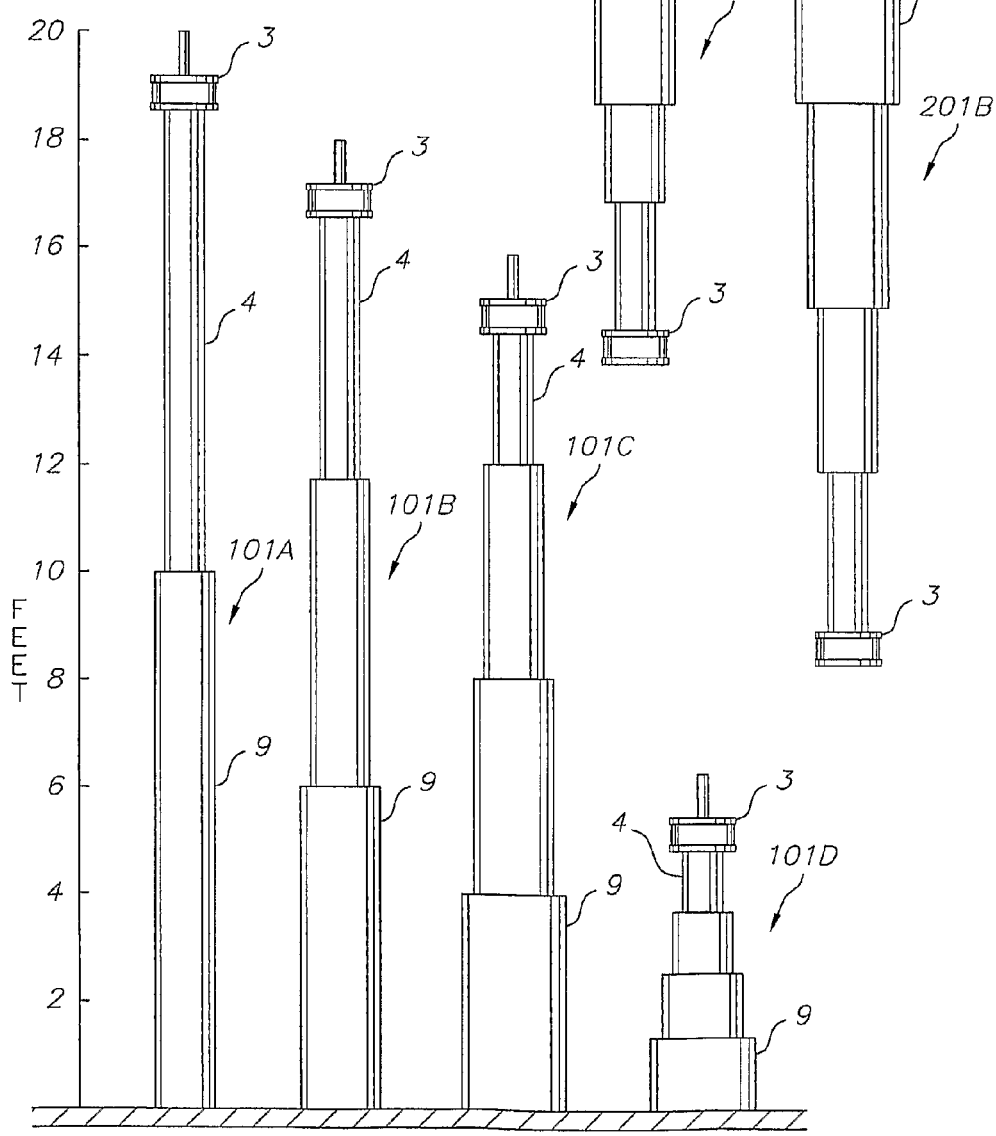

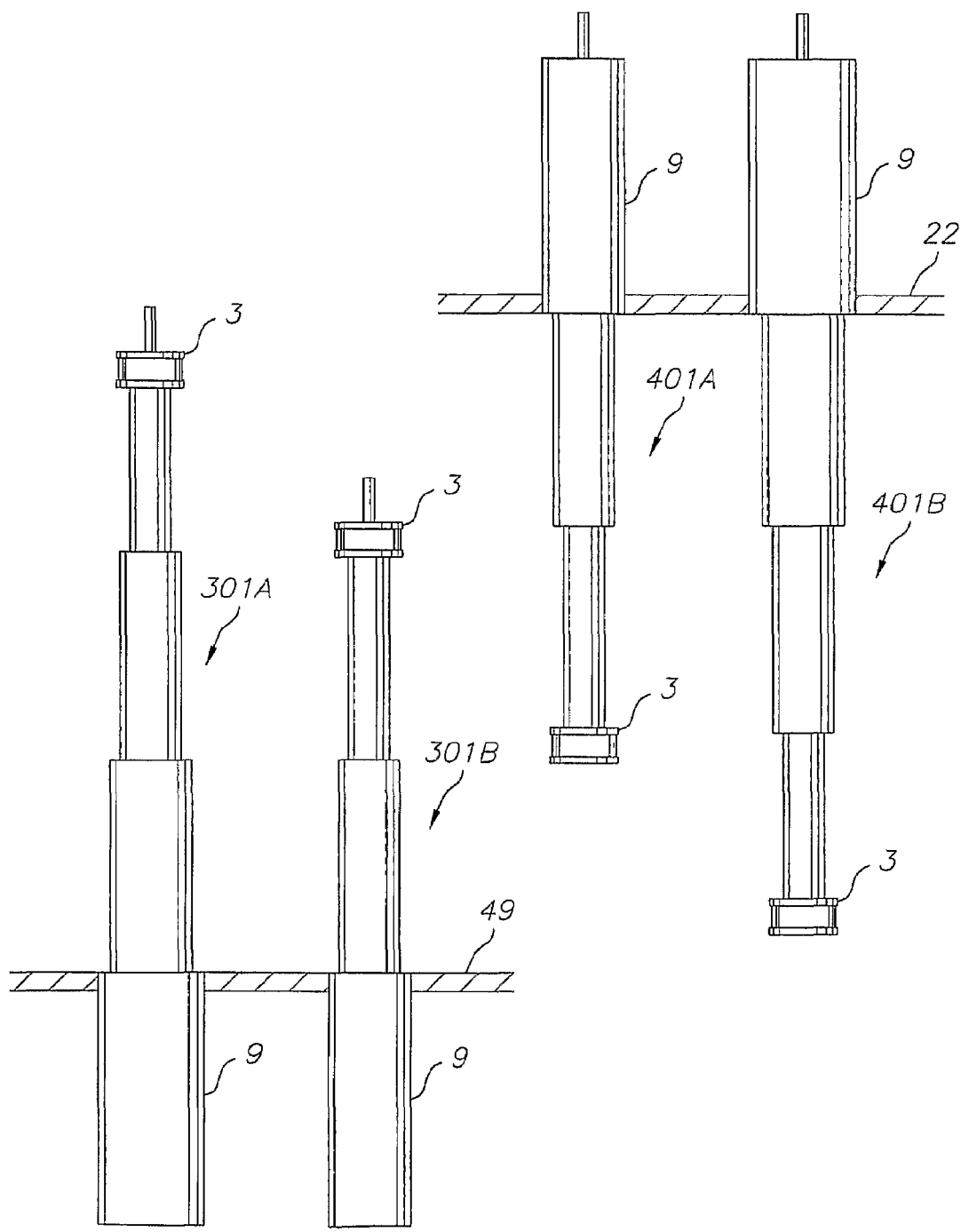

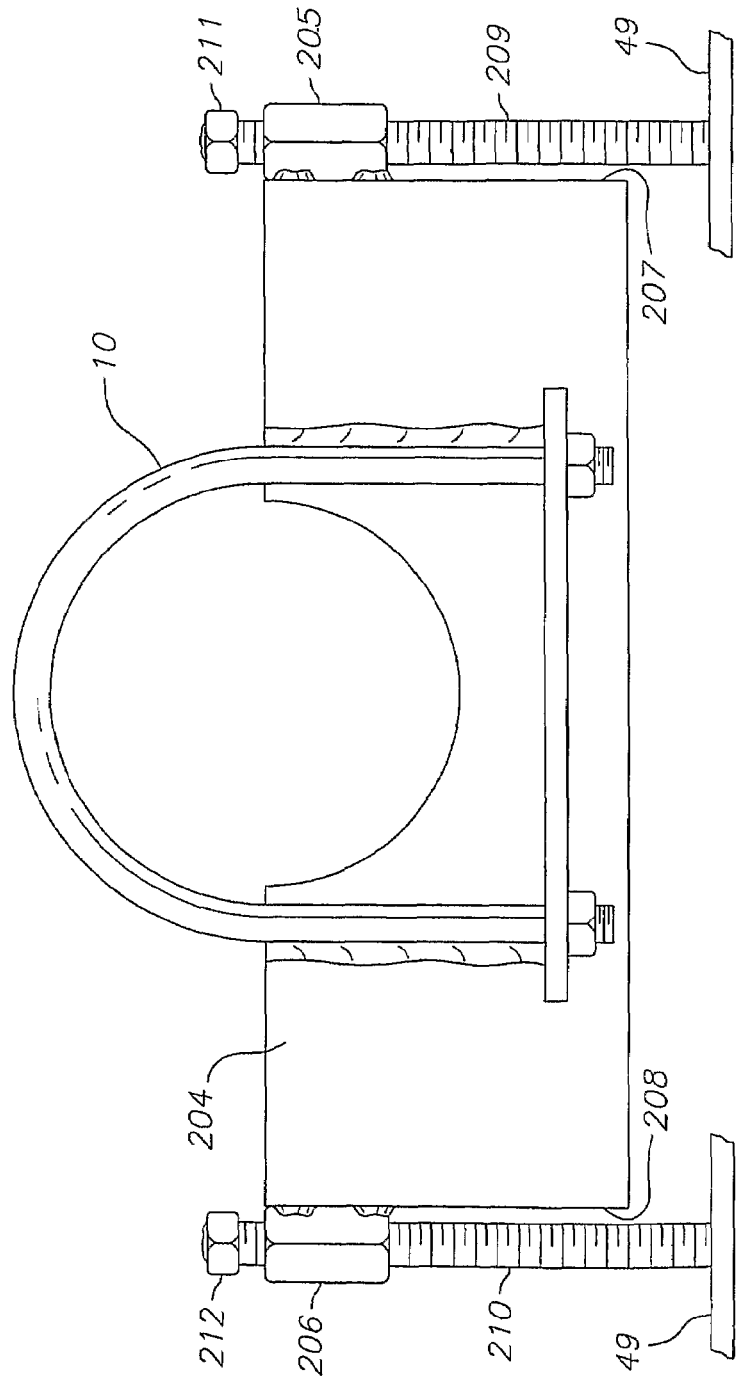
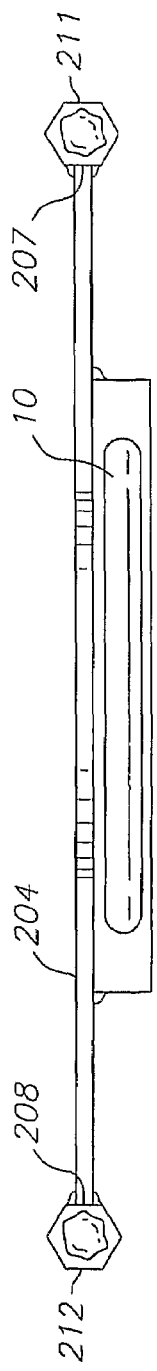
FIG. 26
FIG. 27

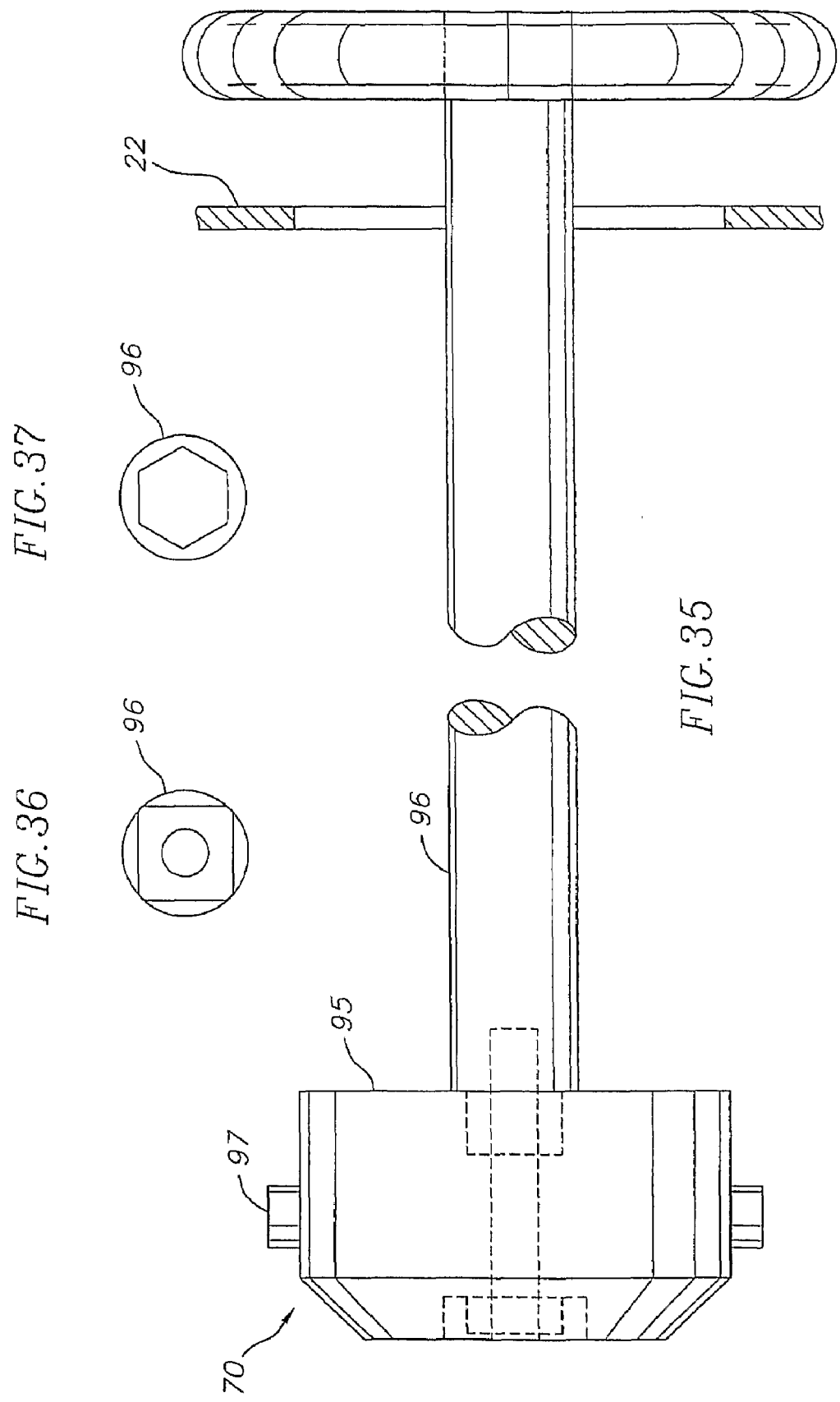

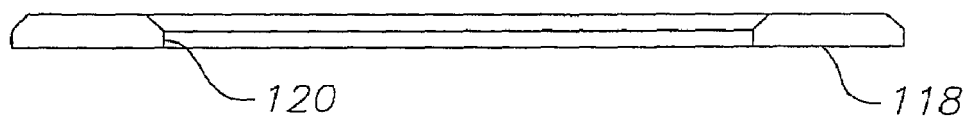
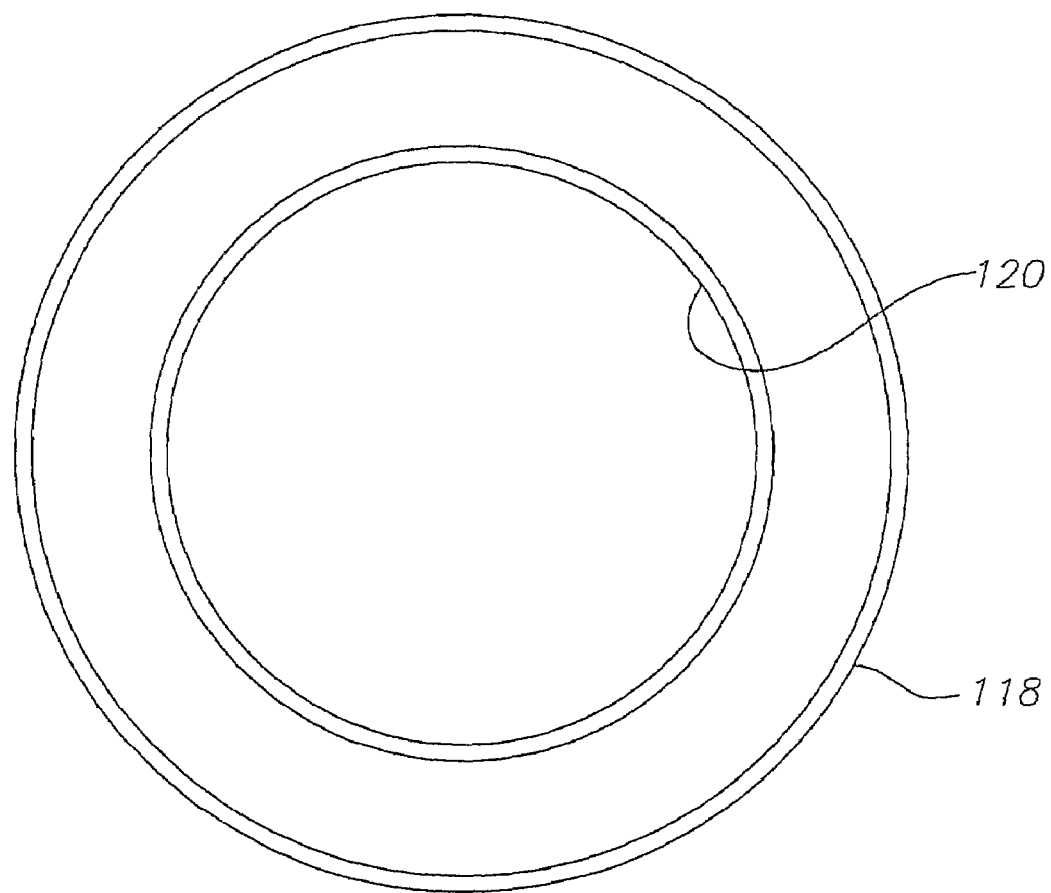

FIG.70

| Levels | | Barrels |
|---|---|---|
| Top | Bottom | |
| Space Above Liquids | | 20 |
| Clean Oil | | 110 |
| Dirty Oil | | 40 |
| Waste Oil | | 20 |
| Water | | 295 |
| BS&W | | 15 |
| Total | | 500 |

358

353

Clean Oil

Quantity
By Levels ____

Quantity Transferred

Temp ____   Raw ____
Sp. Gr. ____   Adjusted ____
Owner ____

307
357

Transfer:
Set Orifice Level ____

Open Valve:
From Tank ____
To Oil Tank Or Trucks ____
Truck ID ____

Site: ____   Tank: ____
Contact Number ____

| Liquid | Operator | Date | Time | Transfer | | Quantity By Level | Temp. | Sp. Gr. | BS&W | Quantity Measured | | Account (Custody Transfer) | | | |
|---|---|---|---|---|---|---|---|---|---|---|---|---|---|---|---|
| | | | | From | To | | | | | Raw | Adjusted | Site | Tank | Owner | Recorded |
| Oil | | | | | | | | | | | | | | | |

FIG. 72

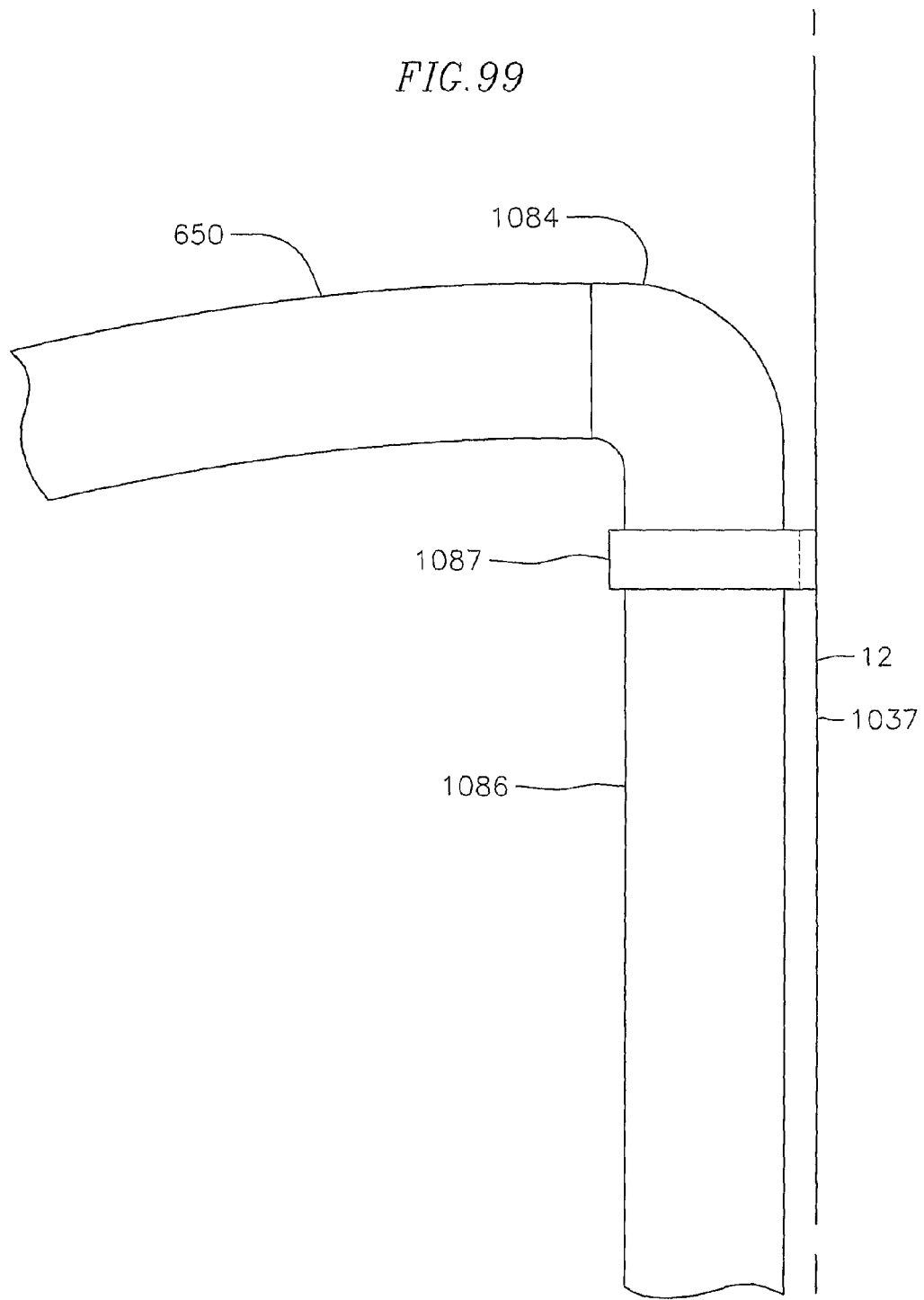

ADJUSTABLE HEIGHT INLET/OUTLET LIQUID LEVEL MANAGEMENT TOOLS AND SYSTEMS

CROSS-REFERENCE TO RELATED APPLICATIONS

This application claims priority to provisional application U.S. Ser. No. 60/713,627 filed Sep. 2, 2005, to provisional application U.S. Ser. No. 60/707,698 filed Aug. 12, 2005, to provisional application U.S. Ser. No. 60/688,462 filed Jun. 8, 2005, and to provisional application U.S. Ser. No. 60/651,239 filed Feb. 9, 2005.

FIELD OF THE INVENTION

This invention relates to the management of stratified liquids in a container, and more particularly, to the management of stratified liquids in potentially explosive environment and/or corrosive and/or poisonous environments by use of variable height inlet/outlet liquid management tools, to the maintenance of the tools and to the automation of the management of stratified liquids.

BACKGROUND OF THE INVENTION

Mixed liquids having differing specific gravities will naturally stratify while standing in a container. This occurs with many liquids in many different disciplines. For example, liquids from gas wells that are separated from the gas and stored in a tank, such as a 400-barrel or 500-barrel tank, stratify. These liquids include hydrocarbons, water and various contaminants. The lightest (lowest specific gravity) liquid is clean oil and condensate and forms as the top layer (oil floats on water). The next layers from top down are dirty oil (a layer of dirty oil, contaminates and water) waste oil, water, and a bottom layer of sediment and water.

The valuable clean oil is presently accessed for removal and sale by first removing the lower levels of liquid through a fixed position outlet near the bottom of the tank. This is a time consuming and expensive process and involves unnecessary vehicular traffic.

The invention will be described in connection with stratified liquids from gas and oil wells. However, the apparatus and methods of liquid management, both manually and by automation, are not limited to these stratified liquids. The apparatus is designed for and is most useful in managing stratified liquids in a closed container where the liquids include potentially explosive gases, corrosive material, and/or poisonous material. The various methods of managing liquids are useful in accessing and removing any selected layer of stratified liquids. Additionally, the apparatus and other methods of managing liquids are useful in adding a material in some form to one or more of the stratified liquids. The material added may be an emulsifier or flocculent or some other material that may aid separation and stratification without mixing or contaminating neighboring layers of liquid, or may serve some other purpose.

In discussing this invention in the context of gas wells, the following definitions are applicable:

"Oil" means all liquid hydrocarbons and particularly that produced from or for the benefit of jurisdictional leases, including condensate and oil from tar sands that is measured as a liquid. See the Onshore Oil and Gas Order No. 4; Measurement of Oil brochure issued by the Bureau of Land Management ("BLM") under 43 CFR 3160, published in the Federal Register/Volume 54, No. 36, Feb. 24, 1989 and effective Aug. 23, 1989.

"Clean Oil" means crude oil or condensate that is clear and can be sold "as is" to refineries or third parties. Some refineries require that there be less than 1% impurities, while others will accept up to 1½% impurities.

"Dirty Oil" also called "Slop Oil" means oil that has economic value but needs more processing; such as application of heat, emulsion breakers, and time to settle out suspended sediments or undesirable liquids. Dirty oil has more impurities than acceptable to the refinery receiving the oil.

"Waste Oil" is lease crude oil that has been determined by the authorized officer to be of such quality that it cannot be treated economically and put in a marketable condition with existing or modified lease facilities or portable equipment and cannot be sold to reclaimers and also has been determined by the authorized officer to have no economic value and for which royalty is not due. See the BLM brochure Onshore Oil and Gas Order No. 4, supra. The liquids and contaminates in this zone have a specific gravity less than water but greater than oil. The liquids in this zone have little value (depending on recoverable hydrocarbons), and are expensive to dispose of properly. In the oil and gas industry this zone of waste oil is often referred to as the interface layer. For purposes of clarity and a more general description the term "interface will mean, in this application, the surface at which two differing fluids, particularly liquids, meet.

"Produced Water" means the water that has been extracted from a well along with hydrocarbons and contaminates. It is mostly water but contains dissolved solids such as chlorides, sulfides, sodium, calcium, carbonates, some gases and oils, along with bacteria. Produced water is governed by regulating agencies and must meet specific criteria to be reused or disposed.

"Pumper" is the operator who visits various oil and gas well locations. He is responsible for managing the well in a profitable and appropriate manner. His job includes scheduling water trucks, oil transports, and maintenance of all equipment.

"Water truck" is a truck which has a tank mounted to it that fills by creating a vacuum for loading, and is unloaded by generating pressure to push water out. Typical water trucks are bobtail trucks and transport trucks. Most bobtail water trucks haul 80-90 barrels (bbls). The larger transport type water trucks haul 120-150 bbls.

"Clean Oil Transport" is a truck with a semi-type tank trailer attached to it. This truck is also called an "Oil Truck" and is specially equipped to haul oil products in a safe manner. This type of truck is required to move oil from well sites, compressor stations and water plants to a refinery or to another site. Generally these trucks haul about 200 bbls of clean oil. Some of these trucks are equipped with a centrifuge to test an oil sample before loading. Alternatively, a pumper or someone responsible for tracking the transfer of oil, will monitor a LACT unit or some other means of measuring the amount of oil and the purity of the oil transferred. If the sample test has a greater percentage of impurities than acceptable, the load is rejected and is not loaded. If the contaminated oil is loaded, it will generally be rejected at the refinery or by the intended party.

"Hot Oil Truck" is a specially designed truck-mounted heating unit which circulates liquids from a tank through a heat exchanger and back into the tank. This process cleans up the oil by aiding separation of oil from the water and causing the suspended sediments to drop to the tank bottom and the clean oil to rise to the top.

"Sludge" means bottom or base sediments and water or BS&W. It has no value but still must be disposed of, which is expensive.

"Heater/Treater Separator" is a vessel which uses heat to separate oil from water. Water is discharged from the bottom of the unit and oil from the upper portion.

"Settling Tank" is a container where water processed through the Heater/Treater Separator is held prior to further processing or disposal, as regulated. Some BS&W settles to the bottom of this tank and is disposed of. Valued hydrocarbons rise to the upper liquid range and should be recovered. Hydrocarbon recovery prevents contaminating disposal wells, evaporation ponds, or reverse osmosis units which receive the water from the tanks.

A plurality of gas wells are typically drilled from one pad. The wells are drilled in different directions and are often terminated under land owned by different people. Consequently, the quantity of oil, which is one of the liquid byproducts of a gas well, must be tracked for each well for proper payment of royalties. The liquid byproducts of each separately owned well are stored in individual storage tanks. There are often many storage tanks on a well pad where there are a plurality of wells and owners. It is not uncommon in some gas fields for there to be six or more 500-barrel storage tanks on a single pad.

The liquids in these storage tanks stratify because of the different specific gravities. The heavier water goes to the bottom of the tank and the lighter oil goes to the top of the liquids in the tank. Over time, BS&W (heavier material such as dirt and sand mixed with water) settles in the bottom of the tank. Most storage tanks used with gas wells have a liquid-removal outlet orifice near the bottom of the tank. The outlet orifice is typically about 16 inches above the tank bottom. As the quantity of oil builds up on top of the liquids in the tank, the quantity reaches the point where it should be removed and sold. Since the outlet orifice is at the bottom of the tank, the liquids below the oil have to be removed first.

When oil has accumulated to the point that it should be recovered, or if the water in the tank is too high, a water truck is called to the site. The water truck travels to the well pad, or wherever the storage tank is located, and removes the lower liquids (primarily water and the dirty oil and waste oil) to access the clean oil. After the water truck completes the removal of the lower liquids, the light valuable oil is at the orifice outlet and may be removed, if an oil truck is on site and available for removal of the oil.

To perform these operations on each storage tank when there is one or more storage tanks at a well site, compressor station or water plant, requires coordination of arrival of water trucks and oil trucks and, more importantly, involves considerable vehicular traffic. Many gas wells are located in remote areas that support wildlife and outdoors people. The vehicular traffic can be very disruptive and can significantly impact serenity and beauty of a pristine area.

Stratified liquids containing valuable light oil also are present at the compressor stations associated with gas wells. The gas from the well is piped to a compressor station for further processing before transportation to a distribution point for distribution to the end users. The separators used at the well sites remove most of the liquids from the gas. Nevertheless, some liquid remains, which contains light oil, water and contaminates, and is carried with the gas to the compressor station. At the compressor station, most of the remaining liquids are removed and placed in storage tanks. These liquids also stratify, with the light oil floating on the other liquids. Proper management of these liquids would also reduce vehicular traffic at the compressor station.

The water removed from storage tanks at gas wells and at compressor stations is presently transported by water truck to a water plant. This produced water is initially placed in produced water tanks for ease of off-loading the trucks, for storing the water and to control the flow through a downstream heater/separator where some of the remaining oil is separated from the other liquids (primarily water).

Stratification takes place in the produced water tanks, and some of the clean oil is recovered after the lower level liquids are removed and sent to the heater/separator. The recovered clean oil is stored in an oil sale storage tank.

The clean oil at the output of the separator is also directed to an oil sale storage tank. The balance of the produced water at the output of the heater/separator is placed in settling tanks before transfer to an evaporation pond or to some water purification unit, such as a reverse osmosis unit. This water also contains some hydrocarbons that float on top of the water in the settling tanks and which is unwanted in the ponds and/or water purification units. Some of the clean oil is recovered and stored in an oil sale tank after the lower level liquids have been removed from a settling tank.

The amount of oil, dirty oil, and water in a produced water tank or a settling tank is not generally accurately calculated. A common method for determining the quantity requires an operator to ascend stairs to the top of a tank, open a hatch, and use one of the manual methods of roughly calculating the top surface level and bottom surface level of clean oil in a tank. A safer and more accurate and efficient way of measuring quantities is desired and a more efficient and accurate way of accessing and removing selected levels of liquids is desired.

SUMMARY OF THE INVENTION

Because conditions or opportunities for processing or disposing of liquids depend on various external factors such as availability of transportation trucks, disposal space, maintenance delays and changing demand or price, it is desirable to have flexibility in monitoring and removing specific liquids according to best management procedures.

Thus, it is an object of the present invention to manage the liquids at gas wells compressor stations and water plants and at other containers of stratified liquids to reduce vehicular traffic and to improve the efficiency and safety of operation. By managing the liquids, fuller loads may be transferred to reduce vehicular traffic.

It is the primary object of the present invention to provide an improved method of filling and emptying storage or process tanks containing stratified liquids in a technically simple and economical manner. For this purpose a variable height inlet/outlet liquid management tool is provided. An orifice, that serves as the inlet or the outlet, is movable in a container of stratified liquids to a selected height or position for accessing and removing a selected liquid or for adding material to a selected liquid through a conduit connected at an inner end to the orifice in the tank, and connected at an outer end to the tank exterior.

A particular and significant advantage of managing liquids by the tools and system of this invention is where the liquids are in a highly flammable or explosive environment. The tools provide a safe means of choosing which liquid to add to or extract in this type of environment. The tools do not generate static or sparks and are grounded for any transient static charge that may originate from an operator's clothing. Also the tools or apparatus attached to a container or tank maintain a seal that prevents fluids, which may be explosive or poisonous, from escaping into the atmosphere.

Tool

The adjustable height or variable height inlet/outlet tools (hereinafter, "variable height tools") are configured to provide access to all of the liquids inside a container or to provide access to only selected levels inside a container. For full access inside the container, a variable height inlet/outlet tool is attached to the outside of the container at the top or the bottom. The inlet/outlet tool is movable from the top toward the bottom or from the bottom toward the top. The levels covered depend on the length of the pieces of the tool and the number of stages of the tool.

For many applications it is not practicable to have the tool mounted externally. Thus, the tool is mounted at a selected position inside the container; for example, either at the bottom or at the top. Again, the coverage of the various levels inside the container is determined by the length of the component parts and the number of stages of parts. For example, a single-stage tool mounted with a standpipe at the bottom of the tank, or container, may cover most of the upper half of the container, if the standpipe has a length of approximately ½ the height of the container. The inlet/outlet orifice is carried by a single tube that telescopes from inside the standpipe to selectively access various levels in the upper half of the tank. The coverage of the various layers is greater if two or more different tools are used in the container.

All variable height inlet/outlet tools of this invention having a standpipe have a seal assembly at the point where the telescoping tube moves in and out of the standpipe or where a telescoping tube telescopes with respect to the tube that houses it. This seal assembly prevents undesired liquids from flowing into the standpipe or other tubes and out the bottom of the standpipe outlet of the container. This unwanted liquid can contaminate the liquid selected for removal by the position of the tool.

The terms pipe and tube are used interchangeably in this application. In some cases the outside diameter is needed and is commonly provided by tubing. In other instances, the inside diameter is important and is commonly provided by pipe.

In an alternate embodiment, the standpipe is omitted, and a movable collection tube carrying the orifice on its lower end enters the tank from the top, and is moved up or down from outside the tank to set the orifice at the desired level in the tank.

In another embodiment, a flexible hose is connected at an inner end to the orifice in the tank, and at an outer end to the tank exterior. The orifice and inner end of the hose are moved up and down to a desired level in the tank by an external drive.

In one form of this invention, a single-stage variable height inlet/outlet tool for accessing a selected liquid at a known level in a container, such as a tank, and having a standpipe includes: 1) a lower standpipe; 2) a telescoping tube or pipe which carries the inlet/outlet orifice and which moves vertically inside the standpipe; 3) a seal, in a seal assembly, between the standpipe and telescoping tube, with the seal assembly being removable for inspection and maintenance; and 4) an adjustment rod that extends from near the top of the telescoping pipe, where the inlet/outlet orifice is located, through the top of the tank to provide the variable height adjustment of the inlet/outlet orifice. The rod has measurement marks for indicating position of the orifice in the container to a person outside the container for manual operation. The apparatus preferably includes a gauge and locking mechanism on the outside of the tank through which the adjustment and measurement rod extends above the top of the tank. There is also a coupling between the adjusting and measurement rod near the top of the telescoping pipe where the inlet/outlet orifice is located.

The gauge and locking assembly is removably attached to a mounting block attached to the top of the tank. The inside diameter of the mounting block is large enough to permit the removal of the seal assembly and telescoping tube and associated parts through the top of the tank by way of the mounting block. For use in a highly flammable or explosive environment, critical elements of the apparatus are made of brass or other non-sparking material such as aluminum, bronze, nickel or composites, including plastics with or without carbon fibers, to prevent the creation of sparks that may ignite gases inside the tank. In all cases where one part of the tool may strike or otherwise come in contact with another part, only one of the parts is made of ferrous material. Additionally, the seal assemblies in the gauge and locking assembly and in the seal assembly are grounded to the body of the assembly to prevent the build-up of static electricity.

As noted, when it is necessary to access only the upper half of a tank, a single-stage system of one standpipe and one telescoping tube will suffice, if the standpipe has a height of approximately one-half the height of the tank and the telescoping tube that carries the inlet/outlet orifice has a length of approximately one-half of the height of the tank. To access liquid near the bottom of the tank, the standpipe is as short as practicable for the material and use. For example, in oil tanks associated with gas wells, a standpipe of 14 inches in height is usable with 3 telescoping tubes to provide a three-stage apparatus that will access the area from 18 inches above the bottom up to approximately 6 feet above the bottom.

The single-stage and multi-stage tools provide precise control over the position of the inlet/outlet orifice in a system that is secure and easily operated from outside the tank. The position or height of the inlet/outlet orifice is adjusted either manually or automatically, as desired.

The variable height tool used in flammable or explosive environments has a standpipe made of steel (schedule 40 pipe) and telescoping pipe made of stainless steel. To reduce the weight of the tool, the telescoping tube may be made from aluminum or titanium or some other rigid tubular material. In any case, the material of the components of the apparatus are selected to avoid undue or premature wear or damage from corrosion or bio-corrosion and provide a device with a long service life. Further, for some environments, the material is selected to not cause sparks. For this purpose, brass is used in the areas where a movable component might engage the steel body of a container or steel components in the tool.

Screens, check valves, flow directors, vortex preventers, flow limiting orifices or other useful devices are included for use in or with the tool. The flow directors include directional jets for introducing chemicals or other fluids into the liquid levels. Further, the carrier for the inlet/outlet orifice carries a liquid level sensor to sense the transition between liquids, such as the transition between water and oil.

To retrofit existing containers, the tool or apparatus is mounted in a stable yet adjustable manner within a container (tank) without welding or bolting to tank sides. In original equipment installation with containers of various sizes and configurations the apparatus may be attached to the body of the container.

A particular feature of the tool is that critical components may be easily removed and serviced outside the tank. This saves time and expense because a container with flammable or explosive material does not have to be cleaned and entered for servicing the tool.

Automation Using a Variable Height Tool

The system may be partially or fully automated, and/or may include devices for aiding in the operation of the tool. One device to assist in the raising and lowering of the orifice on the top of a telescoping tube of a tool is a gear box with a crank mounted on top of the container. The adjustment rod has indentations and performs like a rack in a rack and pinion gearing mechanism. The indentations are on opposite sides of the rod and are engaged by gears to apply equal pressure to each side to avoid lateral movement of the rod in operation. Lateral movement of the rod may cause leaks at the seals.

A particularly efficient and useful device for adjusting the height of an inlet/outlet orifice either manually or by automation is a unique rack and pinion gear type arrangement. The round adjusting rod has Woodruff-type slots, or crescent shaped slots, cut into opposite sides of the rod at a depth and spacing to provide positive movement of the rod by gears with Woodruff-type crescent tabs which engage the slots in the rod.

The adjusting rod rack of either design is moved manually by a crank through a gear box. The crank associated with the gear box is replaced with a motor for automation of the height adjustment of the orifice carried by the tool. For automation of the adjustment of the height of the orifice at the site of the container, a sensor/recorder/transmitter/receiver device is attached to the gear box to sense the position of the orifice inside the container. This information is recorded and may be accessed by an operator, without climbing to the top of the container, with a hand held device that communicates with the device attached to the gear box. Infrared signals are commonly used for this communication. For use in a hazardous environment, the motor is an explosion proof motor and the sensor/recorder device is also approved for use in such an environment.

Further automation is accomplished by locating a liquid level sensor at the container. The presently used magnetic floats that sense levels and send the information to a device outside the container are useful. However, a more accurate measurement of levels is provided by using a guided wave radar level and interface transmitter, such as the Model 3300 device available from Rosemount, a subsidiary of Emerson Electric. The guided wave radar level and interface transmitter is accurate within two tenths of an inch according to a Rosemount brochure. This data is stored and is available for reading and use, either at the tank site or remote from the site. An alternative instrument for sensing the liquid levels and recording, transmitting or having available to be accessed, is a sonar-based device of CTI Manufacturing, Inc., called an Accu-gage Sonar Level and Interface Measurement Instrument, Sensor Model P1 (See www.accugage.com). Other radar and sonar based instruments may be used for sensing the levels of stratified liquids. Further, other methods of sensing the levels may be used. For example, ultrasound, infrared, magnetostrictive, and displacement based devices may be used. Various electrical, chemical and physical properties form the basis for the measurement. These properties include, without limitation; specific gravity, density, dielectric constant, Ph and temperature.

In some instances the detection may be made more accurate by using triangulation techniques with multiple sources. Also, the detection may be made more accurate by varying one or more parameters of the measuring signal, such as, for example, frequency, pulse length, pulse width, and modulation.

The management of stratified liquids may be automated for on-site control or off-site control. The position of the orifice in a container is attainable, for example, by monitoring the position of the adjusting rod by use of readable marks indicia on the rod or by recording the movement or position of the gears or transmission which moves the rod. Alternatively, the position of the orifice may be determined by some type of sensing instrument, such as a sonar-based instrument. This position information is stored at the site of the container. Additionally, a level or levels of one or more of the stratified liquids in the container is sensed and stored. The sensor generates a signal to indicate the location of each selected level.

The level information and the position information may be accessed by use of a man machine interface having at least a readout; and preferably a display of the information and a memory for recording the data. A pumper or operator may access the information from an interface mounted in a truck, mounted on the container, mounted in an instrument box or one that is hand held.

The operation of the variable height inlet/outlet tool in a container and the management of the liquids may be fully automated and controlled at a central station using the SCADA (Supervisory Control and Data Acquisition) approach. For off-site management of liquids in containers at a plurality of sites, including well sites, compressor stations and water plants, there is provided a remote terminal unit at each site having one or more containers. Each container has a level sensor and a motor controlling the height of the orifice in the container. At the output, there is at least one automated valve between the outlet of the container and a storage container and/or a transport vehicle.

Most state and federal agencies with control over oil and gas production require that the liquids, which are recovered and sold, particularly the sellable oil, be tracked. For this purpose, lease automatic custody transfer (LACT) units provide oil measurement by a positive displacement metering system for purposes of oil sales. A positive displacement meter registers the volume passing through the meter. Where the oil transfer is under the auspices of the Bureau of Land Management (BLM), the unit must satisfy the BLM regulations set forth at 43 CFR 3162.7-5 and Onshore Oil and Gas Order No. 3.

As a substitute for a LACT unit, the accurate measurement of the levels of the oil in a container to determine the quantity of oil transferred from a container to a sales tank or truck is also represented to be acceptable to BLM and many other agencies involved with custody transfer of oil. For example, ABB Ltd., of Zurich, Switzerland (www.abb.com/totalflow) has a digital level sensor sold under the brand name Level Master that is used with a standard resistance temperature detector (RTD), which measures the temperature of the fluid at the load line, for custody transfer. One of the important benefits of the Level Master intelligent digital level sensor is that it "Meets or exceeds requirements for Federal Land (BLM)" Product Overview data sheet for Level Master sensors, Rev AB. Further, "local access to the Level Master data is provided using Totalflow's Master ling software (Windows based) or through a locally mounted flow computer or RTU. A flow computer or RTU can be used to support stand-alone (local) operation or remote operation via interface to communications networks." This Totalflow device is CSA and UL certified for use in Division 1 Group D hazardous environments.

In place of a precision liquid level sensor, other devices may be used including a temperature sensor, a positive displacement meter and a specific gravity sensor, like a densitometer. These devices may be individual devices or their collected data or information may be available instead by use of a LACT unit or a precision level detector. The output of each instrument which includes information as to temperature and quantity, is sent to the remote terminal unit for transmission to the master terminal unit to be recorded as part of an event log. The remote terminal unit includes a module for processing the data that is transmitted between the remote terminal unit and a master terminal unit at the remote supervisory or control station. The control station includes, as part of the master terminal unit (MTU), a display for viewing the parameters of each container, including the position of the orifice and the levels of the liquids. Other parameters associated with a container, such as internal and/or external temperature and pressure may be detected, recorded and transmitted. The MTU also includes a keyboard for an operator to use in accessing a selected container from a plurality of containers to view the parameters and to store the parameters. A server is included to provide an event log either short term or long term as an archive log or both, each time a container is accessed or interrogated and each time liquid is moved into or out of a container. The log records all parameters sensed at the container and the quantity of any liquid removed or added. An event log may also be stored in the man machine interface at the site.

Method of Using Variable Height Inlet/Outlet Orifice

With a variable height orifice in a tank associated with gas production from a gas well, it is possible to significantly improve the operation at the well, at the compressor station and at the water plant and also to significantly reduce the vehicular traffic around the gas well, compressor station and water plant. With automation employing one or more of the following: precision liquid level sensor, temperature detector, specific gravity detector, and BS &W sensors; in combination with the variable height orifice, it is possible to transfer a known amount of liquid, such as clean oil, from a remote location and to provide an accurate event log for management of the liquids at the remote location.

Well Site

The reduction of vehicular traffic and the elimination of the need to rely on the concurrent availability of a water truck and an oil truck by controlling the size and timing of the loads of water and contaminate in a water truck and by controlling the size and timing of the loads of salable light oil are an object of and a result of managing the liquids at the container site, in accordance with the present invention.

Improvements in liquid management are realized by manual operation and manipulation of the liquids. Greater improvements are realized by automatic operation and manipulation of the liquids. These improvements result from the use of a variable height orifice that is positionable at the desired level inside a container.

At a gas well, a pumper or operator can call for an oil truck when there is sufficient light oil in one or a plurality of storage tanks to fill an oil truck. This is accomplished without involving a water truck to remove the lower level liquids. The operator ascertains the quantity of oil in a tank and determines the lower level at which the adjustable height outlet should be placed to remove the light oil only. The operator determines the level of the top surface of the light oil and the level where the light oil meets the dirty oil or waste oil. This determination is made by using one of the presently used devices or one of the more precise devices employing sonar or radar or other devices that detect electrical, chemical and/or physical properties or other properties of the liquid to derive the level information. An example of a presently used device is a tape, coated with a material called Kolor Kut that is responsive to various liquids, such as water and oil. The tape has a brass weight at the lower end that is lowered into the container and stretches the tape from the top of the container to the bottom. The operator must climb to the top of the container to insert the weight and tape. The brass weight is lowered until it touches the bottom and the liquids color the material on the tape. The Kolor Kut on the tape changes color to indicate the type of liquid at each level. For example, the color on the tape becomes pink in water and remains yellow in oil. The tape has measurement marks so that upon removal the operator can determine the upper and lower levels of the light oil and, thus, the quantity of oil available for removal and sale. For example, a measurement of 10 inches of oil in a 20 foot high, 500-barrel storage tank represents 20.83 barrels of oil or approximately $800.00 of oil at $40.00 a barrel. An operator can determine the amount of oil present in a number of tanks to be combined to provide a full load of clean light oil for an oil truck. By use of the variable height inlet/outlet tool, the oil is pulled off from the top of the other liquids without removal of the lower level liquids first.

Another presently used device is a clear cylindrical trap with a triggered bottom plate, known as a "Thief" in the gas industry. The trap is carried by a rope, with indications on the rope of the depth of the bottom of the trap in the liquids. At a desired depth the bottom lid is triggered to close the cylinder. The captured liquids are viewed upon removal of the trap from the tank and the level of various liquids determined.

Other devices for measuring the level of the oil in a tank include magnetic sensors that are associated with floats attached to a rod or string that extends down into the liquids. Each float is sensitive to a different specific gravity and the level of the float on a particular liquid is sensed. A signal from each float is carried to a recorder and display at a control station to indicate the level of the float and, thus, the liquids inside the tank. The liquids in the tank may be managed based on this information.

As noted above, there are available more accurate instruments for determining the levels of stratified liquids.

As a means of further reducing traffic at each well site, the information of liquid levels is sent by wireless transmission to a central control station. An operator at the central control station monitors the liquid levels in the storage tanks at a plurality of well sites and compressor stations and water plants. Based on this information, the operator at the central control station adjusts the height of the adjustable height orifice automatically in each individual storage tank by signals sent over the wireless transmission system. Further, the operator transfers the oil from each selected storage tank to either an oil sale tank at the site or an oil truck that is called in for removal of the oil. If an oil sale tank is located at the container site, the ability to remove only clean light oil from the oil sale tank is possible by the use of a variable height orifice in the oil sale tank. Presently, with the use of a fixed height outlet in the oil sale tank, the height of the BS&W in the bottom of the tank may interfere with the removal of the light oil and may also contaminate the light oil so that it will not be acceptable at the refinery.

Further, by selectively removing the oil at the top of the liquid in the storage tanks, the local pumper or operator or the operator at the central control station is now able to determine the need for a water truck based on the liquid level information that is available on site or that is transmitted to the central control station. Thus, the operator will call in a water truck based only upon the need to remove water rather than upon the need to remove water to access the floating oil on top of the water.

Additionally, rather than transmitting the information of liquid levels in a tank to a central control station, an operator may efficiently and rapidly read and record on a portable processor with memory the information available at each tank. The reading of the levels inside the tank is stored in a readable memory on top of the tank or near the tank which is accessed remotely from the ground by an infrared transmitter-receiver as part of the portable processor with memory. This eliminates the necessity of climbing up a ladder or stairs to the top of each tank to determine the liquid level.

Compressor Station

Often, there is a pumper or an operator onsite at a compressor station who can manage the liquids collected during the compressing and drying of the gas and placed in storage tanks. Efficiency can be realized at the compressor station by employing variable height outlet tools in the storage tanks and in the oil sale tank. The need for removal of the lower level liquids in the tanks is avoided and thus the coordination of arrival of a water truck and an oil truck is also eliminated. Additionally, the size of each load for the truck may be controlled by the use of adjustable height outlets in the storage tank and the oil sale tank. Further, the use of more accurate liquid level measurement devices, such as a Sonar or Radar device, provides more efficient management of the liquids. If an operator is not always present at the compressor station, the liquids may be managed from a remote control station.

Water Plant

A representative water plant for a plurality of wells has a number of produced water storage tanks that receive the liquids from the water trucks that transport the liquids from the storage tanks at the well sites. The efficiency of a water plant may be significantly improved by using an adjustable height outlet tool in each produced water tank to remove the light oil that sits on top of the other liquids that separate by stratification. The removal of the oil permits an increased flow rate of the bottom level liquids from a produced water tank through the separator.

Additionally, the residual oil in the liquids transferred from the separator is transferred to a processed water storage tank and is a problem. Improved liquid management is attained by use of an adjustable height outlet tool in each processed water storage tank or settling tank. The level of the oil in each tank is ascertained and the orifice of the vertical height outlet is positioned to permit removal of the oil to an oil sale storage tank rather than it being carried into an evaporation pond or water purification device with its attendant problems.

A variable height outlet tool is also used in each oil sale storage tank to assure that the oil removed through the orifice of the tool is devoid of any BS&W in the bottom of the tank. If the oil is contaminated and loaded into an oil truck anyway, the oil will be rejected at the refinery and the time in loading and transporting the contaminated light oil will result in wasted truck and personnel time. The refinery is often 50 miles or more away from the water plant, and it is important that the transported oil is clean. Consequently, the use of a variable height outlet positioned sufficiently above the BS&W in the bottom of the tank avoids expensive contamination of the light oil.

Further efficiencies may be realized at the water plant by the use of a variable height outlet tool. The liquids in the dirty oil between the good light oil and the water often contain oil which may also be recovered and sold. During the cold season and at other times, the dirty oil which is accessed after the water has been removed from a tank is transferred to a dirty oil tank (sometimes called an interface tank). The liquids in the dirty oil tank are processed by employing the services of a hot oil truck that heats the liquids to speed up the separation of the oil from the water by stratification. The employment of a hot oil truck at a water plant is expensive in that there is a per hour charge for the use of the hot oil truck. Consequently, to improve the efficiency of the operation of the water plant, the variable height outlet in the various tanks is positioned at the lower level of the dirty oil to selectively remove and transfer the selected dirty oil to the dirty oil tank. When sufficient dirty oil liquid is present to justify the use of a hot oil truck, it is called to the water plant. Once the oil is separated from the other materials in the dirty oil, the remaining materials, which are waste, are transported to a disposal plant, while the oil is transferred to an oil storage tank for sale.

Objects, features and advantages of this invention will become apparent from a consideration of the above, the following description, the appended claims and the accompanying drawings.

BRIEF DESCRIPTION OF THE DRAWINGS

FIG. 1 is a schematic diagram illustrating various adjustable height inlet/outlet apparatus or tools that telescope up away from the bottom of the container, in accordance with the present invention;

FIG. 2 is a schematic diagram illustrating various adjustable height inlet/outlet tools that telescope down toward the bottom of the container, in accordance with the present invention;

FIG. 3 is a schematic diagram illustrating various adjustable height inlet/outlet tools that telescope up away from the bottom of the container with the tool being mounted in an extension below the bottom of the container, in accordance with the present invention;

FIG. 4 is a schematic diagram illustrating various adjustable height inlet/outlet tools that telescope down toward the bottom of the container with the tool mounted on the outside of the container, in accordance with the present invention;

FIG. 26 is a front-elevation view of a mounting bracket for the horizontal extension of the standpipe, in accordance with the present invention;

FIG. 27 is a top-plan view of the mounting bracket of FIG. 26, in accordance with the present invention;

FIG. 35 is an elevation view of the extension rod for reaching the body of the seal assembly inside a tank with the installation/removal tool, in accordance with the present invention;

FIG. 36 is a bottom-plan view of the extension rod of FIG. 35, in accordance with the present invention;

FIG. 37 is a top-plan view of the rod of FIG. 35, in accordance with the present invention;

FIG. 44 is an elevation view of the top plate that holds the standpipe of the tool in place, in accordance with the present invention;

FIG. 45 is a top-plan view of the top plate, in accordance with the present invention;

FIG. 70 is an enlarged view of the display screen at the central control station of an event of managing a liquid in a container with an adjustable height inlet/orifice tool, in accordance with the present invention;

FIG. 72 is a hard copy from a printer for recording or logging events, in accordance with the present invention;

FIG. 99 is an enlarged view taken in the area of the box labeled "Detail E" of FIG. 94.

DESCRIPTION OF THE PREFERRED EMBODIMENT

Figure 5:
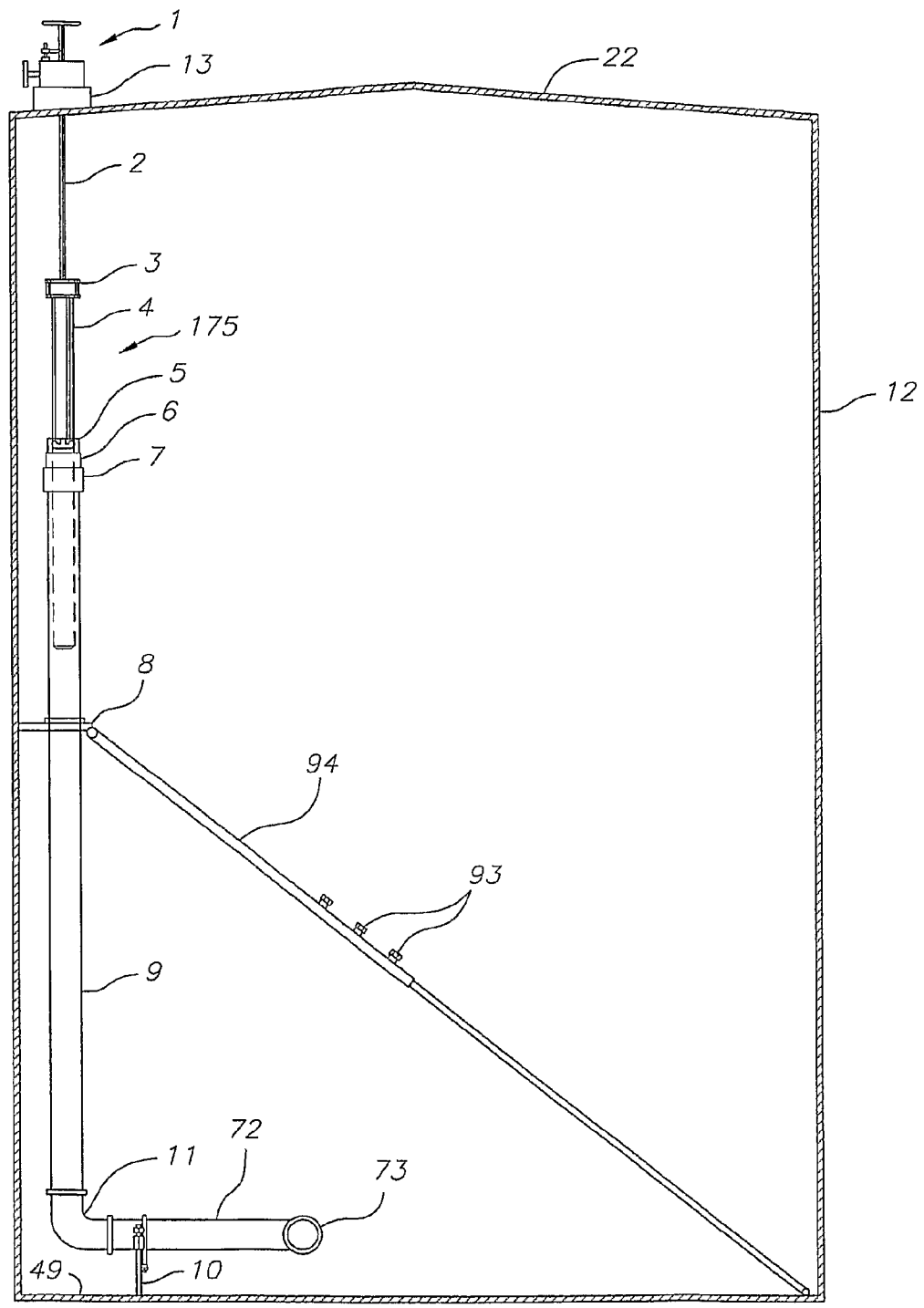
FIG. 5 is a right-side elevation view of a single-stage adjustable height inlet/outlet tool in a 400-barrel tank, with the tank shown in cross section, in accordance with the present invention.

The design and operation of the liquid management tools of this invention are schematically shown in FIGS. 1-4. The tool in each case is shown in a container 12 having a height of 20 feet. This height is not limiting as to the use of the tool. It is, however, representative of the normal height of 400-barrel and 500-barrel storage tanks used in gas fields.

Essentially, all levels of a container may be accessed by using one or more of the various tools illustrated in FIGS. 1-4. For example, the upper half of a container, whether it be 20 feet high or some other height, may be accessed by a single-stage tool 101A. This tool has a standpipe section 9, that is generally attached to or supported by the container, and a telescoping tube 4 that telescopes up from the top of the standpipe section 9. The telescoping tube carries an inlet/outlet assembly 3 which may be selectively positioned in the upper half of the container to access selected liquids that are stratified in the upper-half of the container. A two-stage device 101B with a shorter standpipe section 9 provides access to the upper ⅔ of the container. A three-stage tool 101C having a shorter standpipe 9 provides the ability to cover the upper ¾ of the container. A three-stage tool 101D has a very short standpipe 9 and provides access to only the lower part of the container. All of the tools illustrated in FIG. 1 are mounted on the bottom of the container.

Another approach is to mount the tools from the top of the container and provide for the inlet/outlet 3 to telescope down from the top to cover the selected areas in the container, as shown in FIG. 2. For example, tool 201A has a short standpipe and three segments that provide access to approximately the upper ¼ of the container. Tool 201B illustrated in FIG. 2 has a longer standpipe 9 with the inlet/outlet telescoping down from the top of the container to provide access for the area of the container below the top ¼ of the container.

When the tool is mounted on the bottom of the container, the area below the top of the standpipe is not accessible. Similarly, when the tool is mounted on the top of the container, the standpipe prevents access all the way to the top. To provide access to the bottom of the container and to the top of the container, the tool is mounted outside the container as shown in FIGS. 3 and 4, respectively.

As noted in FIGS. 1-4 the liquid management tool having a variable or adjustable height inlet/outlet may have a single-telescoping section as a single-stage device or a plurality of telescoping sections as desired. A single-stage tool will be described in detail with the description being applicable also to the plural-stage liquid management tools shown in FIGS. 1-4.

The typical dimensions for the parts of the apparatus positioned in a 400-barrel tank having a 12-foot diameter and a 20-foot height will be described. However, these dimensions for the various components are only representative and will vary depending upon the size and configuration of the storage vessel and the selected type of tool. The adjustable height tools are also useful with liquids, other than those from gas wells, and in containers with other configurations and of different sizes.

The elements of the tool will be described for use in a highly flammable or explosive environment. In this case, brass or other non-sparking material is used where the element may come in contact with a ferrous material. Additionally, all elements are grounded to prevent build-up of static electricity.

Figure 8:
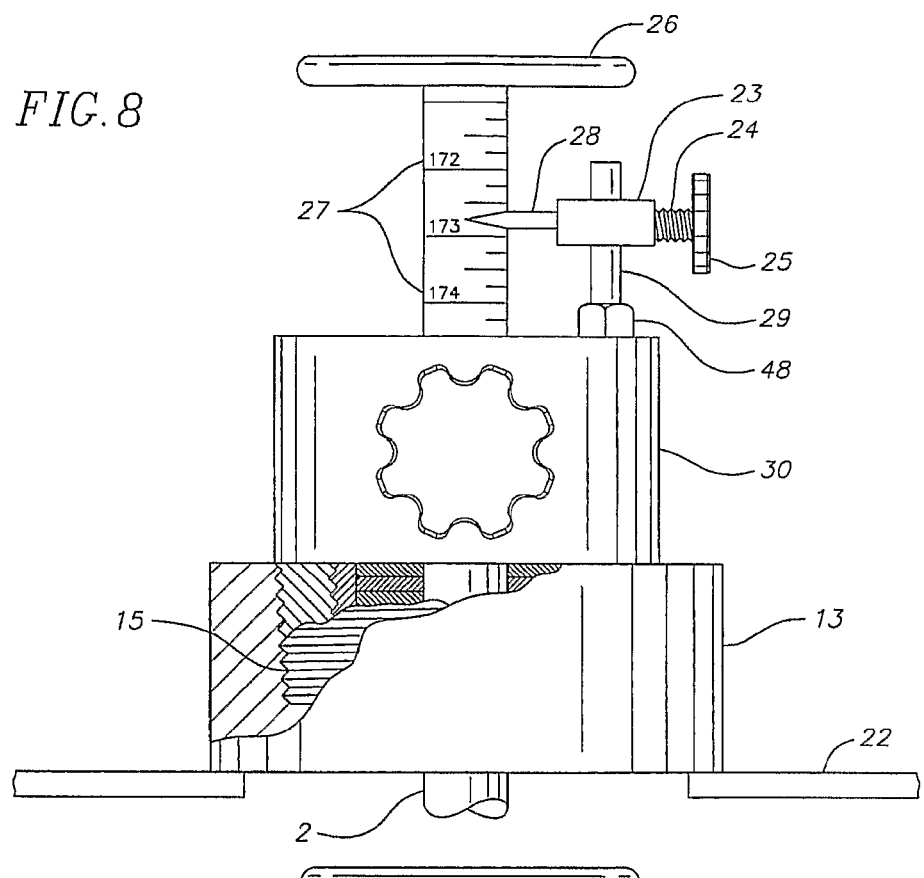
FIG. 8 is a front elevation view of the gauge and locking assembly and mounting block, partially broken away, with the measurement rod and the inlet/outlet orifice in their lowest position, in accordance with the present invention.
Figure 9:
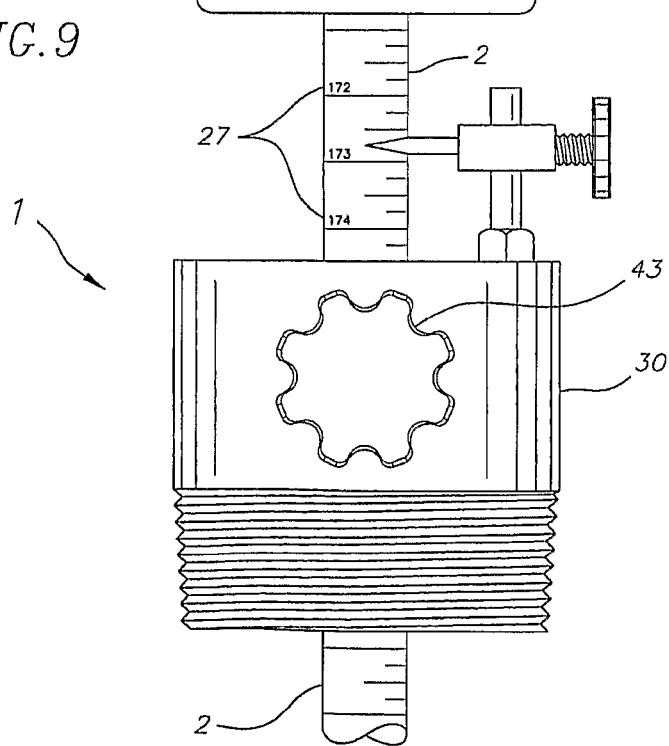
FIG. 9 is a front elevation view of the gauge and locking assembly removed from the mounting block, in accordance with the present invention.

Referring to FIG. 5, the variable height liquid management tool or apparatus has a standpipe 9; a telescoping tube (pipe) 4 carrying an inlet/outlet assembly 3; a seal assembly 5 and an adjusting/measuring rod 2. The measurement rod 2 is made of brass or other non-ferrous (non-sparking) material to avoid sparking and extends above the tank 12 through a mounting block 13 and a gauge and locking assembly 1. The rod 2 has graduated marks 27, as shown in FIGS. 8 and 9, to indicate the position or height of an orifice 50 (FIG. 14), carried by the inlet/outlet assembly 3, inside the tank 12. This height of the orifice is relative to the bottom 49 of the tank 12. The gauge and locking assembly 1 is mounted above the top of the tank 12. The measurement rod 2 and the top of the telescoping tube 4 are connected by the inlet/outlet assembly 3. A seal assembly 5, where the telescoping tube 4 enters the standpipe 9, seals the annular space between the telescoping of tube 4 and the standpipe 9, and prevents liquid flow into or out of the standpipe at this point.

Figure 6:
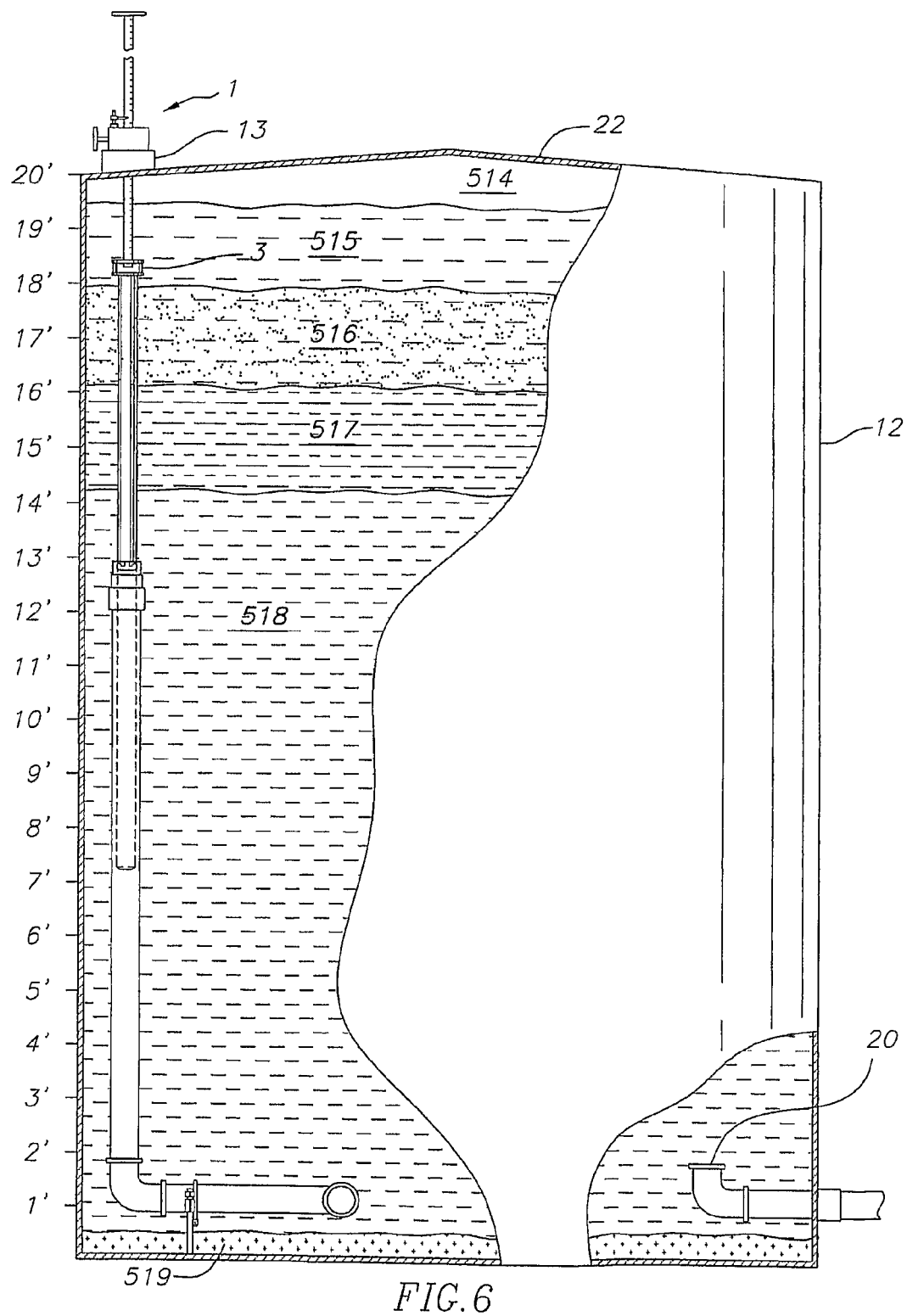
FIG. 6 is a right-side elevation view of the tool, with a portion of the wall of the tank broken away to show the levels of stratified liquids in the tank, in accordance with the present invention.
Figure 7:
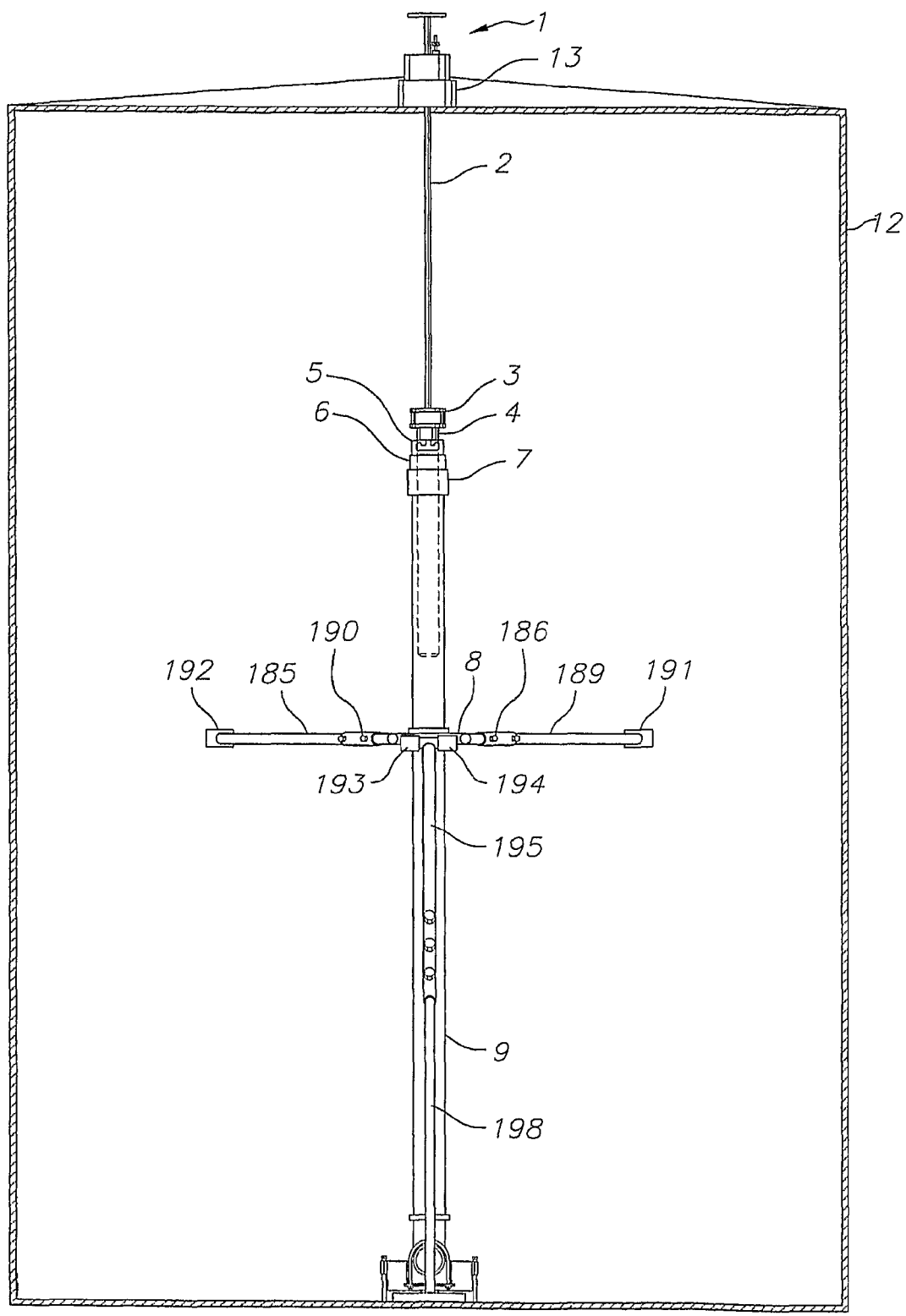
FIG. 7 is rear elevation view of the tool in place inside the tank with the tank shown in cross-section, in accordance with the present invention.

In FIG. 5, the inlet/outlet assembly 3 is positioned at approximately the middle range of its possible positions; while in FIG. 6 the inlet/outlet assembly is shown in position to remove a selected liquid 515. In FIG. 6 the orifice carried by the inlet/outlet assembly 3 is shown at a height of approximately 18¼ feet relative to the bottom of the tank and in FIG. 5 at a height of approximately 17 feet.

The liquid levels for a typical 400 or 500 barrel, 20 foot high tank at a gas well, compressor station or water plant is shown in FIG. 6. A layer of clean oil 515 floats on a layer of dirty oil 516. The dirty oil 516 floats on a layer of waste oil 517, which floats on a layer of water 518. A layer of BS&W 519 is on the bottom of the tank and there is an empty space 514 above the layer of clean oil 515. The empty space generally contains some gases. Normally, there is a valve (not shown in FIG. 5 or 6) that maintains the pressure in the tank between 12 oz of positive pressure and 4 oz of negative pressure. The orifice, which is carried by the inlet/outlet assembly 3 is positioned in the light oil 515 in FIG. 6.

Gauge and locking assembly 1 (FIGS. 8 and 9) has a pointer 28 positioned to indicate the height of the orifice carried by the inlet/outlet assembly 3. The pointer 28 points to the graduated marks 27 on rod 2 relative to the bottom of the tank 12. The gauge and locking assembly 1 provides a fluid seal and static electricity discharge connections while providing the indication of the height of the orifice carried by the inlet/outlet assembly 3 within the tank.

The main body 30 of gauge and locking assembly 1 (FIGS. 8-10) is machined from 4½ inch solid brass stock. Other non-sparking material may be used. The lower outside portion of body 30 is threaded to attach to a 4-inch NPT coupling or mounting block 13 on top 22 of tank 12. A center bore 33 (FIG. 10) of body 30 is 0.030 inch larger than the diameter of measurement rod 2. This dimension differential allows the rod 2, with an outside diameter of 1.00 inch, to move vertically up or down within the center bore 33 of body 30 and to provide lateral stability for the rod 2 and the telescoping tube 4. Additionally, the center bore 33 pre-cleans the paraffin or other residues on rod 2 before the rod contacts a seal assembly consisting of a brass washer/wiper seal 35 and a V-groove seal 34. Brass washer/wiper seal 35, sits at the bottom 32 of a recess 31, and has an inside diameter that is 0.015 inch larger than the outside diameter of rod 2. This provides another pre-cleaning of rod 2 before making contact with the V-groove seal 34. The washer/wiper seal 35 is slightly smaller in diameter than the recess it sits in to allow approximately 0.030 inch of lateral movement.

The V-groove high molecular synthetic seal 34 sits on top of the brass washer/wiper seal 35. Seal 34 has an inside diameter of 1.00 inch, which corresponds to the outside diameter of brass rod 2. This provides a vapor seal between the tank 12 and atmosphere. This seal is also encased by conductive non-sparking metal.

Above the V-groove seal 34 sits a positive contact static discharge bushing 37 and positive lock bushing 38. These two parts are made by sawing a brass bushing in half. The bushing, before sawing, has a 1.00 inch inside diameter×2.030 inch outside diameter×1.00 inch height. Static discharge bushing 37 has a 0.375 inch recess 39 drilled 0.250 inch deep at the apex of the crescent half bushing 37. This holds a constant contact static spring 40, that also serves to eliminate turning of the bushing crescent half 37 when in use. The spring 40 is held in position by a ⅜ inch Allen head set screw 41. Spring tension is adjusted by moving set screw 41 either in or out. The under sizing of each crescent bushing half 37 and 38 (due to saw kerf when the bushing was split) allows for more lateral movement than does the center bore 33 that rod 2 fits inside, thereby maintaining static discharge contact when spring 40 is held by ⅜ inch Allen set screw 41.

Opposite the static contact bushing 37, sits the locking crescent bushing 38. It also is designed to prevent rotation by positioning a ½ inch bolt (not shown) into a recess 42 drilled at the crescent apex of bushing 38. A locking handle 43 (FIG. 9) is at the end of a ½ inch bolt (not shown) remote from bushing 38. As handle 43 is turned clockwise, the locking bolt moves inward pushing locking bushing 38 toward and against rod 2. Rod 2 in turn moves static bushing 37 until it makes contact with the wall 44 of recess 31 in body 30 or until further rod 2 lateral movement is prevented by contact with the far side of center bore 33. At this point, locking handle 43 is rotated to create sufficient pressure to maintain rod 2 in place. The crescent bushing 37 and 38 are designed with extra height that may be removed to allow for an additional or different type of seal to be installed, if necessary.

Another brass washer/wiper seal 45 sits above the bushing halves 37 and 38 and provides cleaning action to rod 2 in addition to the cleaning action of V-groove seal 34 below. Seal 45 keeps contaminates from limiting movement of static contact and locking bushing halves 37 and 38. The top brass washer/wiper seal 45 is held in place by an internal snap ring 46. The thickness of washer/wiper seal 45 is sized to allow for desired lateral movement of rod 2 and crescent bushings 37 and 38, but limiting vertical movement to a few thousandths of an inch for all parts contained in the recess 31.

The two washer/wiper seals 35 and 45, the inside bore 33 for rod 2 and locking bushing 38 provide redundant static discharge contact most of the time, although that is not their primary function. Only the static bushing 37 with spring 40 are designed to always maintain a grounding point.

FIGS. 8 and 9 show the upper part of assembly 1 with position indicator or indicia 27 on rod 2. The position indicator includes pointer 28, which is supported by a vertical position pointer rod 29 threaded at its lower end into the top of body 30. Rod 29 is secured in place by threads on its lower portion and a jam nut 48 which bears against the top of body 30. The upper portion of rod 29 is smooth and allows for movement to calibrate position pointer 28. Pointer 28 is attached to a mounting block 23 that slides freely up and down rod 29, unless locked in place. Block 23 and pointer 28 are locked in place by a set screw 24 having a knob or handle 25 for movement. By loosening pointer set screw 24 by handle 25 the pointer 28 may be moved for calibration to accurately reflect the height of the orifice (FIGS. 6-10) above the bottom 49 of tank 12. Position pointer rod 29, is designed to protect position pointer 28 from damage should rod 2, with a top cap 26 (FIG. 8), be lowered too far.

Figure 14:
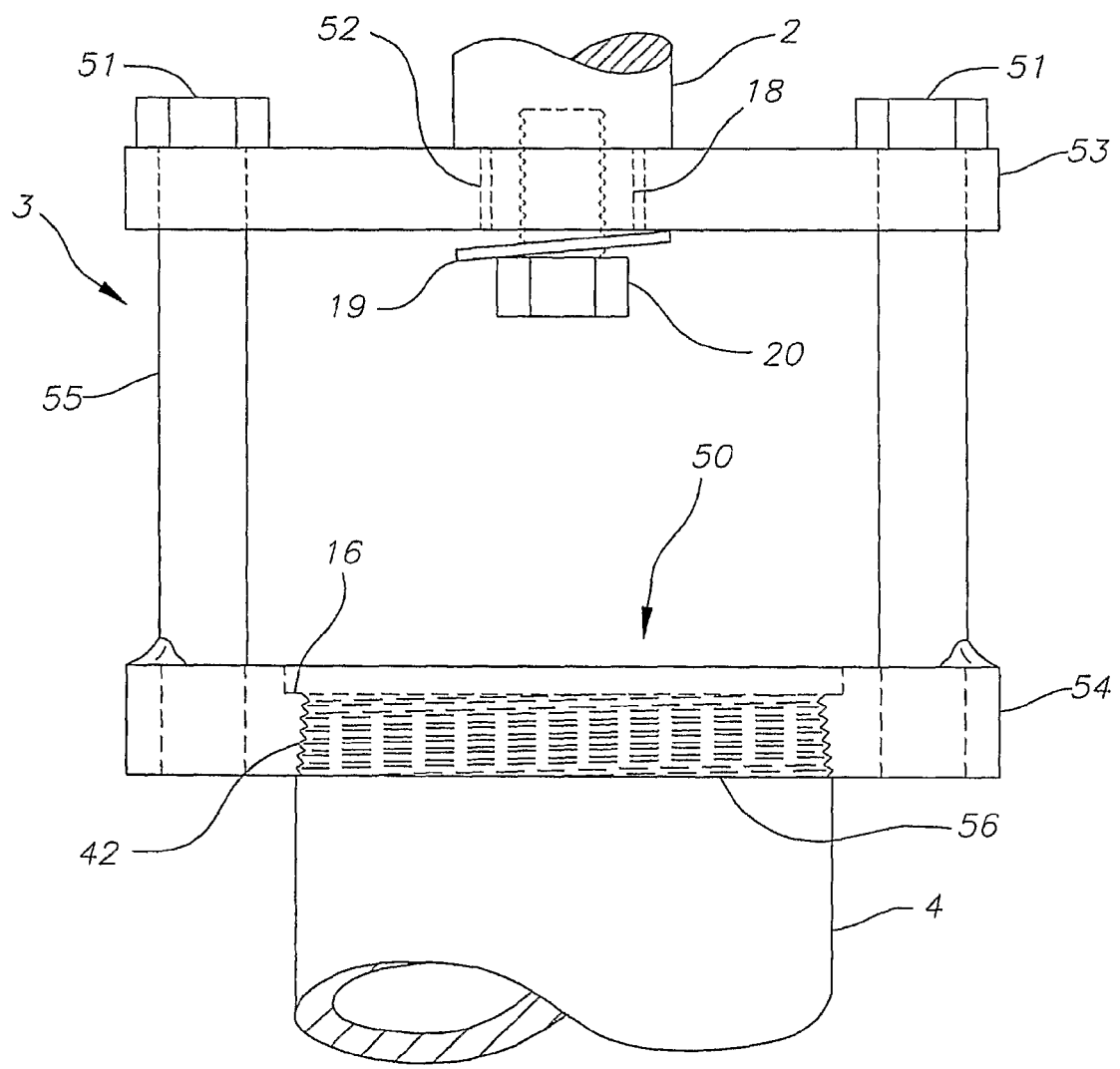
FIG. 14 is a right-side elevation view of the inlet/outlet assembly of the tool, in accordance with the present invention.

The bottom end of measurement rod 2 is attached to the inlet/outlet assembly 3 so that movement of the measurement rod 2 above the top of the tank 12 causes the inlet/outlet assembly 3 to move within the tank to adjust the height of the orifice 50 carried by the inlet/outlet assembly. The bottom of the measurement rod 2 is connected to the top of the telescoping pipe 4 through the inlet/outlet assembly 3, as shown in FIG. 14. The bottom of the measurement rod 2 is stepped to fit into a hole 52 in the assembly 3. Stepped end 18 of rod 2 passes through hole 52 and is held in place by a spring washer 19 and bolt 20 threaded in a threaded hole in the bottom of rod 2. The attachment of the adjusting and measurement rod 2 to the assembly 3 with the spring washer 19 and bolt 20 permits rotation of the measurement rod 2 relative to the assembly 3 so that any rotation of the measurement rod will not be transmitted to the components of the apparatus that are below the assembly 3. The spring washer 19 also maintains electrical contact to prevent static electricity buildup.

Figure 15:
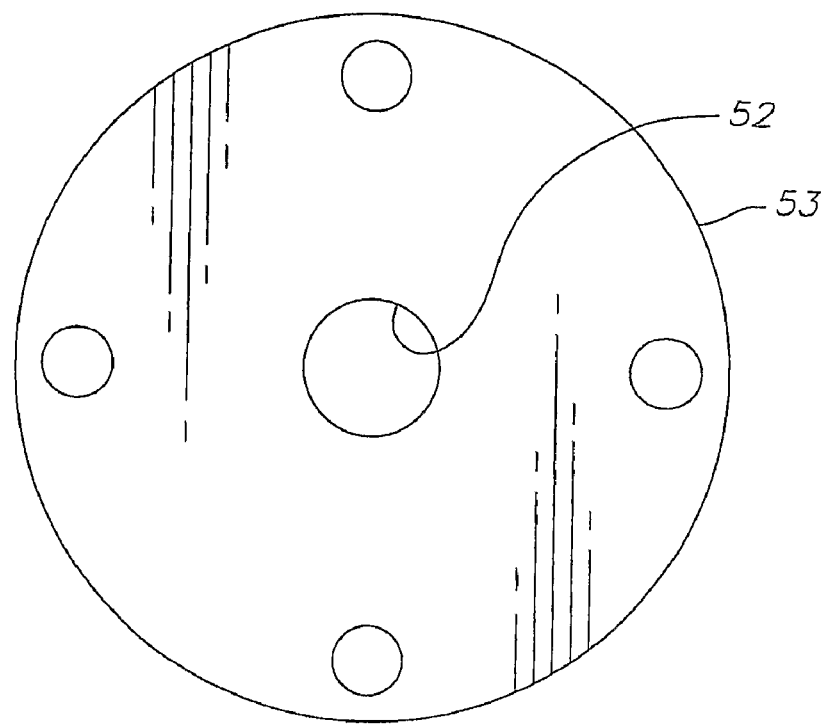
FIG. 15 is a top-plan view of the top plate of the carrier for the inlet/outlet assembly, in accordance with the present invention.
Figure 16:
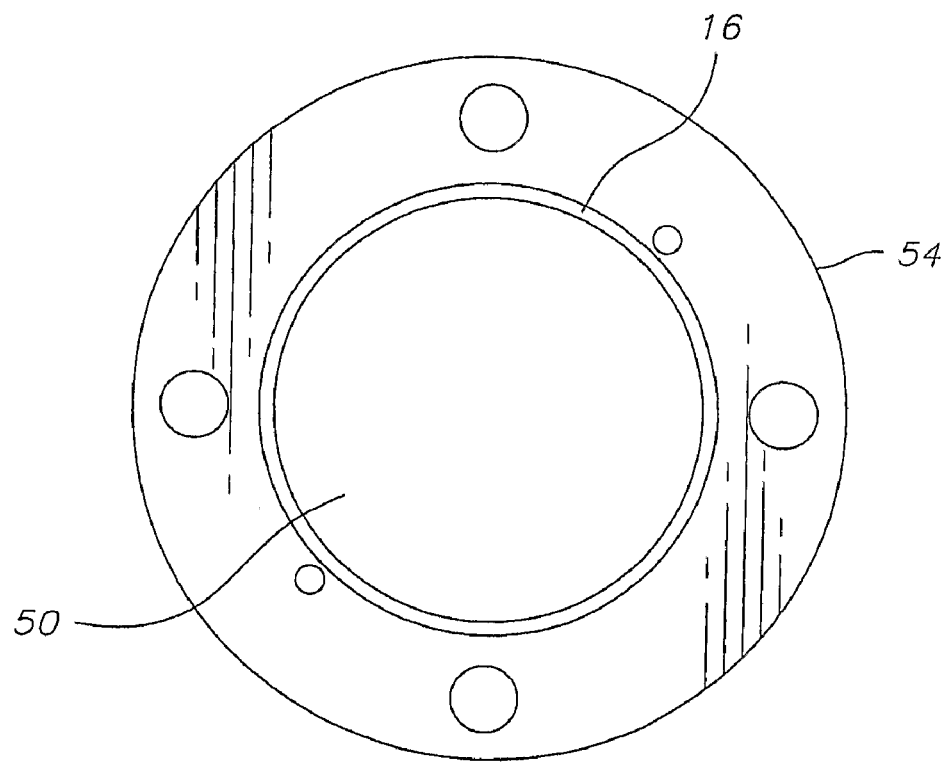
FIG. 16 is a top-plan view of the bottom plate of the carrier of the inlet/outlet assembly showing the inlet/outlet orifice, in accordance with the present invention.

The inlet/outlet assembly 3 (FIG. 14), includes a circular top plate 53, (FIG. 15) a circular bottom plate 54 (FIG. 16), and four vertical supports 55 that are spaced 90° apart. The vertical posts 55 are connected to the circular bottom plate 54 by threads, brazing or other means of connecting the parts. The vertical posts 55 are preferably connected to the top plate 53 by threads at the end of the posts 55 and nuts 51. This permits removal of the top plate 53 for access to the opening or orifice 50 in the circular bottom plate 54. The illustration of the inlet/outlet assembly 3 and the connection of the rod 2 and the telescoping pipe 4 in FIG. 14 is an elevation view with the front and rear posts 55 not shown.

A vertical opening 56 through the bottom of the circular bottom plate 54 is threaded internally for attachment to the telescoping tube or pipe 4. The top of telescoping pipe 4 is threaded with threads 42 that correspond to the threads in the opening 56 of the bottom plate 54.

The removable top plate 53 is made of 0.375 inch thick brass and has a diameter of 3.938 inches. The center hole has a diameter of 0.760 inches and is slightly larger than the 0.750 inch diameter of the stepped bottom end 18 of rod 2. This provides clearance for rotation of rod 2 in plate 53.

Figure 28:
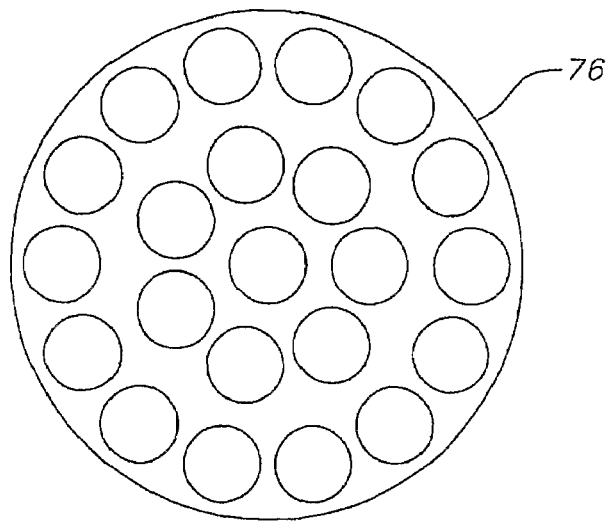
FIG. 28 is a top-plan view of a screen that fits over the inlet/outlet orifice, in accordance with the present invention.
Figure 29:
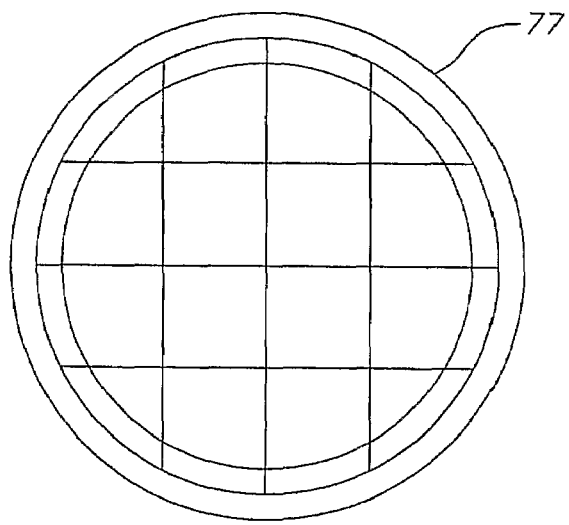
FIG. 29 is a top-plan view of another screen that fits over the inlet/outlet orifice, in accordance with the present invention.
Figure 30:
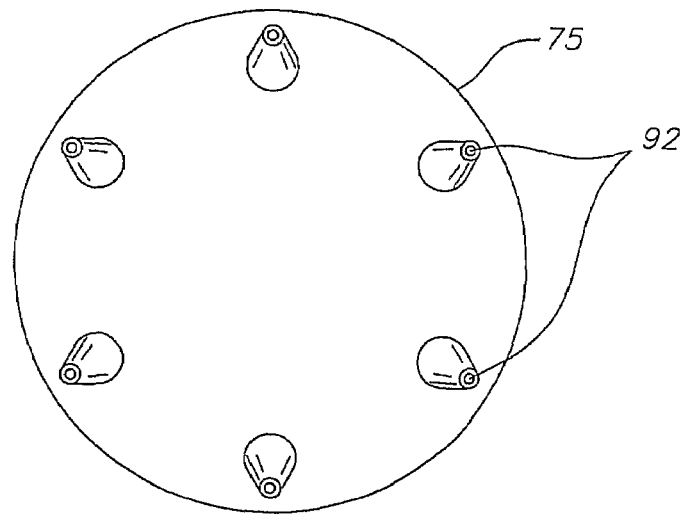
FIG. 30 is a top-plan view of jets on a cover plate that fit over the inlet/outlet orifice, in accordance with the present invention.
Figure 31:
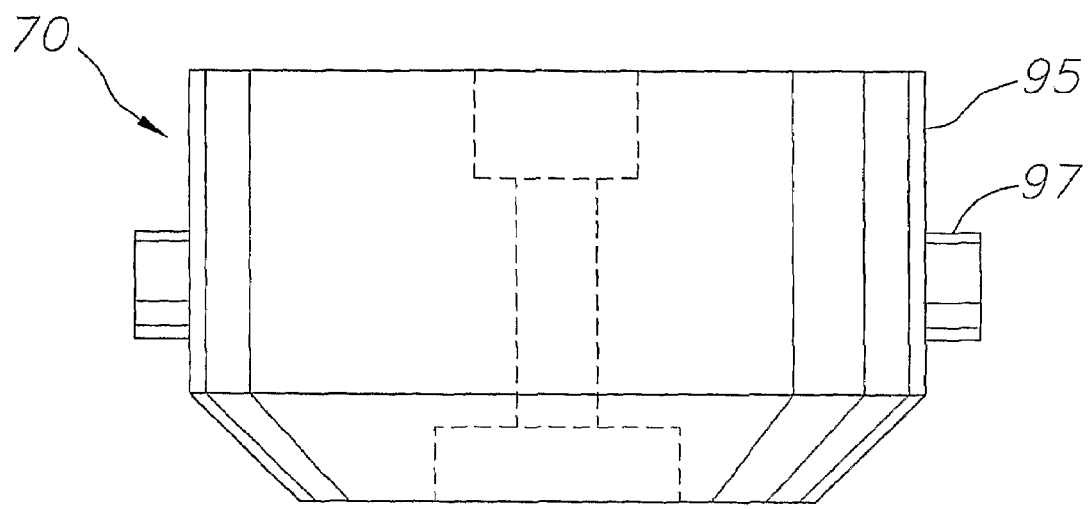
FIG. 31 is a front-side elevation view of the installation/removal tool for installing and removing the seal assembly, in accordance with the present invention.
Figure 32:
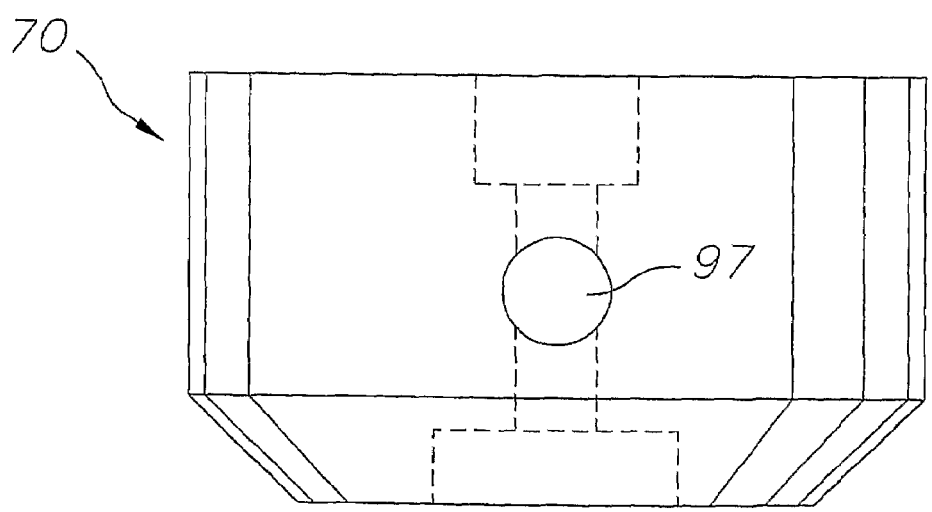
FIG. 32 is a left-side elevation view of the installation/removal tool, in accordance with the present invention.
Figure 33:
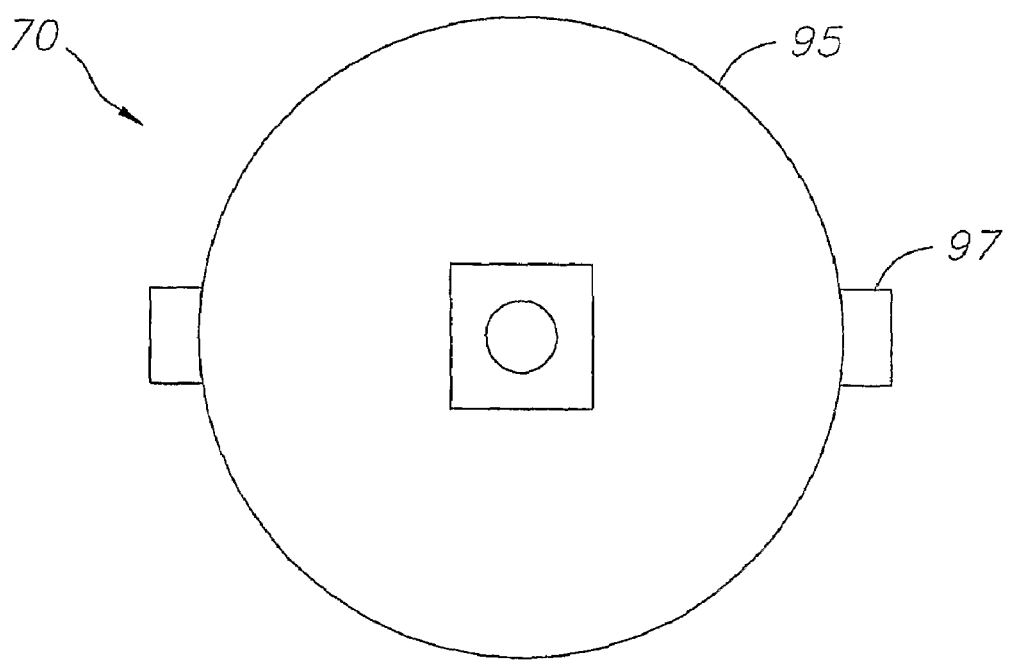
FIG. 33 is a top-plan view of the installation/removal tool, in accordance with the present invention.
Figure 34:
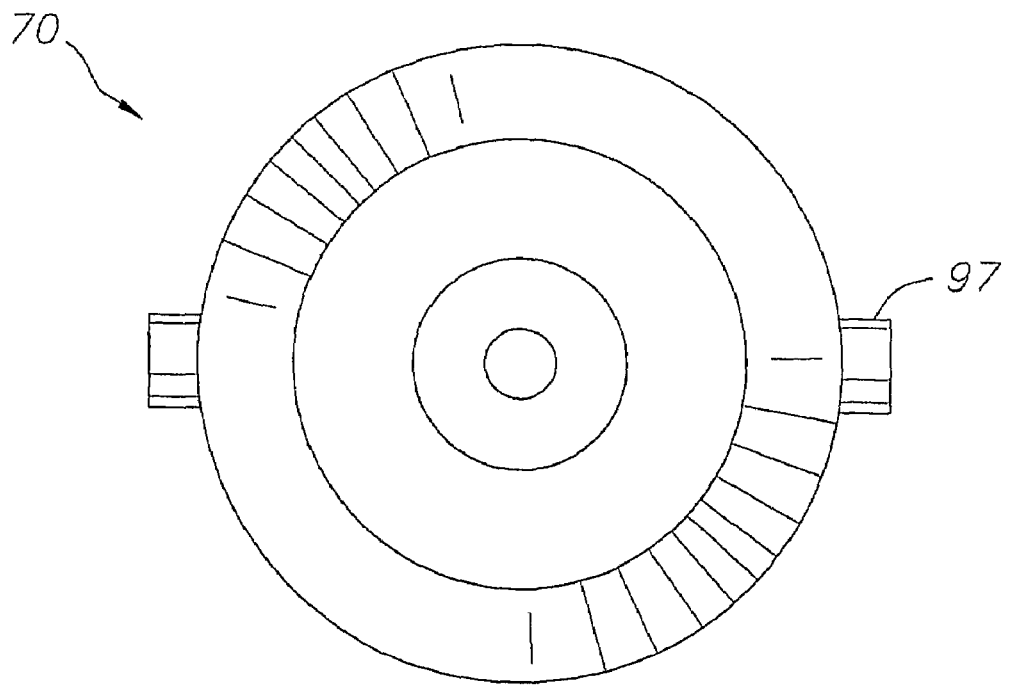
FIG. 34 is a bottom-plan view of the installation/removal tool, in accordance with the present invention.

The bottom plate 54 is made of 0.50 inch thick brass and has a diameter of 3.937 inches. The diameter of center hole or orifice 50 is 2.375 inches. A recess 16 is cut around the orifice to support screens 76 and 77 (FIGS. 28 and 29) for removal of unwanted material from the liquid or fluid passing through the inlet/outlet orifice 50. The recess 16 also selectively supports a cover plate 75 with jets 92 (FIG. 30) for adding selected materials, such as, an emulsifier to a selected liquid in stratified liquids or at a selected level in the container. Recess 16 in plate 54 has an outer diameter of 2.530 inches to receive the screens or the cover plate, for jets having a diameter of 2.50 inches.

Figure 17:
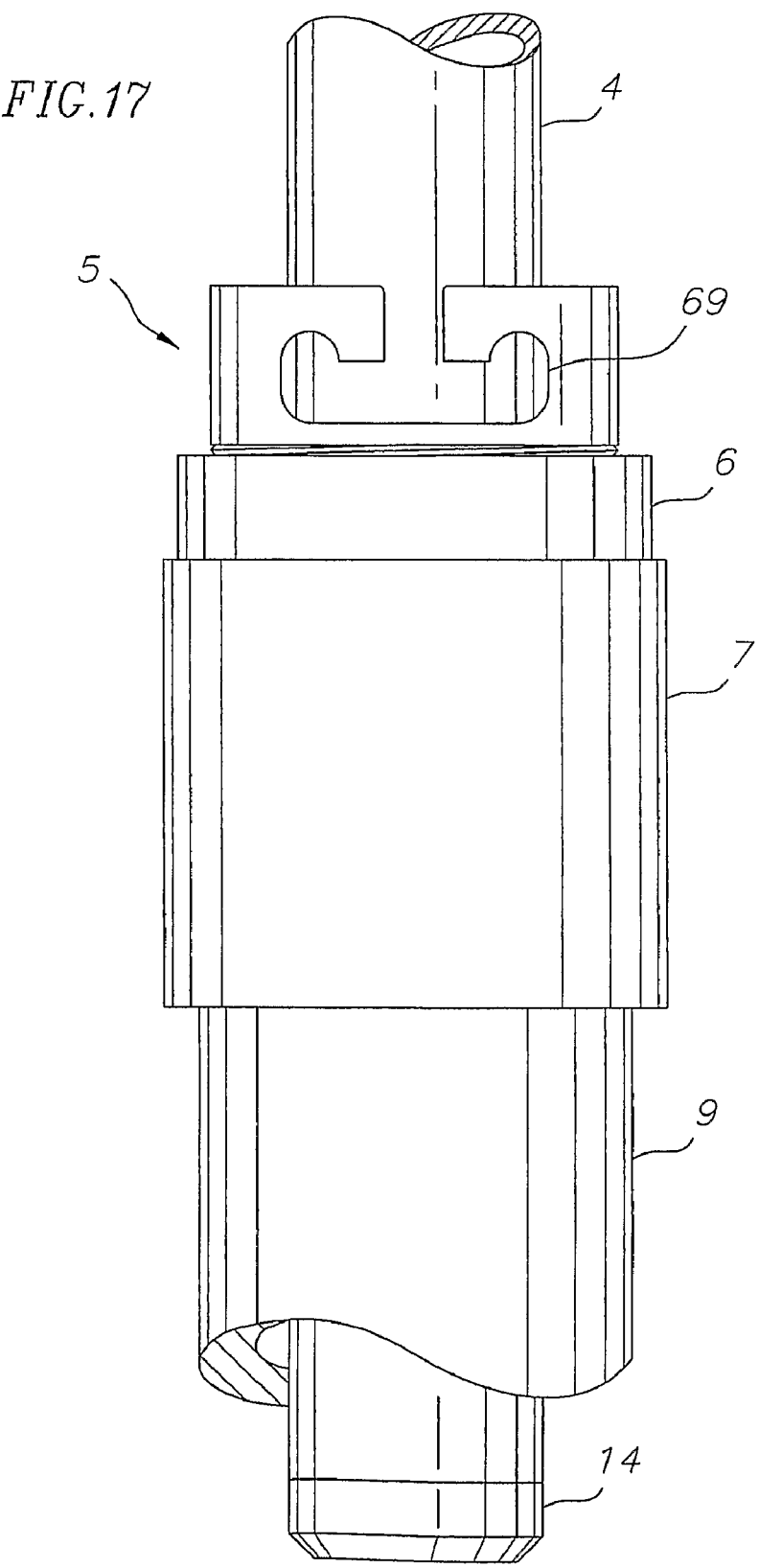
FIG. 17 is a left-side elevation view of the seal assembly, upper part of the standpipe and the lower portion of the telescoping tube of the tool, in accordance with the present invention.

The telescoping pipe 4 is made of 2.50 inch (OD) stainless steel and at the bottom there is attached a brass, anti-spark ring 14, as shown in FIG. 17. This tube may be made of other rigid materials that withstand corrosive liquids and gases. Such materials include, but are not limited to, titanium and aluminum.

Figure 18:
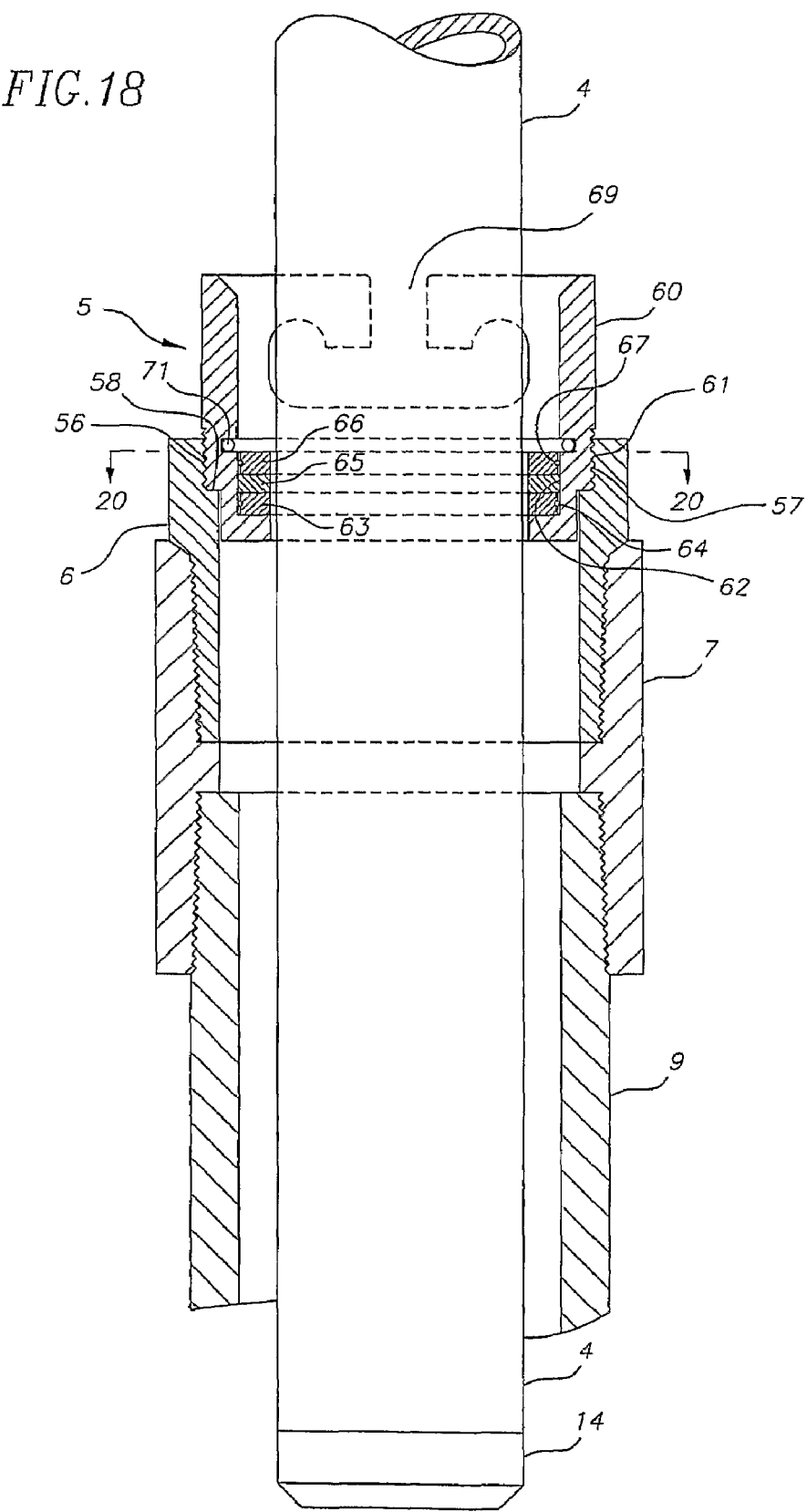
FIG. 18 is a cross-sectional view of the seal assembly and upper part of the standpipe and an elevation view of the lower portion of the telescoping tube of the tool, in accordance with the present invention.

The details of the seal assembly 5 are shown in FIGS. 17 and 18. The body 60 of the seal assembly 5 is machined from 4-inch solid brass stock. The lower outside portion of body 60 is threaded with straight (as opposed to tapered) threads 61 designed to "shoulder up" to a top recess 58 in coupling 6 (FIG. 18). The walls of recess 58 have threads 57 that correspond to the threads 61.

Figures 21, 22:
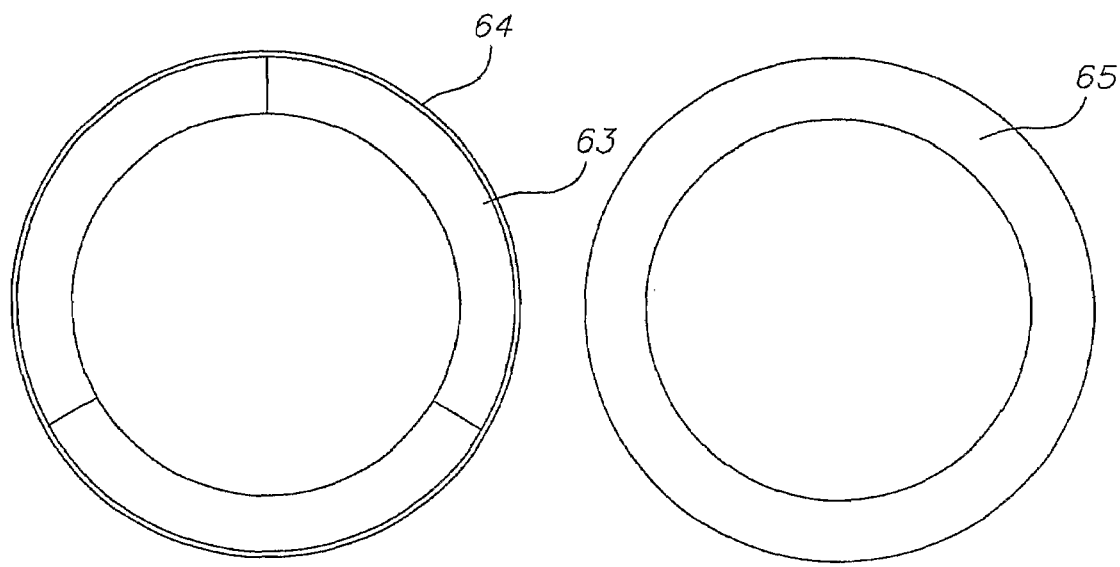
FIG. 21 is a top-plan view of the bottom seal of the seal assembly, in accordance with the present invention.
FIG. 22 is a top-plan view of the middle seal of the seal assembly, in accordance with the present invention.
Figure 23:
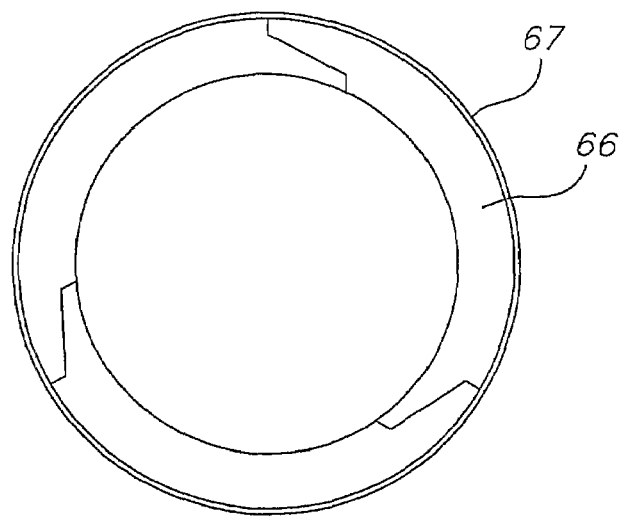
FIG. 23 is a top-plan view of the top seal of the seal assembly, in accordance with the present invention.

Seal assembly 5 has a recess 62 for the seals. The seals consist of three components. The lower seal 63 (FIG. 21) is a radial cut seal with a circular tension spring 64 that compresses the three sections to an inside diameter less than 2.500 inches. This circular spring 64 sits in a groove machined on the outside circumference of seal 63 in such a manner as to prevent wear against the wall of recess 62. A high molecular synthetic seal 65 (FIG. 22) sits on top of the brass three-segment seal 63. Seal 65 has an inside diameter of 2.50 inches and an outside diameter 0.010 inch less than the diameter of recess 62, which is 3.395 inches. The opposing faces of seals 63 and 65 form a liquid barrier between the two parts. These two surfaces have a waffled surface (not shown) to improve the sealing effect. The inside diameter of seal 65 prevents liquid migration between it and telescoping tube 4. Another brass three segment seal 66 with tangent cut sections as opposed to radial cut (FIG. 23) fits on top of seal 65. The opposing faces of seals 65 and 66 form another liquid barrier. Again, waffled surfaces (not shown) improve the sealing effect. Seal 66 is compressed by a circular tension spring 67 similar to the radially cut lower brass seal 63. The circular tension springs 64 and 67 maintain constant contact of the three seal segments of seals 63 and 66, respectfully, with the telescoping tube 4. Seals 63 and 66 are a commercially available set, manufactured by C. Lee Cook, part #200102-LQS. An internal snap ring 71 contains seals 63, 65 and 66 and allows minimal, but sufficient lateral movement, so that the sealing surfaces follow minor irregularities in the circumference of tube 4. The seals 63. 65 and 66 also provide six static discharge contact points for the tool when used in an explosive environment.

Figure 19:
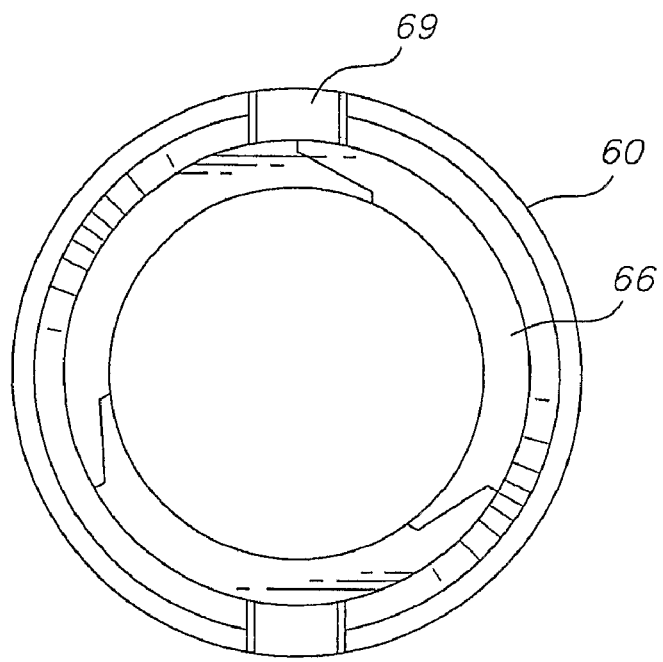
FIG. 19 is a top-plan view of the seal assembly, in accordance with the present invention.
Figure 20:
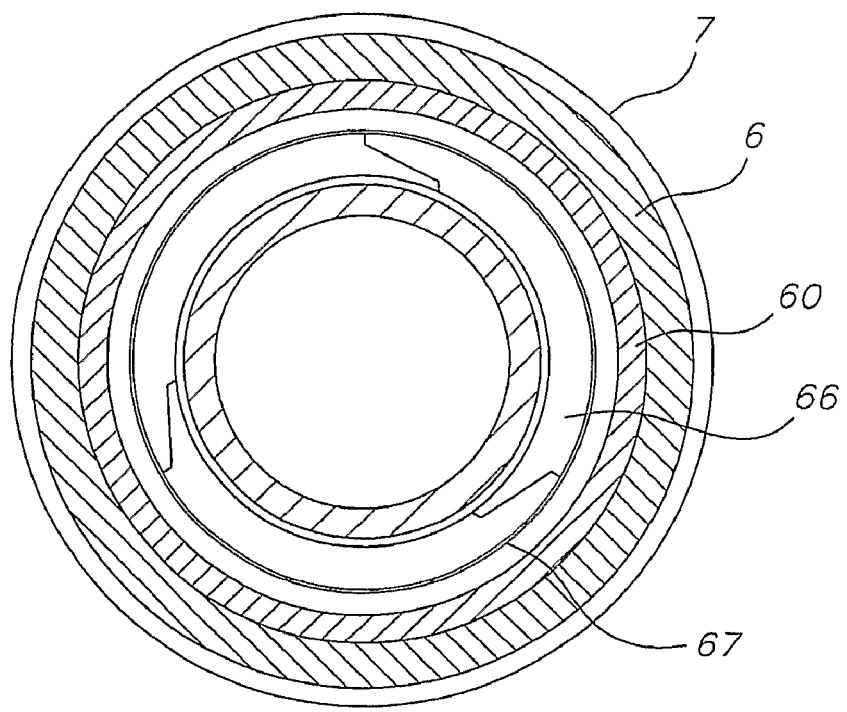
FIG. 20 is a top-plan view taken along the section lines 20-20 of the seal portion of the seal assembly shown in FIG. 18, in accordance with the present invention.

As shown in FIGS. 17, 18 and 19, two inverted T-slots 69 machined into opposite sides of the body 60 allow for mating with an extraction tool 70 (FIGS. 31-34). This allows the seal assembly 5 to be removed or installed from outside the tank 12. Proper installation of seal assembly 5 requires that at least 50 ft-lbs less torque be applied to it than to the adapter 6 during attachment of the 4 inch NPT coupling 7 to standpipe 9 to ensure that the fully assembled unit separates between shoulder threads 61 and 57 (FIG. 8) of body 60 and adapter 6 and not between adapter 6 and coupling 7 when removing the seal assembly 5. The inverted T-slots 69 in body 60, when mated to corresponding extraction tool 70, allows for seal assembly 5, to be securely lifted, or lowered and rotated.

Figure 24:
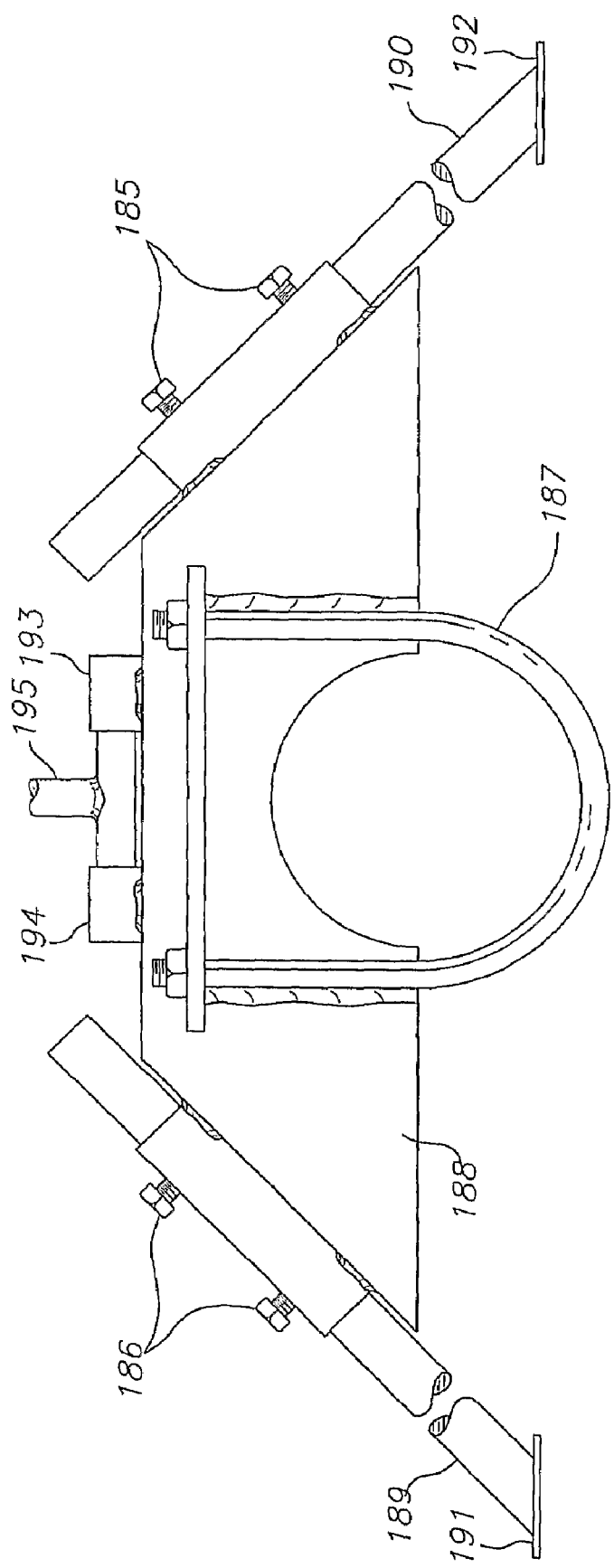
FIG. 24 is a top-plan view of a bracket for mounting the standpipe in the tank, in accordance with the present invention.
Figure 25:
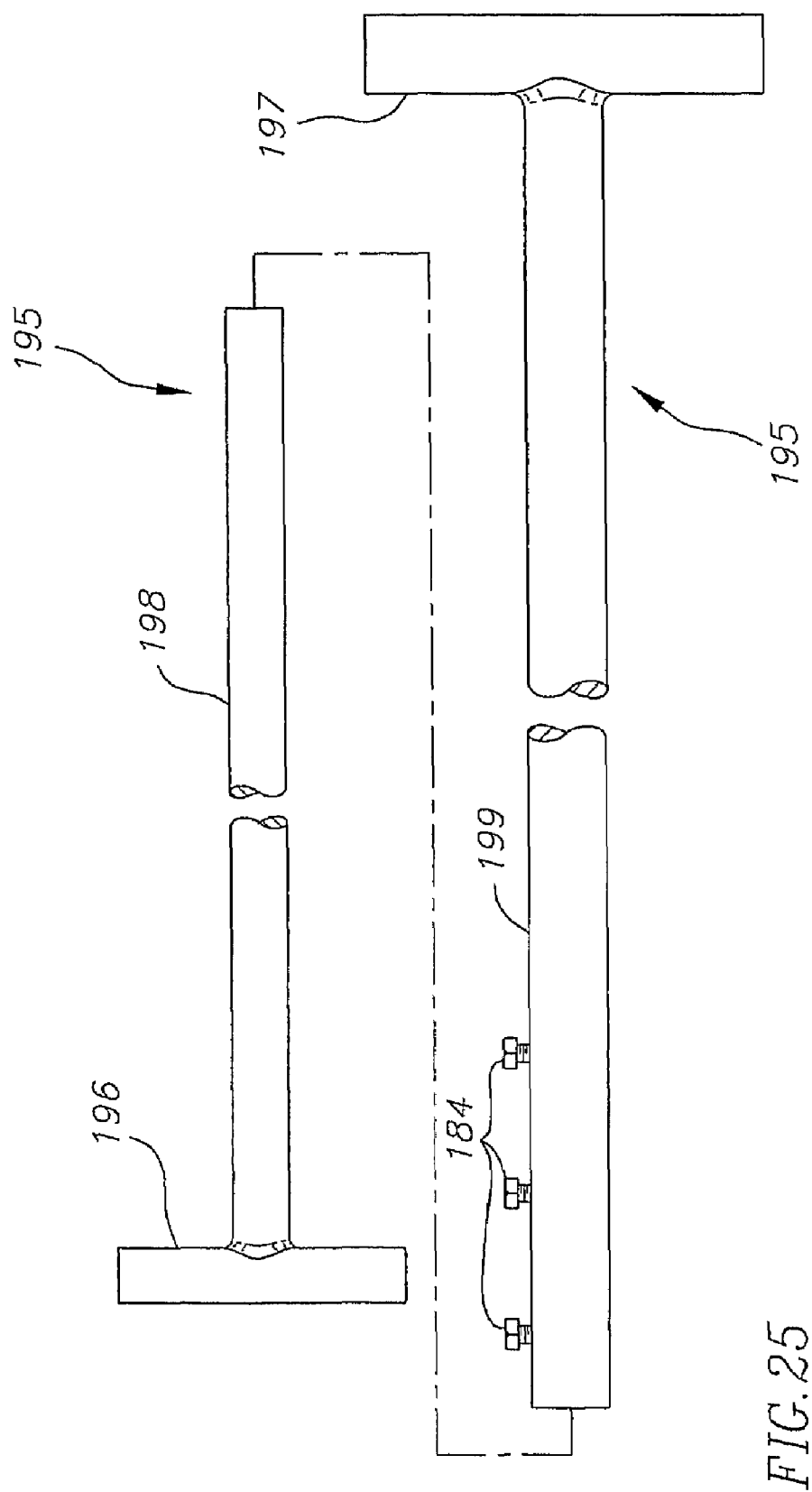
FIG. 25 is an elevation view of the rod that attaches to the mounting bracket of FIG. 24, in accordance with the present invention.

The tall standpipe 9 and the apparatus are easily stabilized in the container or tank by a tripod type support 8. This support is shown in FIGS. 5, 24 and 25. The apparatus is also supported from the bottom by an adjustable bracket 10 shown in FIGS. 26 and 27.

Figure 13:
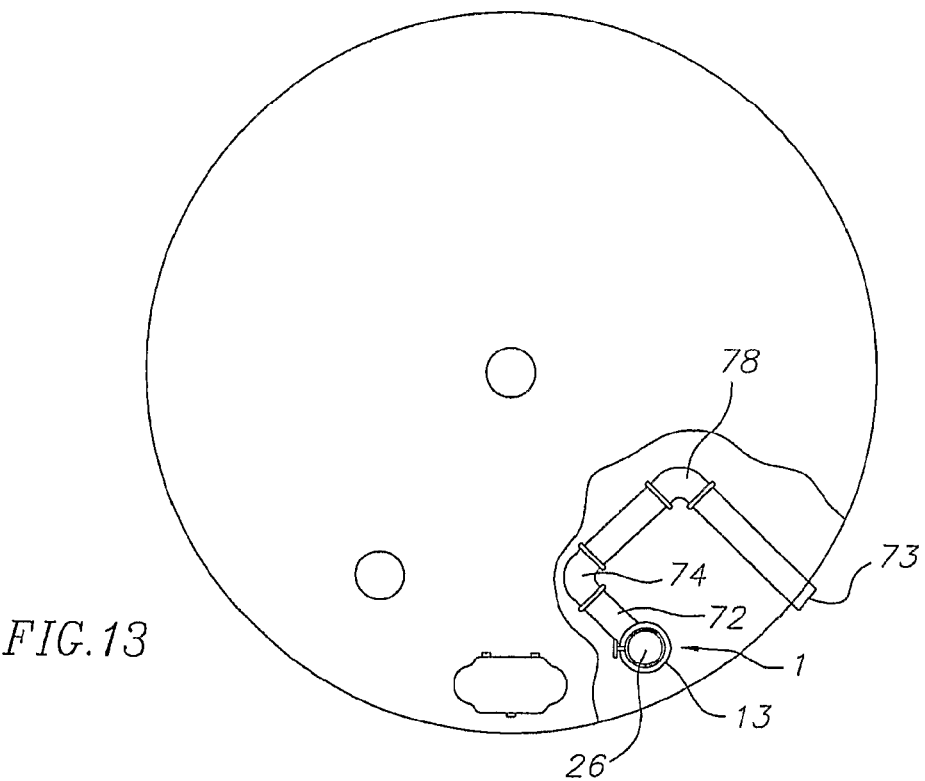
FIG. 13 is a top-plan view of the tool and outlet pipe shown in a tank with the top partially broken away to show the tool in place, in accordance with the present invention.

Standpipe 9 extends down to an elbow 11 that mates with a horizontal pipe 72. The horizontal pipe 72 can extend directly through the wall of the tank 12, or (as shown in FIG. 13) is attached by elbows 74 and 78 to another horizontal pipe 78A that passes through the wall to an outlet 73 (FIG. 13).

The tripod type support 8 (FIG. 5) includes a bracket 187 (FIG. 24) that clamps the standpipe 9. Bracket 187 is carried by plate 188 which has two angled arms 189 and 190 attached. The ends of each arm 189 and 190 have a slightly curved plate 191 and 192, respectively, that rests against the wall of the tank 12. A bracket 193 and a bracket 194 on each side of the center of plate 188 supports a telescoping leg 195 (FIG. 25). One end of leg 195 has a tubular cross piece 197 that is held in place by brackets 193 and 194. The other end of leg 195 has a foot 196 that rests against a wall of the tank 12 at the bottom 49 of the tank. The leg 195 has telescoping pieces 198 and 199 with piece 198 having a smaller diameter that fits in the larger diameter of leg 195 to secure standpipe 9 in position.

The adjustable bracket 10 (FIG. 26) that holds horizontal pipe 72 is mounted on a plate 204 that has two nuts 205 and 206 welded to the opposite edges 207 and 208, respectively. A threaded bolt 209 passes through nut 205 and a threaded bolt 210 passes through nut 206. The bottom ends of bolts 209 and 210 rest on the bottom 49 of tank 12. A nut 211 is welded to the top end of bolt 209 and a nut 212 is welded to the top of bolt 210 to provide adjustment of the height of clamp 10.

Installation

Mounting block 13 is attached, by welding, for example, to the top 22 of tank 12. The mounting block 13 has internal threads 15 to receive and hold the gauge and locking assembly 1 in place (FIG. 8). In typical installations, the bottom 49 of the tank 12 is level (horizontal) and the telescoping tube 4, rod 2 and standpipe 9, with mating openings, are vertical.

The object is to properly align the 4 inch schedule 40 standpipe 9 of a predetermined height, directly below and parallel to the threads 15 on mounting block or coupling 13, which is welded to the top of tank 12. If standpipe 9 is not located in a true centered cylindrical area below the threads 15 of coupling 13, the adjustable height liquid management apparatus will be out of alignment. Improper alignment will cause the apparatus to be difficult to move and may cause the seals in assembly 5 to not function properly.

True vertical position with respect to threads 15 of block 13 on top of tank 12 is acquired by removing rod 2 from assembly 1 and placing a 1-inch diameter laser pointer in a rotatable insert (not shown) where rod 2 would be positioned. By rotating the insert with laser 360°, an arc is illuminated on the tank floor 49. Tracing this arc with chalk, and finding its center indicates the desired center of the vertical center of a 4-inch elbow 11 (FIG. 5) and the center of the bottom end of standpipe 9. Elbow 11 must have one leg parallel to threads 15 and the other leg perpendicular to the threads 15. Elbow 11 is connected to the horizontal pipe 72, which is connected to the outlet 73, that is welded to tank 12. Standpipe 9 is threaded into elbow 11 and located in the desired position. With the standpipe in place the laser pointer with an insert (not shown) is placed inside the top of standpipe 9 and the insert and laser rotated with the light directed at the center bore 33 of body 30 and centered in this bore. Once centered, the standpipe is then locked in place.

Adjustable horizontal pipe support 10 is installed on pipe 72, as close to elbow 11 as practicable. Support 10 carries the weight of the standpipe assembly. Next standpipe vertical support 8 is installed near the top of standpipe 9. Both supports 8 and 10 are adjusted to "fine tune" standpipe 9 position with the laser pointer and insert in the top of the standpipe 9. The telescoping adjustable legs 189, 190 of support 8 are secured by tightening jam screws 185, 186 as shown in drawing 24. The telescoping leg 195 of support 8 is adjusted to position standpipe 9 and is locked in place by jam screws 184 (FIG. 25).

If maximum range of motion is desired, (approximately ½ of tank height for a single stage apparatus) then 4-inch elbow 11 must be located at or near the bottom of tank 12 floor.

Proper alignment and installation is essential for ease of operation and proper functioning of the tool.

Repair

An advantageous feature of the adjustable inlet/outlet height apparatus is the ability to repair any and all of the seals outside the tank which may contain hazardous material. Removal of the gauge and locking assembly 1 permits removal of the seal assembly 5 and inlet/outlet assembly 3 through mounting block 13. The gauge and locking assembly 1 is unscrewed from the mounting block 13. If the handle 26 is removable, it is removed and the assembly 1 lifted off the rod 2. If the handle is not removable, the assembly 1 is lifted with the lifting and removal of the rod 2, assembly 3 and telescoping tube 4. Since the inlet/outlet assembly 3 is removed it will be outside the tank 12 for servicing.

With the rod 2 and telescoping tube 4 removed, the body 60 of seal assembly 5 may be accessed. The installation/removal tool 70 (FIGS. 31-34) is attached to a rod 96 (FIG. 35) and is inserted into the tank 12 through the mounting block 13. During the installation step, the seal assembly 5 is carried by tool 70. During the removal step, the tool 70, with ears 97, is passed into the inverted T-slot 69 of body 60 of seal assembly 5. The ears 97 engage one end of the inverted T-slot 69 so that the body 60 may be turned one direction for removal and the opposite direction for installation.

Once the body 60 is detached from coupling or adaptor 6, the seal assembly 5 is carried out of the tank 12 on the tool 70. The seal assembly may then be serviced outside the tank 12 and returned to its place inside the tank 12 after service. The servicing includes testing the seal assembly and replacing one or more of the individual seals 63, 65 and 66 if necessary.

Multi-Stage Tool

A single-stage tool will only reach a height that is less than twice the height of the standpipe. Thus, to increase the height, additional sections of telescoping pipe and additional seal assemblies are provided for a multi-stage tool.

A plural-stage or multi-stage tool with a short standpipe for accessing one or more selective liquids near the bottom of a container is illustrated in detail in FIGS. 38-54. Although a three-stage (three telescoping sections and one standpipe) is described, the description applies to liquid management tools having a different number of telescoping sections and seal assemblies.

The materials used in the liquid management tools are dictated by the specific application of the tool. For example, for use in storage tanks associated with the liquids from gas wells, the material used may have to withstand the corrosive action of gases like hydrogen sulfide that may be present and also cannot create sparks from parts of the tool rubbing on other parts of the tool or striking the metal of the tank.

Figure 38:
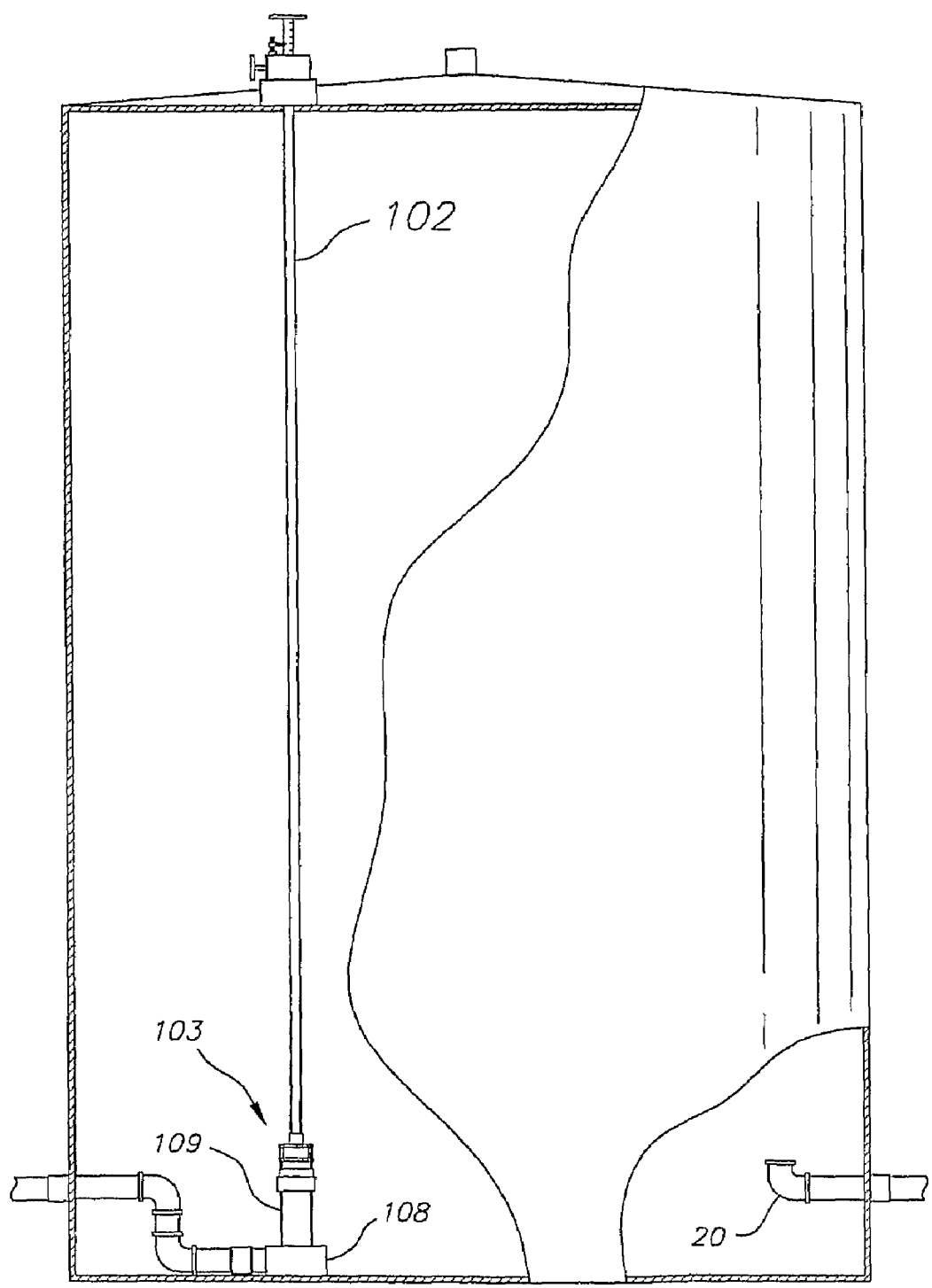
FIG. 38 is a right-side elevation view of a multi-stage adjustable height inlet/outlet tool in a tank with the tank partially broken away and shown in cross-section, in accordance with the present invention.

Oil storage tanks associated with gas wells contain oil above a base layer of sediment and water (BS&W). As the base layer builds up over time, it encroaches upon the outlet of the tank so that clean oil may not be removed. Also, there is a standard for the height of the BS&W relative to the height of the outlet above the bottom of the tank. If the BS&W is within 8 inches of the height of the outlet, then some of the BS&W must be removed before removal of the oil. Alternatively, and in accordance with this invention, a variable height outlet tool may be used to access the desired liquid, such as oil, while keeping the outlet above the undesired liquid or sludge such as the BS&W. A multiple-stage variable height tool with accessories for testing and repair that is useful in accessing a liquid near the bottom of a container and above undesired liquids are shown in FIGS. 38-57. The tool in its fully retracted position is shown in FIG. 38 and in its fully extended position in FIG. 39. The height or the length of the standpipe 9 dictates how close to the bottom the outlet of the tool may be positioned when the tool is fully retracted as shown in FIG. 38. As seen in FIG. 38, the inlet/outlet assembly 103 of the tool is approximately level with the outlet 20 that has been used in the past as the outlet for the container or tank.

Figure 39:
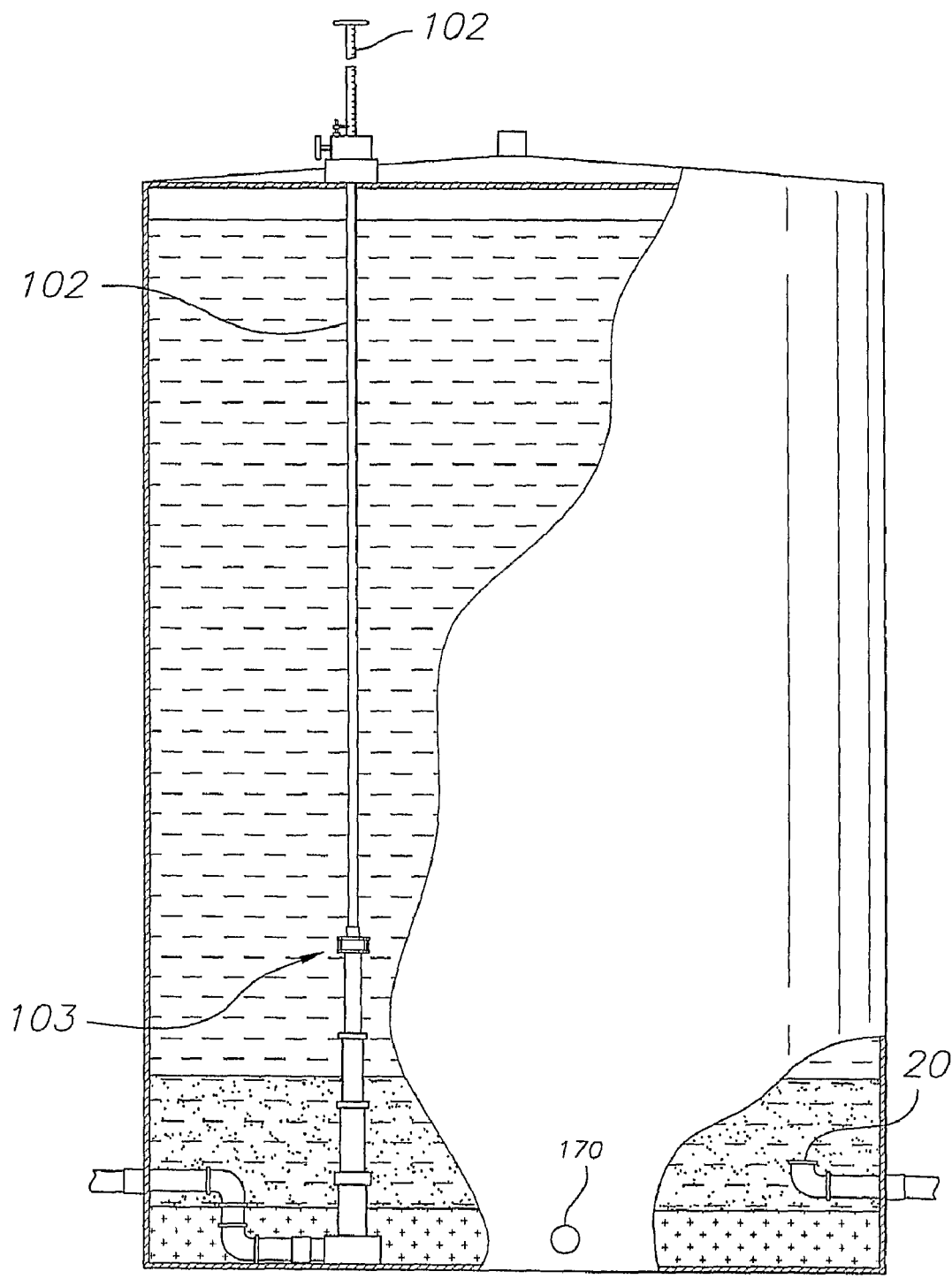
FIG. 39 is a right-side elevation view of the tool with a portion of the wall of the tank broken away to show the levels of stratified liquids in the tank, in accordance with the present invention.
Figure 40:
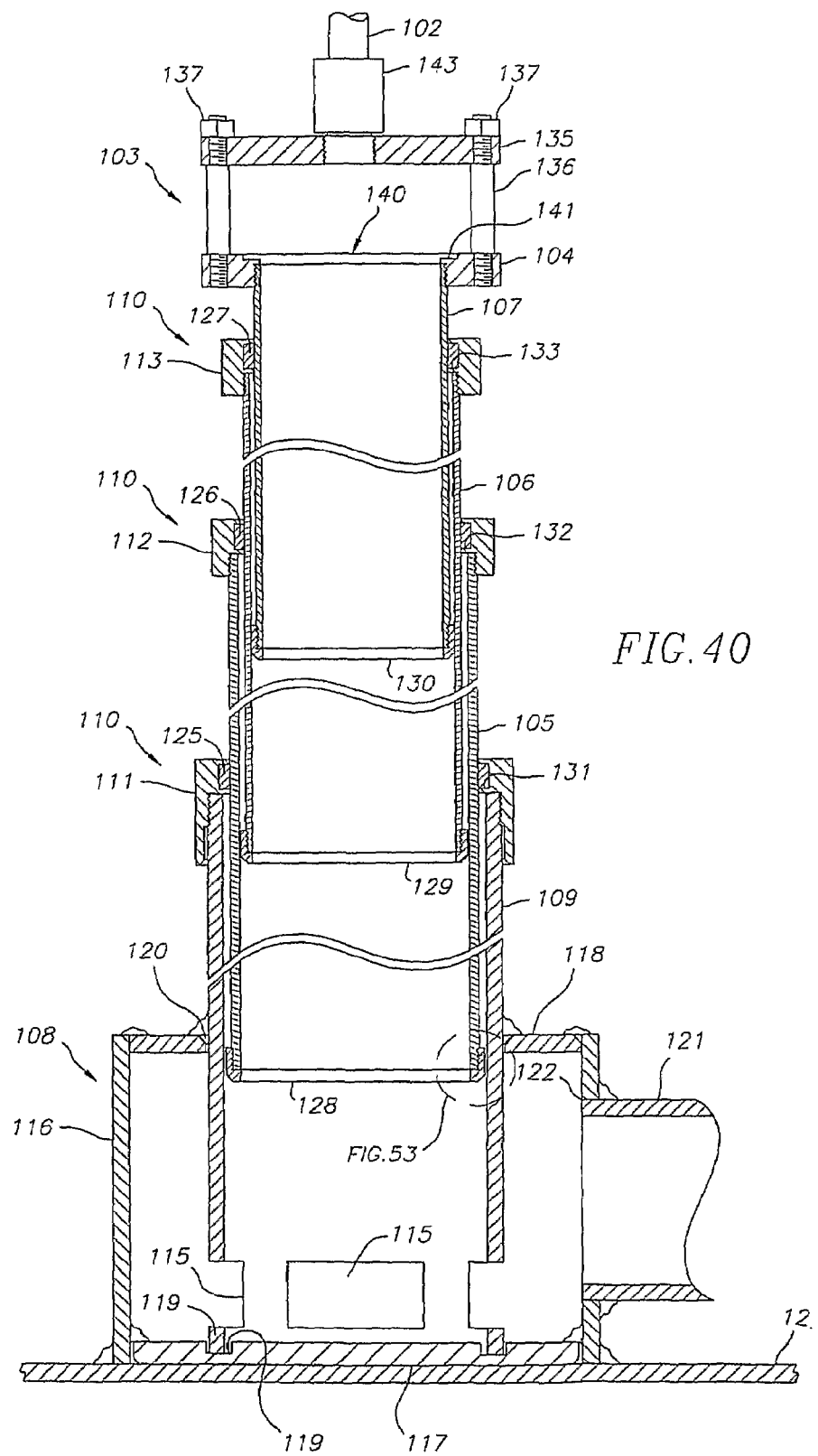
FIG. 40 is a left-side, cross-sectional view of the tool of FIGS. 38 and 39, in accordance with the present invention.
Figure 41:
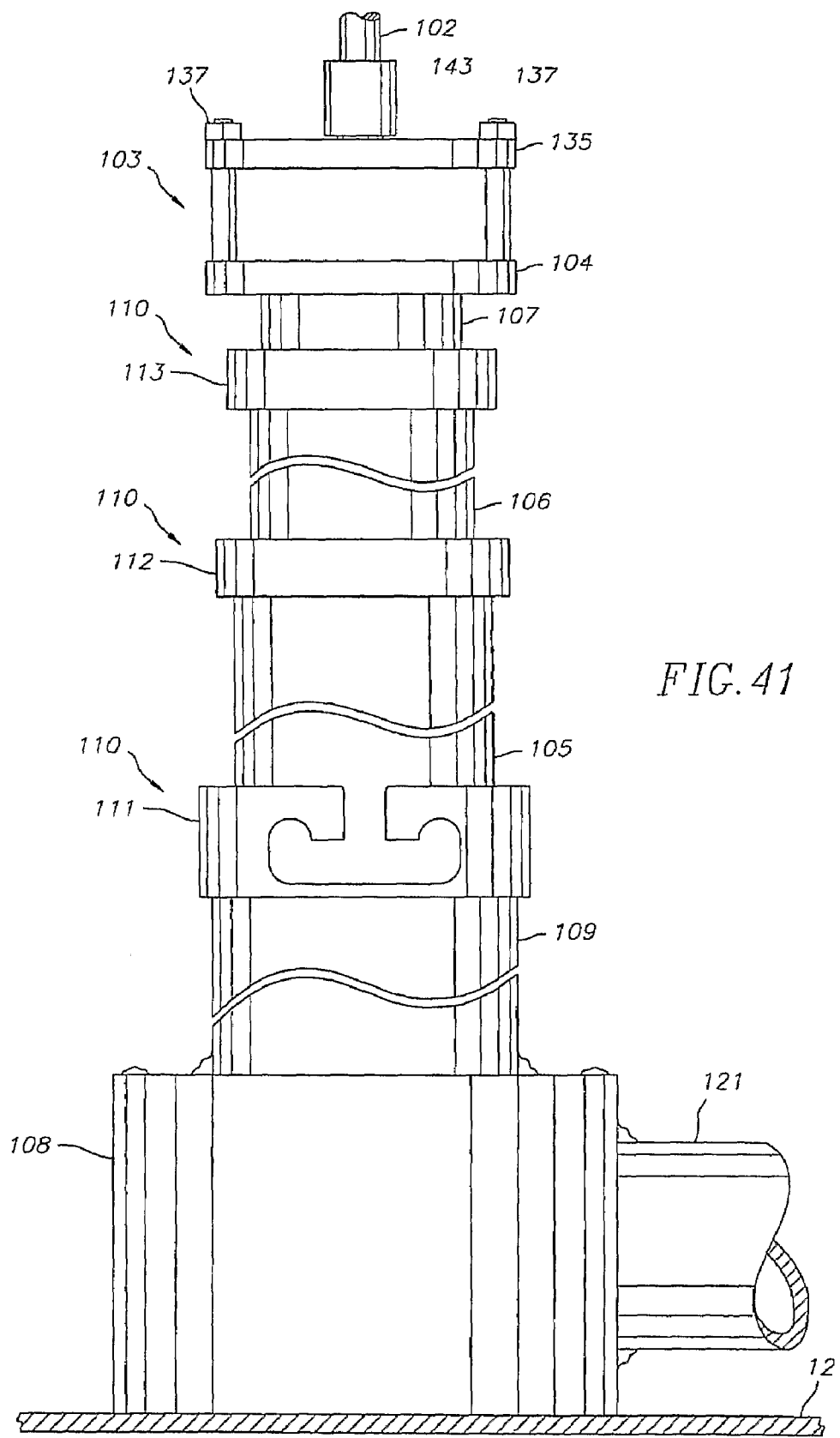
FIG. 41 is a left-side elevation view of the tool of FIG. 40, in accordance with the present invention.
Figure 42:
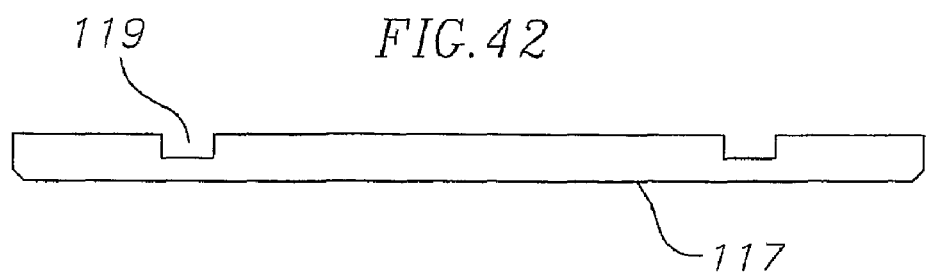
FIG. 42 is an elevation view of the bottom plate of the tool, in accordance with the present invention.
Figure 43:
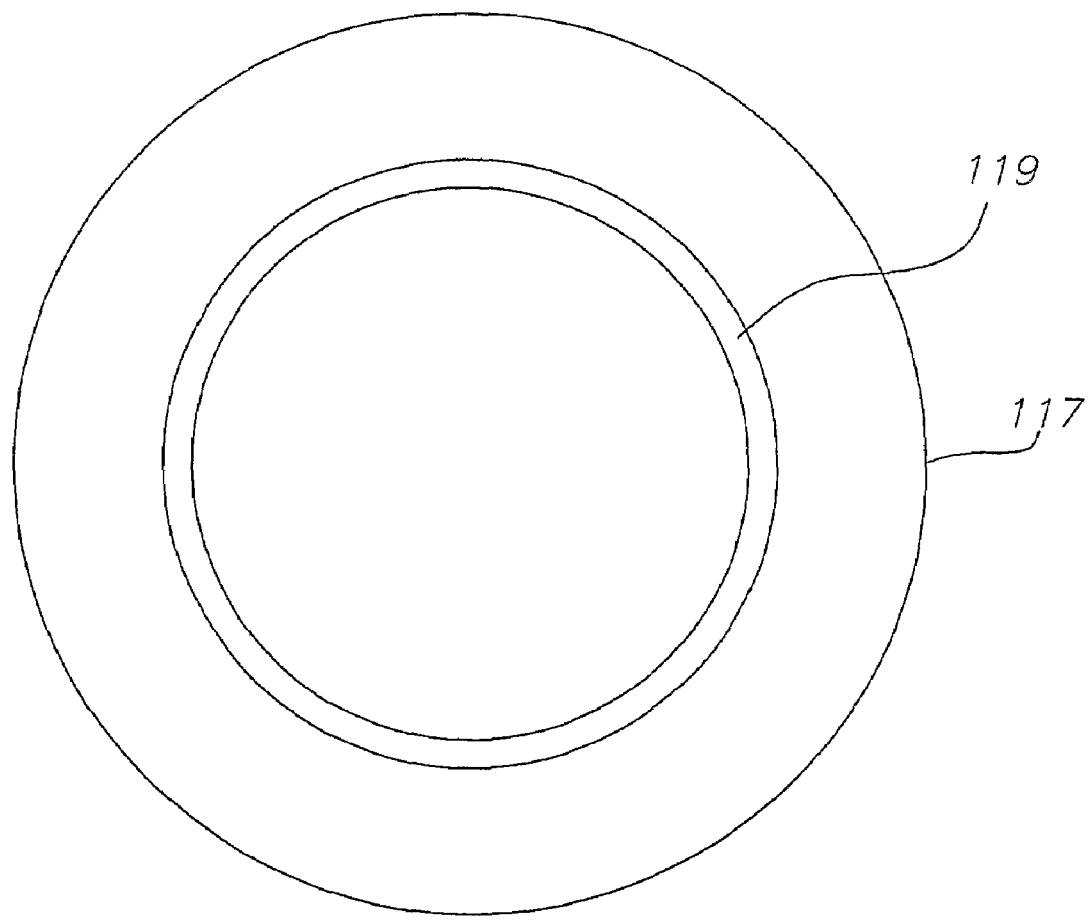
FIG. 43 is a top-plan view of the bottom plate of the tool, in accordance with the present invention.
Figure 46:
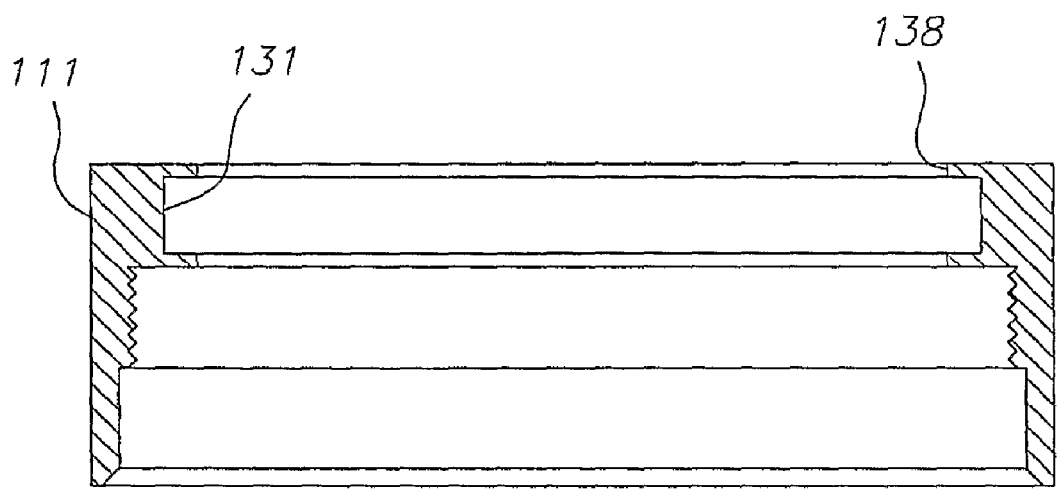
FIG. 46 is a cross-sectional view of the lower seal holder of the tool, in accordance with the present invention.
Figure 47:
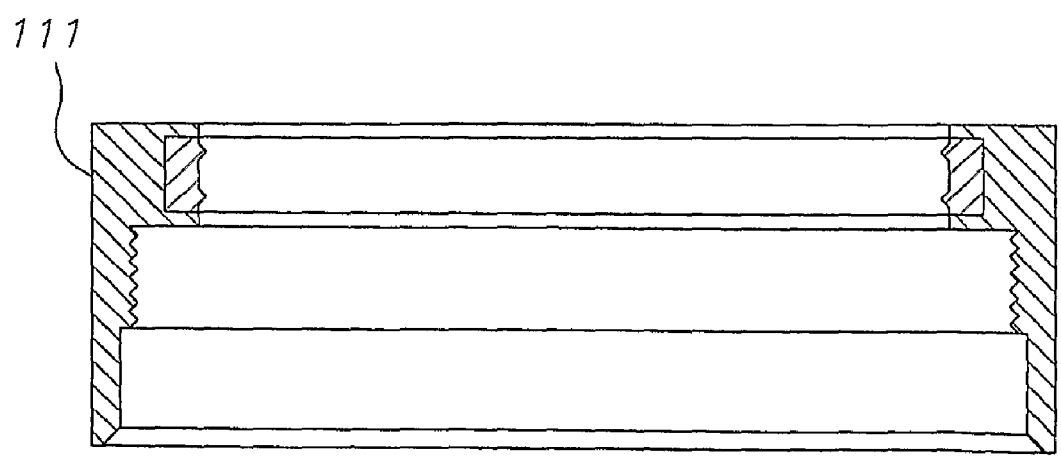
FIG. 47 is a cross-sectional view of the lower seal assembly showing the holder with the seals in place, in accordance with the present invention.
Figure 48:
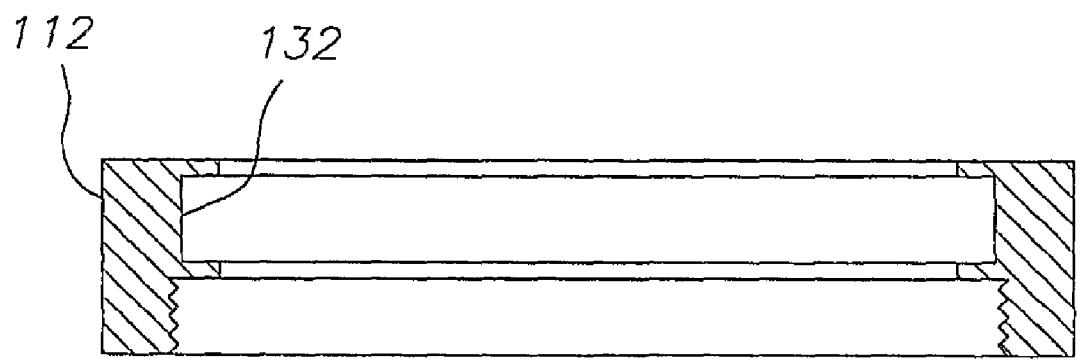
FIG. 48 is a cross-section view of the intermediate seal holder of the tool, in accordance with the present invention.
Figure 49:
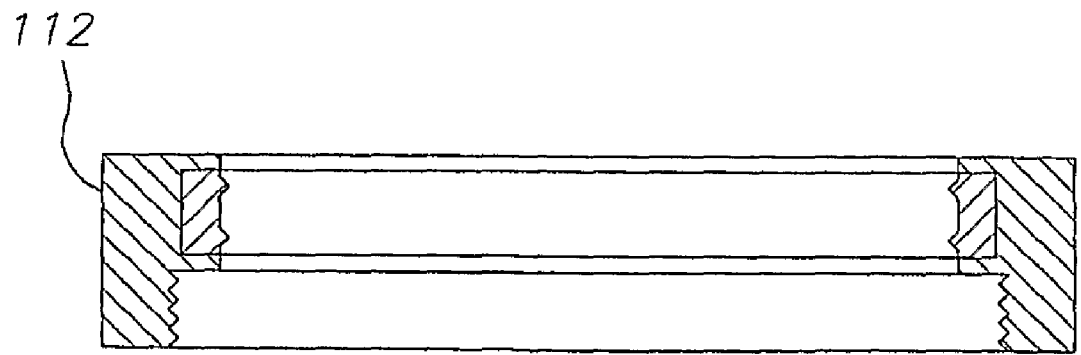
FIG. 49 is a cross-section view of the intermediate seal assembly showing the holder with the seals in place, in accordance with the present invention.
Figure 50:
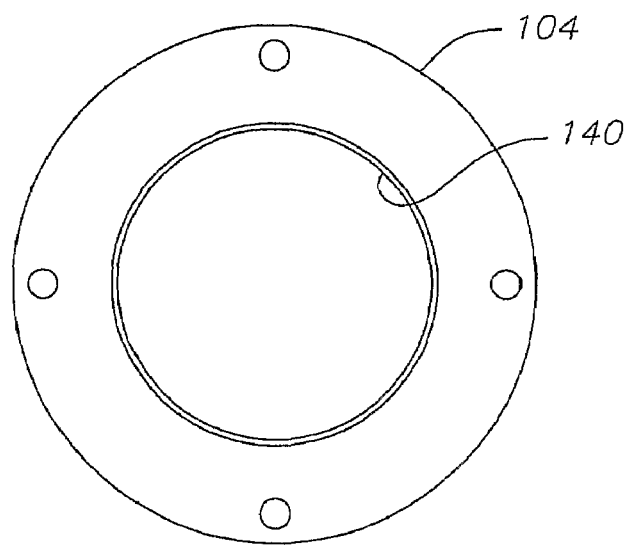
FIG. 50 is a bottom-plan view of the bottom plate of the inlet/outlet assembly, in accordance with the present invention.

The elements of the multi-stage tool are shown in cross section in FIG. 40 and in elevation in FIG. 41. The tool has a standpipe 109 that determines the lowest level for the inlet/outlet assembly 103. A tool designed for use in the bottom of a tank containing oil, as shown in FIGS. 38 and 39, will have a standpipe 109 with a height of about 16 inches. In the present design, the height above the bottom of the floor of the tank is 16½ inches.

For the multi-stage tool, there are three seal assemblies 110. When the height of the seal assembly housings are added to the height of the standpipe and also the height of the lower plate 104 of the inlet/outlet assembly 103, the height of the inlet orifice or outlet orifice will have a range between 20.5 inches at its lowest point and approximately 72 inches at its highest point.

The standpipe 109 is mounted in the heavy cylindrically-shaped transition housing 108. This housing 108 is spot welded to the bottom of the tank to stabilize the standpipe 109 and the tool. The transition housing 108 receives the liquid that enters an outlet orifice 140 in bottom plate 104 of the inlet/outlet assembly 103 through telescoping pipes 105, 106 and 107. The standpipe 109 has openings 115 cut into the walls of the pipe near the bottom of the pipe. There are 4 openings 115 spaced around the circumference of the standpipe 109. The openings 115 together provide a large enough opening into housing 108 so that there is no restriction in the flow of the liquid entering the orifice 140 and passing through tubes 105, 106 and 107. The number of openings may be adjusted as long as the total opening between standpipe 109 and transition housing 108 is large enough to not restrict flow of the selected liquid. The standpipe 109 has an outside diameter of 6.625 inches and an inside diameter of 5.963 inches.

The transition housing 108 has a cylindrical wall 116, a bottom plate 117 and a top plate 118. The lower end of the standpipe 109 fits in a circular slot or recess 119 cut into the top surface of the bottom plate 117. The outer wall of standpipe 109 passes through a hole 120 in the top plate 118 and is welded to the top surface of the top plate 118 to secure the standpipe 109 in place and to stabilize the standpipe 109. A 4 inch I.D. outlet pipe 121 passes through a hole 122 in the wall 116 of the transition housing 108 to carry the liquids from the tool to an outlet on the outside of the container in which the tool is being employed.

Each seal assembly 110 has a removable seal housing. A first removable seal housing 111 is attached to the top of the standpipe 109 by screw threads. The standpipe 109 is made of heavy steel while the first seal housing 111 is made of brass. Brass is employed in critical areas to prevent sparks from being created when the brass is accidentally struck by a piece of steel material in the installation and/or repair of the tool in a container having explosive gases. Similarly, the seal housings 112 and 113 are also made of brass. A singular seal 125 or a plurality of seals are held in place in seal housing 111 and prevent any liquids on top and around the seal housing 111 from entering the standpipe 109. Similarly, seal housings 112 and 113 house singular or plural seals 126 and 127. The seal housing 111, 112 and 113 may also be made of other anti-sparking material, such as, aluminum, bronze, composites and plastic.

The telescoping tubes 105, 106 and 107 are made of aluminum, which is a light-weight material, that makes it easier to telescope the moving parts so that the inlet/outlet assembly 103 may be raised more easily by a height adjustment and measurement rod 102. However, these tubes may also be titanium, stainless steel, carbon steel or other rigid material that will stand-up in the environment. Telescoping tube 105 has an outside diameter of 5.50 inches, telescoping tube 106 has an outside diameter of 4.75 inches and tube 107 has an outside diameter of 4.25 inches. The outside diameter of removable seal housing 111 is 7.062 inches while the outside diameter of seal housing 112 is 6.250 inches and the outside diameter of seal housing 113 is 5.750 inches. The inside diameter of the smallest centered circular opening 138 (FIG. 46) of seal housing 111 is 5.520 inches, the inside diameter of the opening of seal housing 112 is 4.757 inches and the inside diameter of the opening of seal housing 113 is 4.265 inches.

The space 131, 132 and 133 for the seal in each of the seal housings has a height of 0.560 inches and a diameter of 6.00 inches, 5.242 inches and 4.750 inches, respectively. The inside diameter of each seal is the same as the outside diameter of the contacted telescoping tube. A single seal made of Viton Extreme ETP-S, a material provided by DuPont/Dow, is used. This seal is flexible and is easily inserted into the space.

Figure 86:
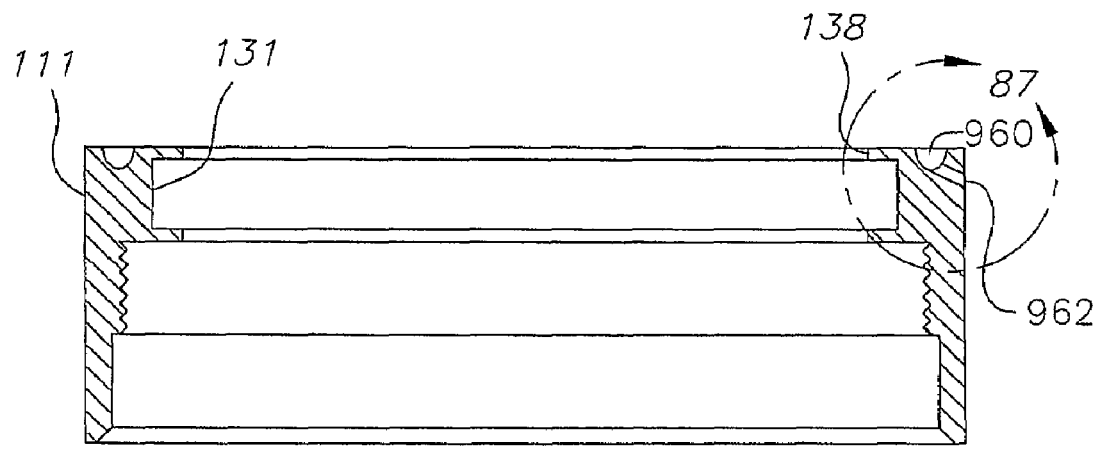
FIG. 86 is a cross-sectional view of a seal housing with a channel, in accordance with the present invention.
Figure 87:
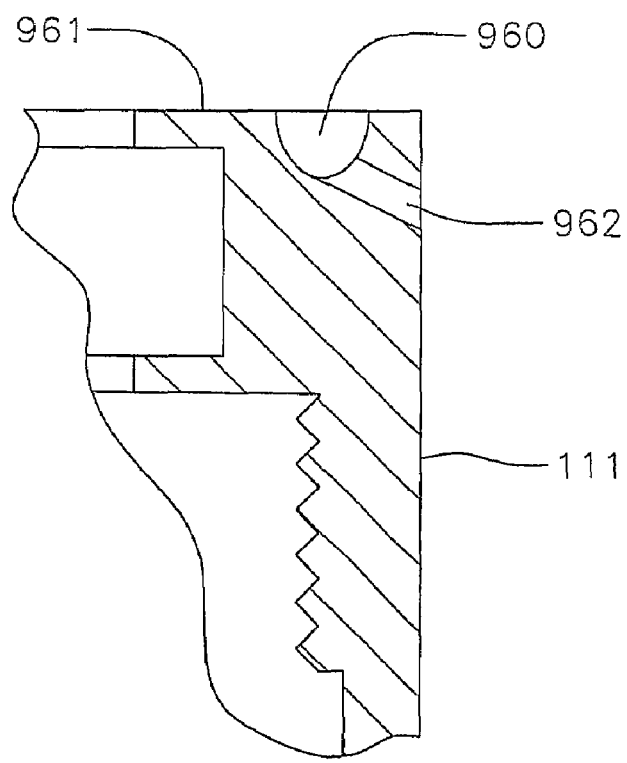
FIG. 87 is an enlarged view of the seal housing of FIG. 86 in the area of a drainage hole, in accordance with the present invention.

The seal housings 111, 112 and 113 are advantageously modified, as shown in FIGS. 86 and 87. Each of these housings, as representatively shown by housing 11 in FIGS. 86 and 87 has a circular groove 960 cut into the top surface 961. This groove is designed to collect and remove liquids and dirt carried by the associated telescoping tube 105.

The collected liquid and dirt is carried from the slot 960 by a plurality of cylindrical holes 962 cut between the bottom of the groove 960 and the outside surface of the housing 111.

Alternative Seals

Figure 73:
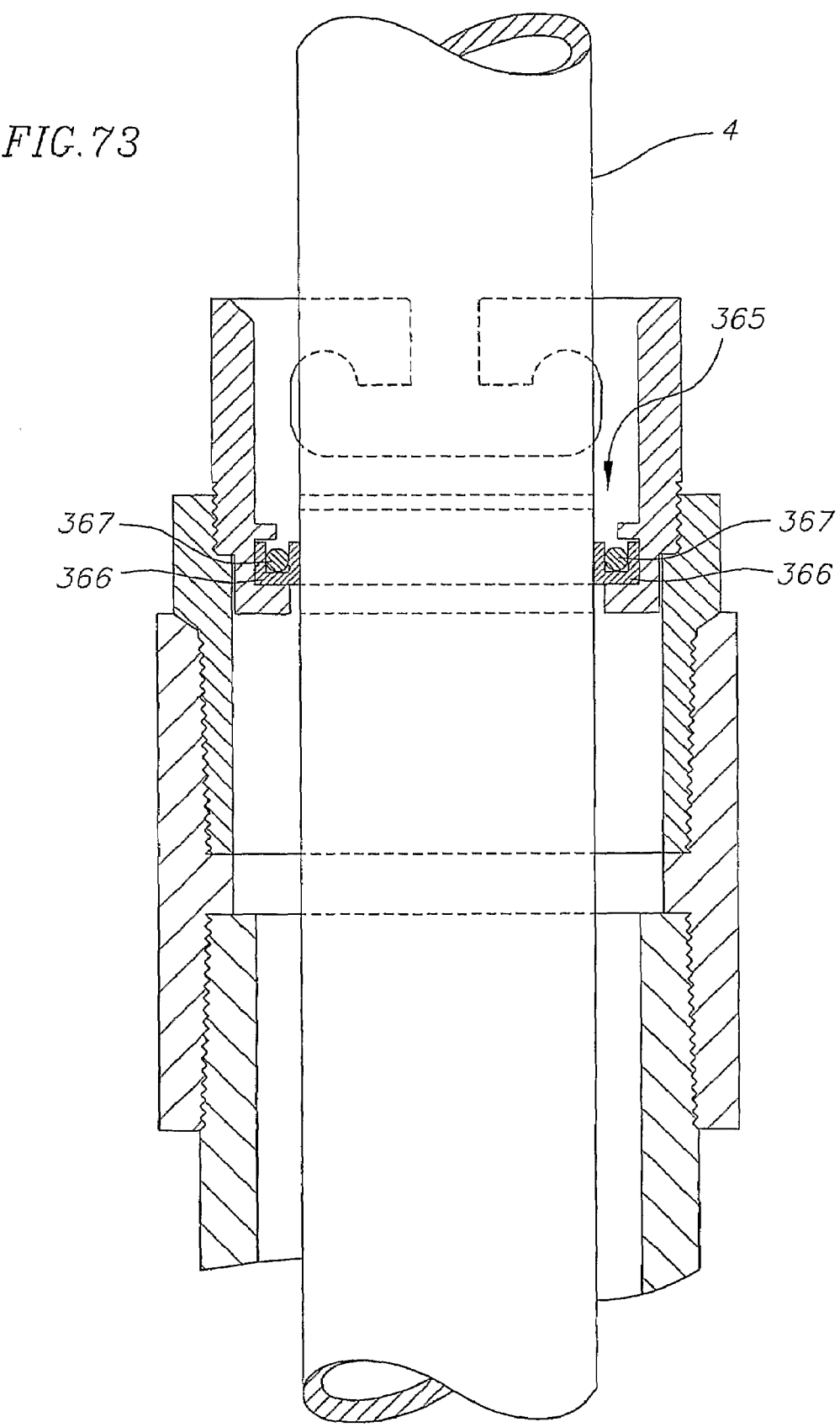
FIG. 73 is a cross-sectioned view of a body of an upper seal assembly with an alternative seal and of a portion of a telescoping tube in elevation, in accordance with the present invention.

One type of seal is shown in FIGS. 19-23 in connection with the single-stage tool. An alternative seal described below may be used in single-stage or multi-stage tools in place of the seals of FIGS. 19-23 or the Viton seal referred to in the proceeding paragraph. A particularly effective seal 365 is shown in FIG. 73. The seal 365 shown in FIG. 73 is a spring loaded seal consisting of two parts; namely, a jacket 366 and energizer 367. Energized seals 365 are available from Saint-Gobain Performance Plastics, 1199 S. Chillicothe Road, Aurora, Ohio 44202, (330) 562-9111 and the 103A series seal from Saint-Gobain (sold under the trademark OmniSeal) may be used. Alternatively, PTFE material is machined to fit and function in the space provided in the seal housings. A spring, an elastomeric o-ring or a helically round ring is used for the energizer 367. Another particularly effective seal, not only seals against liquid flow, but includes conductive material to provide electrical contact between the seal housings and the telescoping tube. Conductive seals are available from Macrotech Polyseal, Inc., Salt Lake City, Utah.

Each telescoping pipe 105, 106 and 107 has a bottom anti-spark or anti-static ring made of brass 128, 129 and 130, respectively. Each brass anti-spark ring 128, 129 and 130 is threaded onto its respective telescoping tube 105, 106 and 107. These anti-spark rings 128, 129 and 130 prevent each of the telescoping tubes from coming out of their respective seal housings 111, 112 and 113 during operation of the tool, since each brass ring will strike the bottom of the respective seal housing and cannot pass through the seal housing.

Brass ring 128 has an outside diameter of 5.980 inches while the seal housing 111 has an inside diameter of 5.520 inches. The outside diameter of brass ring 129 is 5.230 inches while the inside diameter of the seal housing 112 is 4.757 inches. The outside diameter of brass ring 130 is 4.480 inches while the inside diameter of the seal housing 113 is 4.265 inches.

The anti-sparking rings 128, 129 and 130 have a tight fit inside the larger pipe or tube in which its associated pipe telescopes. This is representatively shown in FIG. 53 using lower telescoping tube 105, its anti-spark ring 128, and the standpipe 109 as an example. The movement of the telescoping tube 105 inside standpipe 109 is facilitated by the compressibility of a compression ring 138 that fits in a groove 139 in ring 128. Ring 138 is made of brass or other non-sparking anti-static material and is similar to automotive position rings in design and function. The tightness between the anti-spark ring 128 and the inner diameter of tube 109 in which the telescoping tube 105 moves limits lateral movement of the telescoping tube 105 and improves the stability of the tool. An o-ring 134 is placed in a groove around the top of the outer surface of ring 128 to aid in the seal between the parts.

Figure 88:
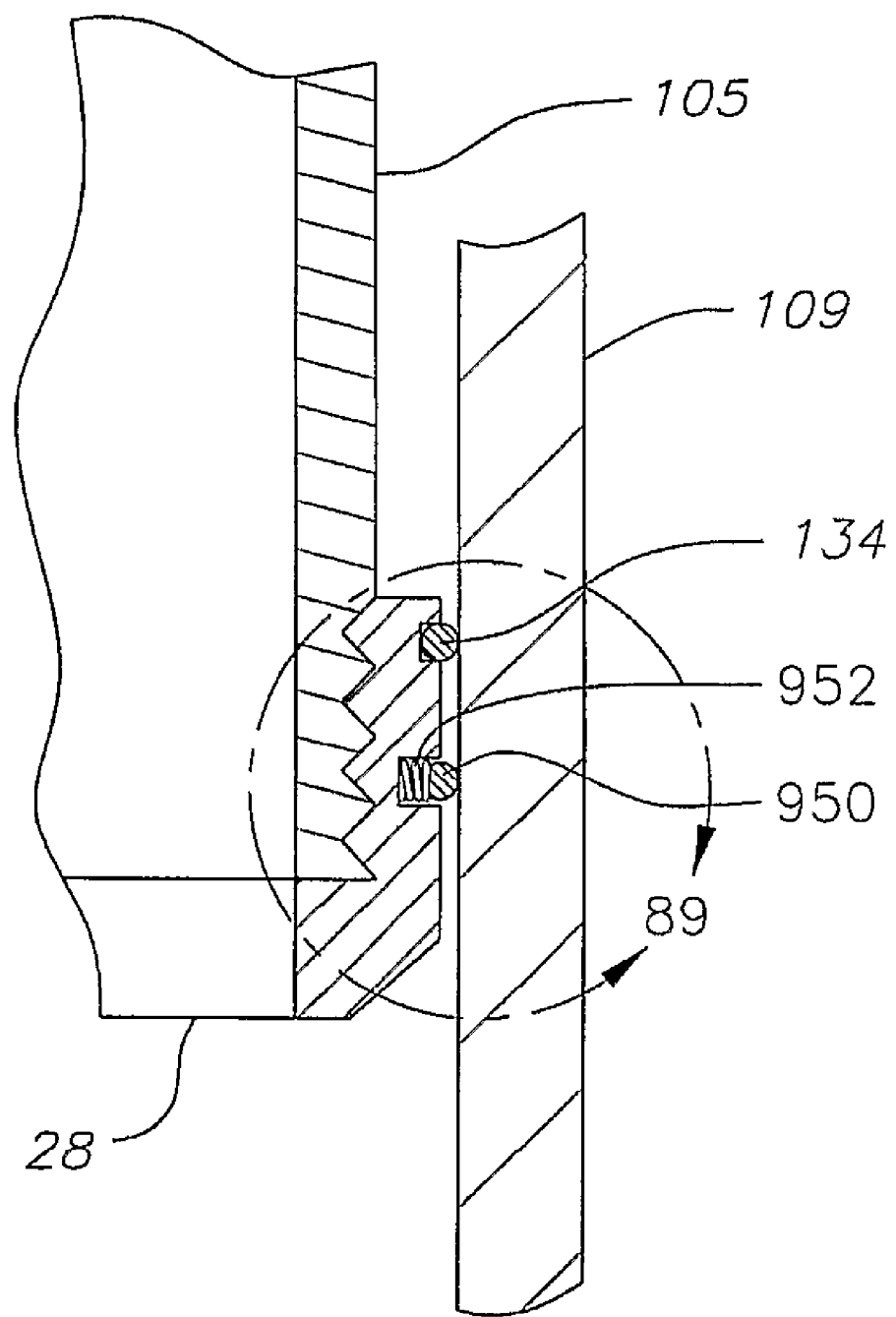
FIG. 88 is a cross-sectional view of the lower end of a telescoping tube inside its outer tube showing an alternative seal, in accordance with the present invention.
Figure 89:
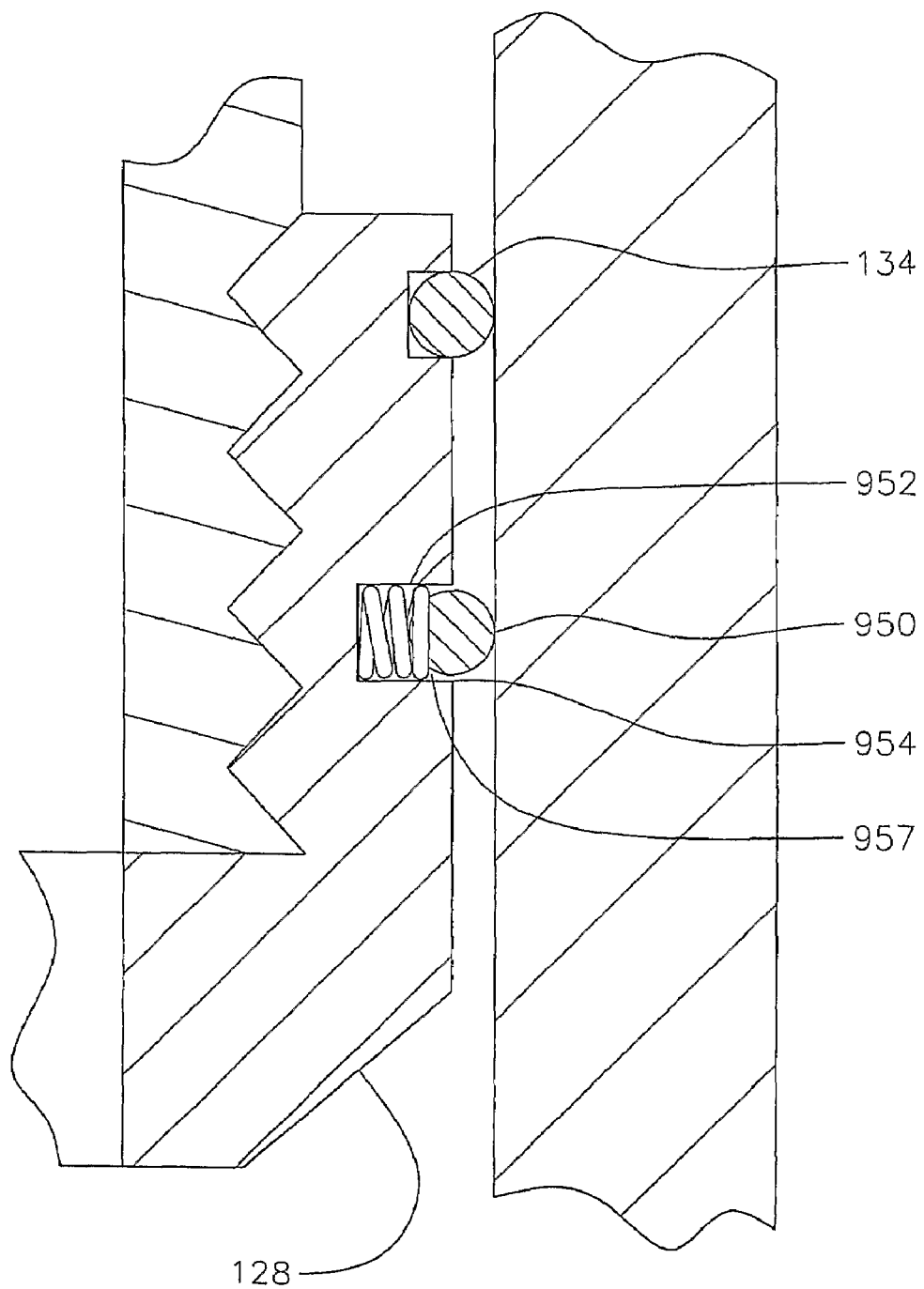
FIG. 89 is an enlarged view of the seal of FIG. 88.

Alternatively, as shown in FIGS. 88 and 89, the compressor ring 138 is replaced by three spring-loaded balls 950, spaced 120° apart in recesses 951 cut into the outer surface of an anti-sparking ring 128, 129 and 130. The spring-loaded balls may be used in each of the anti-sparking rings 128, 129 and 130, or only the bottom ring 128.

A spring 952 sits behind the ball 950 in the recess 951 and pushes the ball 950 outwardly to make physical and electrical contact with the inner surface of tube 109.

Each ball 950 is held in its recess by forcing the lip of each recess in three or more places around the ball 950 into the recess, thus closing the opening into the recess and around the ball.

The balls 950 are preferably made from brass to eliminate the possibility of sparking that might take place with a ferrous material.

Figure 51:
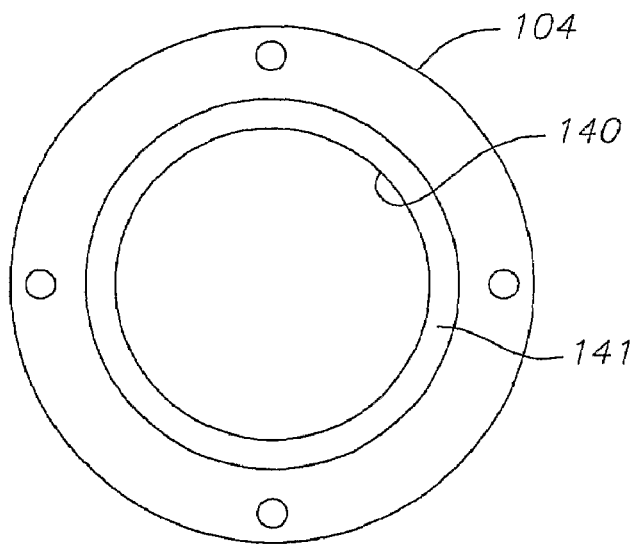
FIG. 51 is a top-plan view of the bottom plate of the inlet/outlet assembly showing the orifice of the tool, in accordance with the present invention.
Figure 52:
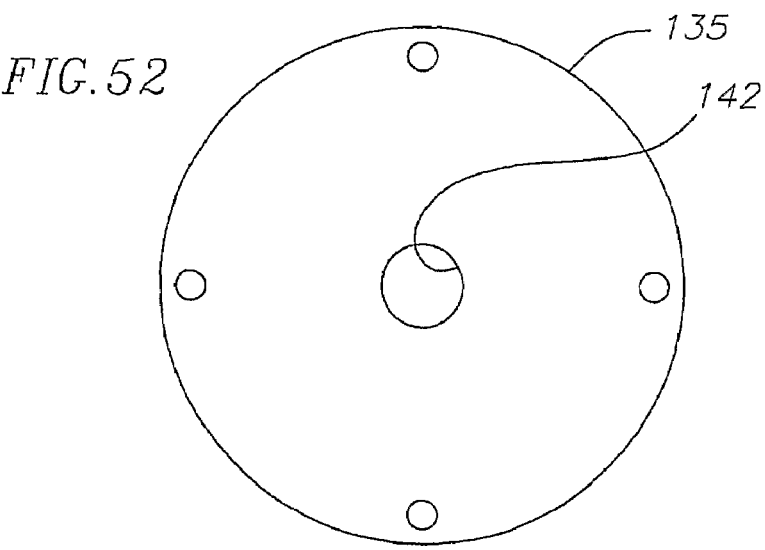
FIG. 52 is a top-plan view of the top plate of the inlet/outlet assembly for attachment of the adjusting rod, in accordance with the present invention.
Figure 53:
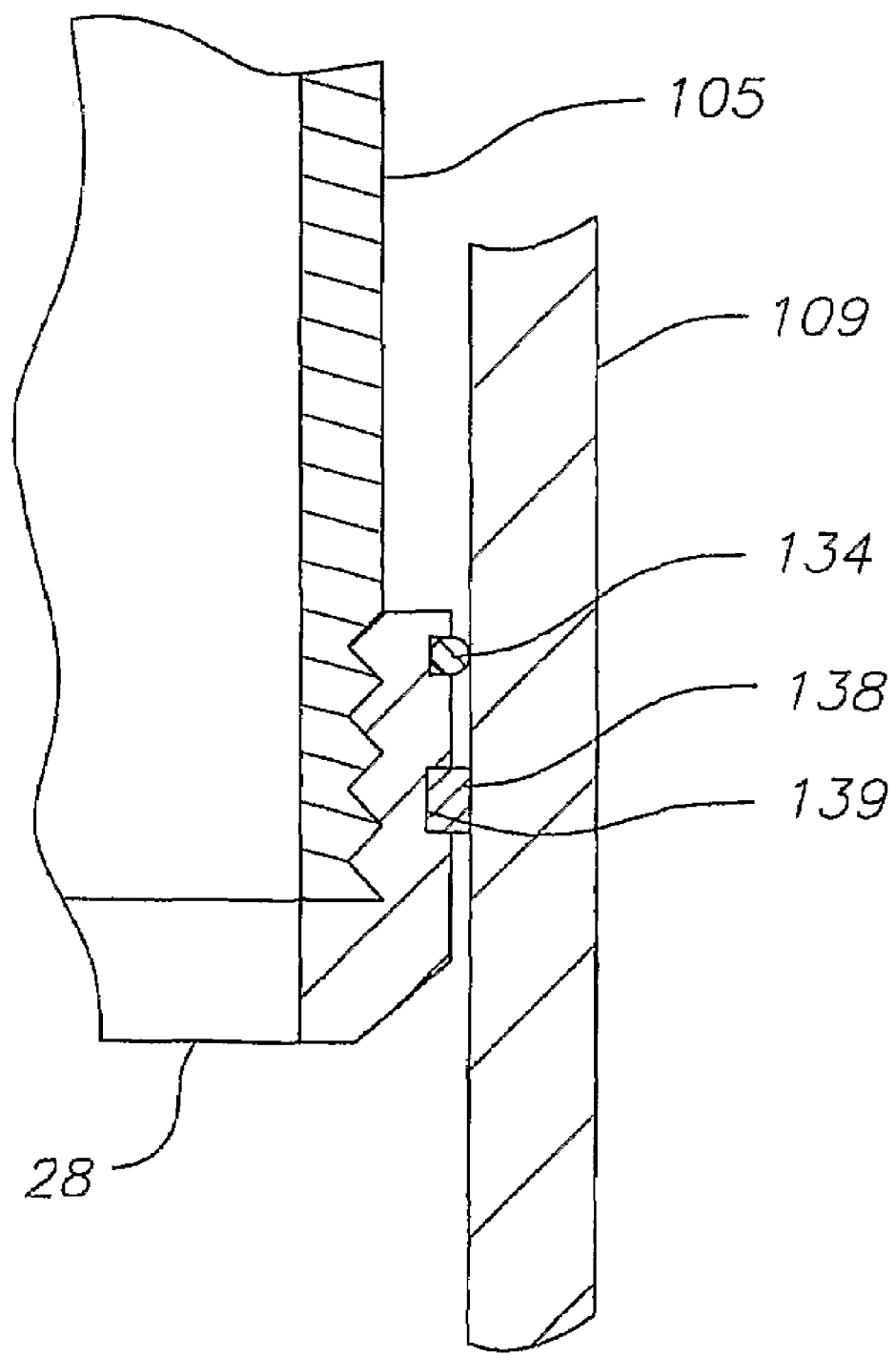
FIG. 53 is a cross-sectional view of the lower end of a telescoping tube inside its outer tube showing the fit and seal, in accordance with the present invention.
Figure 54:
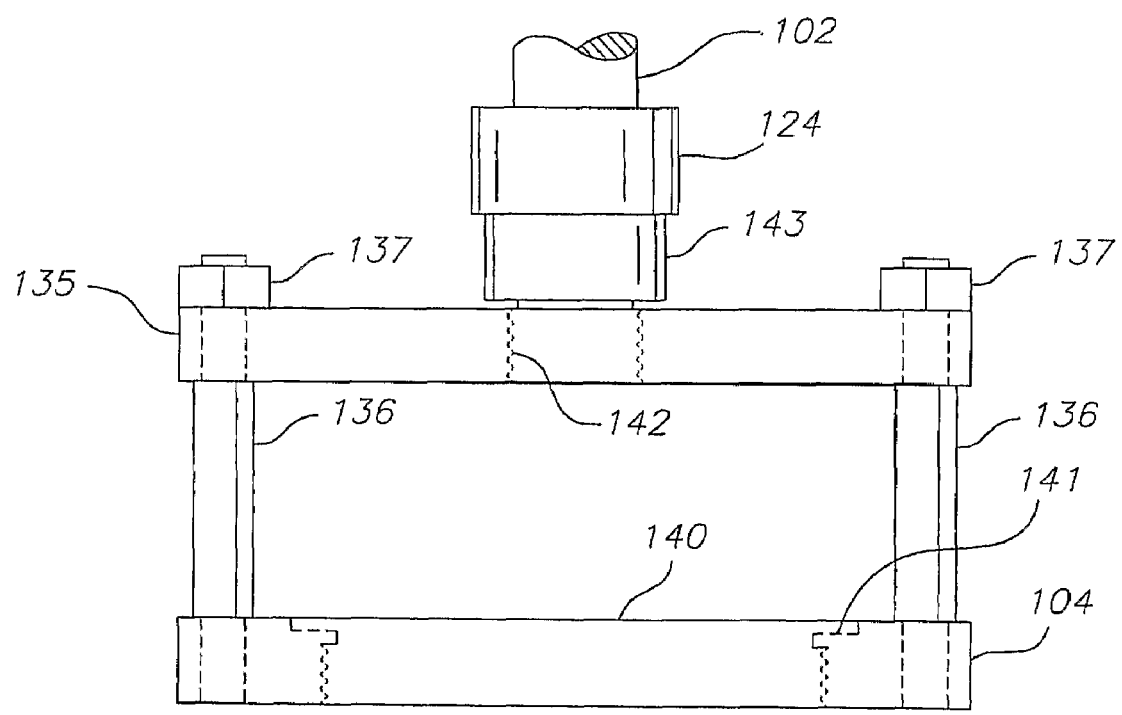
FIG. 54 is an elevation view of the quick connect coupler and the bottom portion of the adjusting rod with the inlet/outlet assembly, in accordance with the present invention.

The inlet/outlet assembly 103 has a lower or bottom plate 104 and a top plate 135 spaced apart and held in place by four bolts 136 spaced 90° apart (two of the bolts 136 are shown in FIGS. 40 and 54). The bottom end of the bolts 136 are threaded into the bottom plate 104 and pass through the top plate 135 with threads that appear above the plate 135. The bolts 136 are secured in place by nuts 137 on the top of plate 135. The bottom plate 104 carries the outlet orifice 140 as best seen in FIG. 51. Bottom plate 104 has a circular indentation or recess 141 for receiving and holding screens or other filtration devices across the top of the orifice 140. It is to be noted that the orifice 140 may be an outlet orifice or an inlet orifice depending upon the use of the tool. The lower plate 104 is also made of brass as an anti-sparking element. The bottom plate 104 has an outside diameter of 6.625 inches and a height of 0.725 inches, with an outlet orifice diameter of 4 inches. The recess or shelf 141 has an outside diameter of 4.75 inches with an inside diameter that corresponds to the diameter of the orifice and is 0.112 inches in depth.

The top plate 135 is also made of brass and has a thickness of 0.625 inches and an outside diameter of 6.625 inches. The top plate 135 has a center opening 142 with a diameter of 1.047 inches to receive a quick release coupling 143 screwed into threads in opening 142. Coupling 143 couples the height adjustment and measurement rod 102 to the inlet/outlet assembly 103 to provide elevational movement of the inlet/outlet assembly 103 and the orifice 140, inside the container. The plates 104 and 135 may also be made of lighter weight material, such as aluminum.

Figure 55:
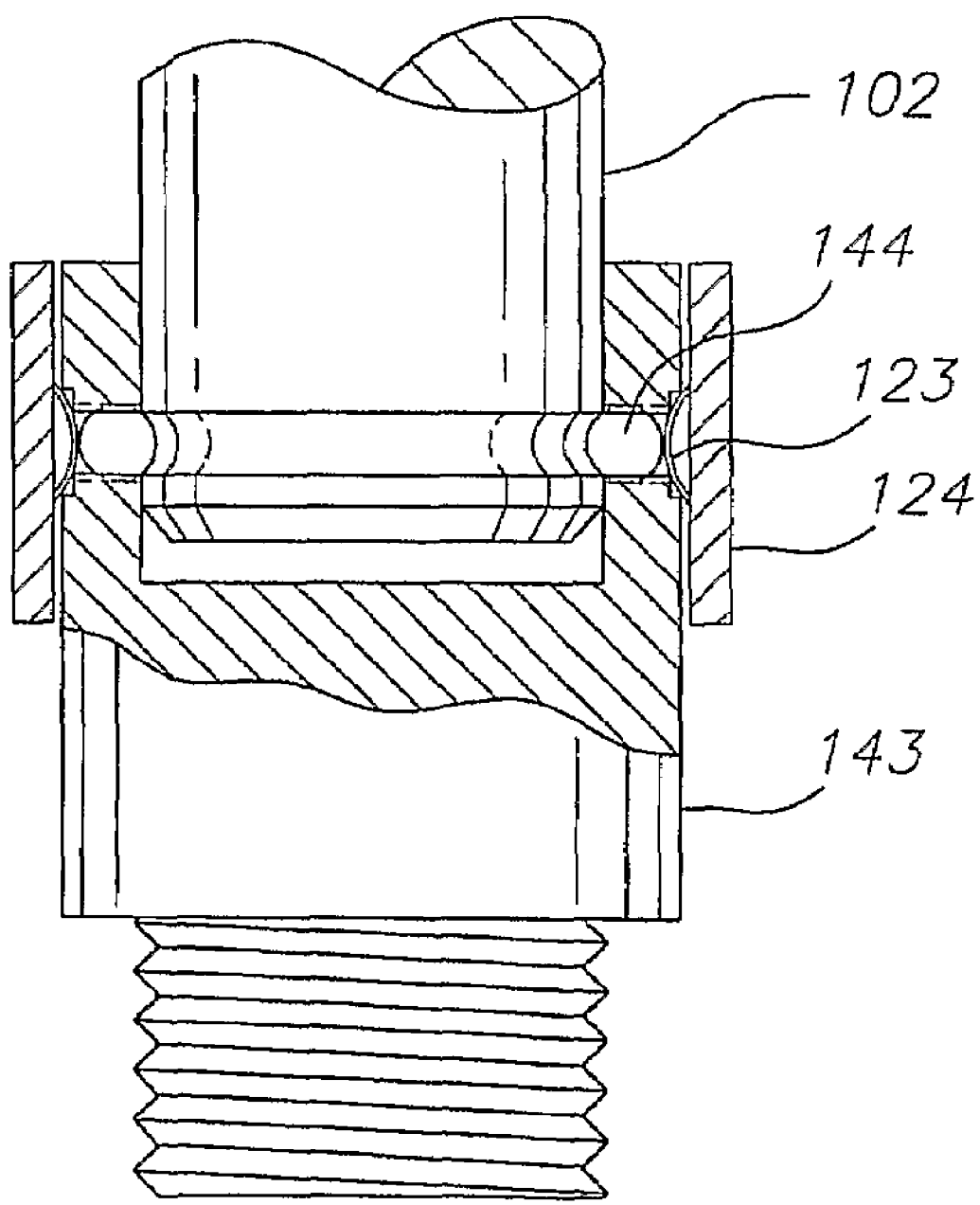
FIG. 55 is an elevation view, partially in cross-section, of the quick coupler and the bottom portion of the adjusting rod, in accordance with the present invention.

A height adjusting rod 102 is attached to the inlet/outlet assembly 103 by a quick release coupling 143 as shown in FIG. 55. The coupling 143 has a plurality of ball bearings 144 that are spring loaded to hold rod 102 in place while permitting rotational movement. The coupling has a collar 124 that is depressed to unload the bearings 144 and to release the rod 102.

Most tanks presently used in gas fields have a four inch OD opening at the top that is used for installing and removing the seal assemblies of the tool and for adjusting the inlet/outlet of the tool. There is also a hatch that is larger for accessing the inside of the tank. When the parts of the tool are larger than four inches OD, they are inserted and removed through the hatch and are attached to or removed from an installation/removal rod that is passed through the four inch opening.

The tubes of the tools are made as large as possible to increase the flow rate in and out of the tank to reduce agitation of the liquids and to reduce the time required for transfer of a liquid from the tank.

Figure 56:
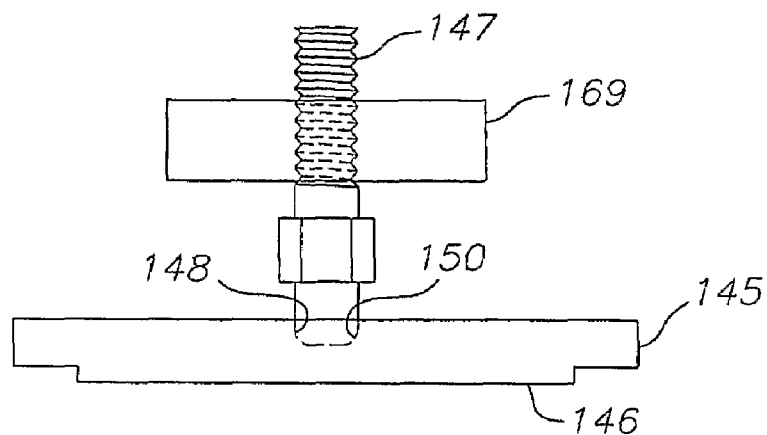
FIG. 56 is a side-elevation view of a locking device for use in testing the seals of the tool, in accordance with the present invention.
Figure 57:
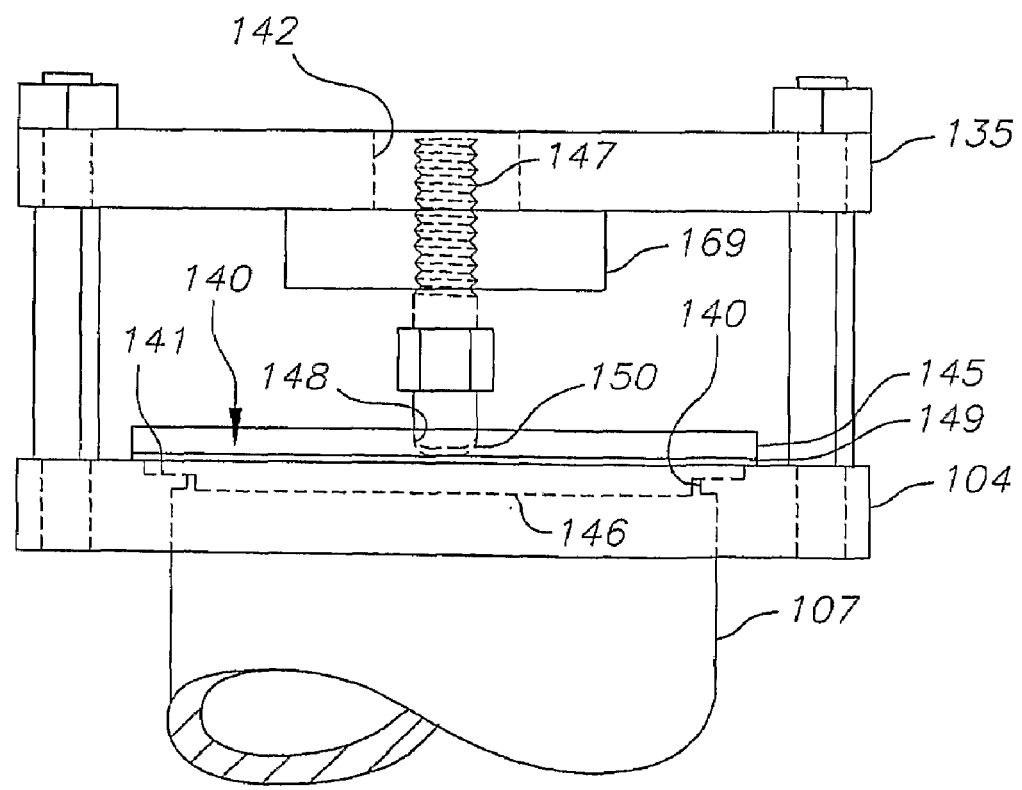
FIG. 57 is an elevation view of the testing device in place for testing the seals of the tool, in accordance with the present invention.

A test device to be placed in the inlet/outlet assembly 103 is shown in FIG. 56 and is shown in place in FIG. 57. A central bottom portion 146 of a plate 145 fits into the orifice 140 and seals the orifice 140. A bolt 147 with a rounded bottom 150 fits into a rounded recess 148 in the top surface of plate 146 and holds the plate in place against the top surface of plate 140 in cooperation with an oversized nut 169 that is threaded and screwed up against plate 135. The overall height of the testing device shown in FIGS. 56 and 57 is compatible with the spacing between the top plate 135 and the bottom plate 104 of the inlet/outlet assembly 103. A gasket 149 is placed between the plate 145 and plate 104 to effect an air tight seal for testing the seals in the tool.

Figure 10:
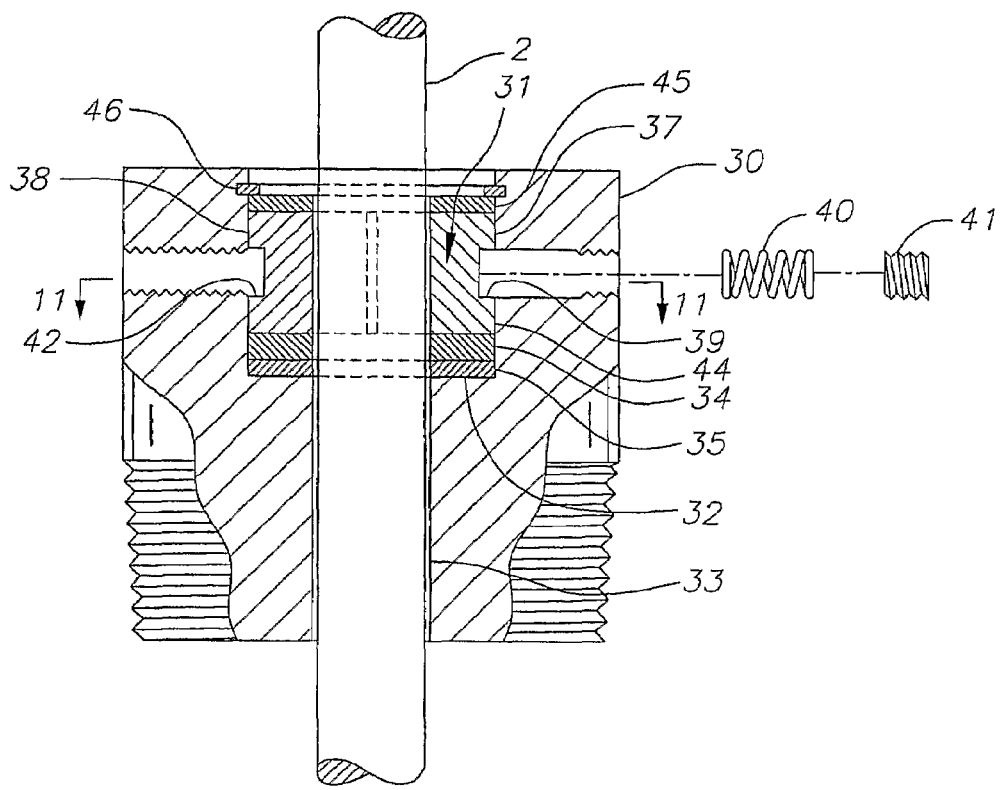
FIG. 10 is a right-side view of the body of the gauge and locking assembly, with a portion of the main body in cross section, showing the locking mechanism, in accordance with the present invention.

The adjustment and measurement of the position of the inlet/outlet assembly 3 of the single-stage tool (FIGS. 5-37) and the inlet/outlet assembly 103 of the multi-stage tool (FIGS. 38-57) is accomplished manually with the device shown in FIGS. 8-10 and in FIGS. 54 and 55.

Figure 58:
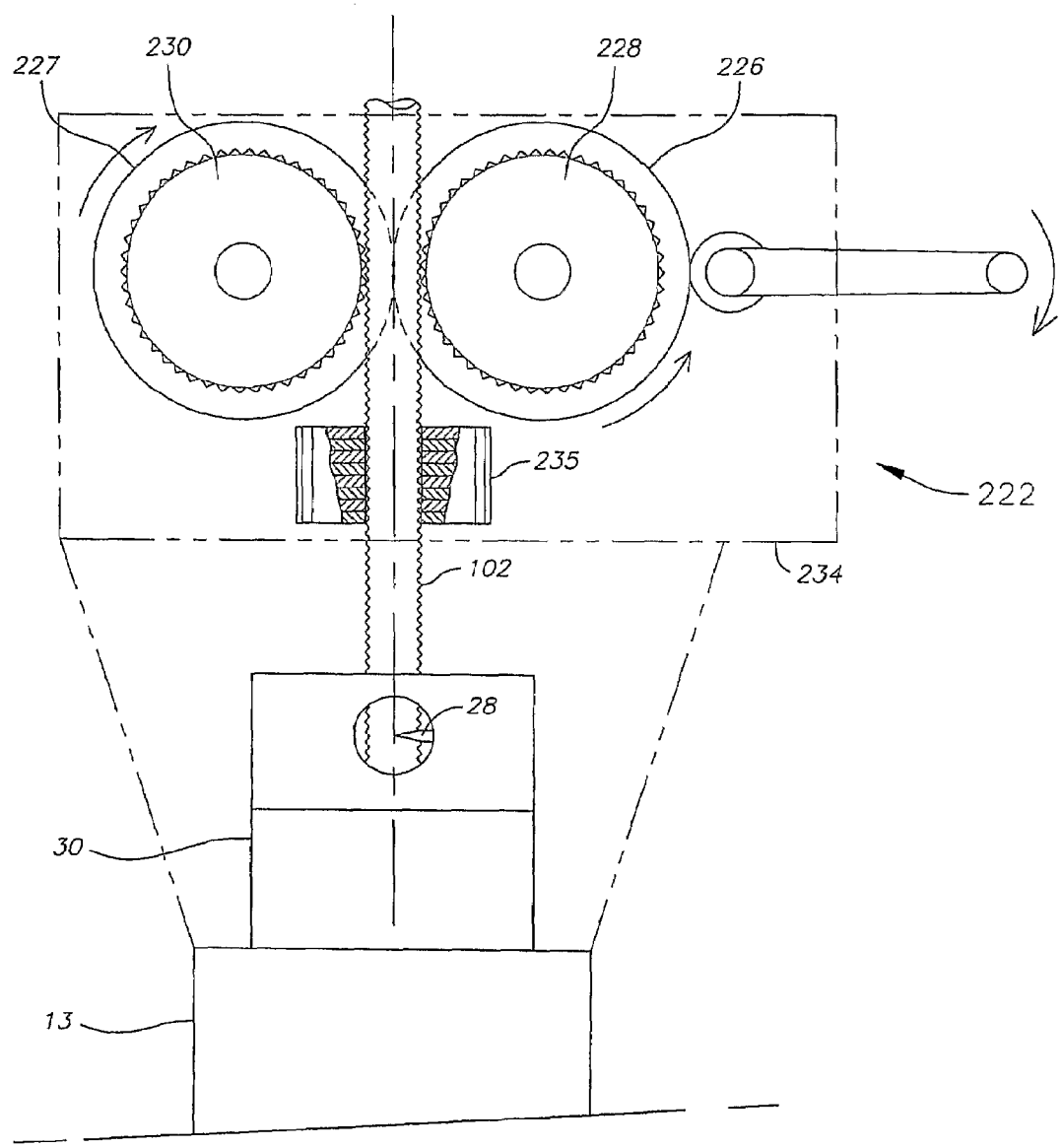
FIG. 58 is a front-elevation view of a crank and gear mechanism for adjusting the height of the inlet/outlet orifice of a tool, in accordance with the present invention.
Figure 59:
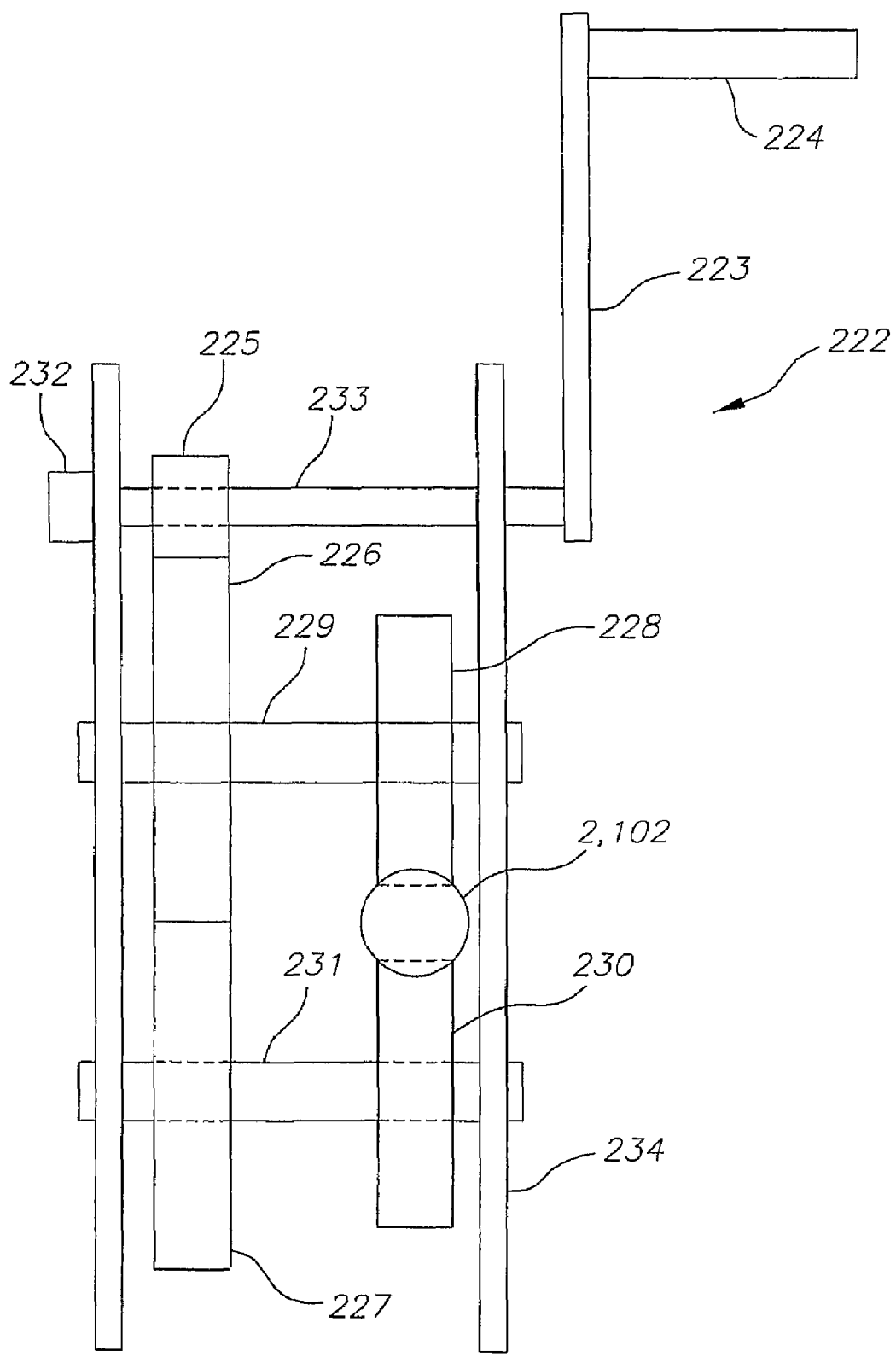
FIG. 59 is a top-plan view of the gear mechanism of the tool of FIG. 59, in accordance with the present invention.
Figure 60:
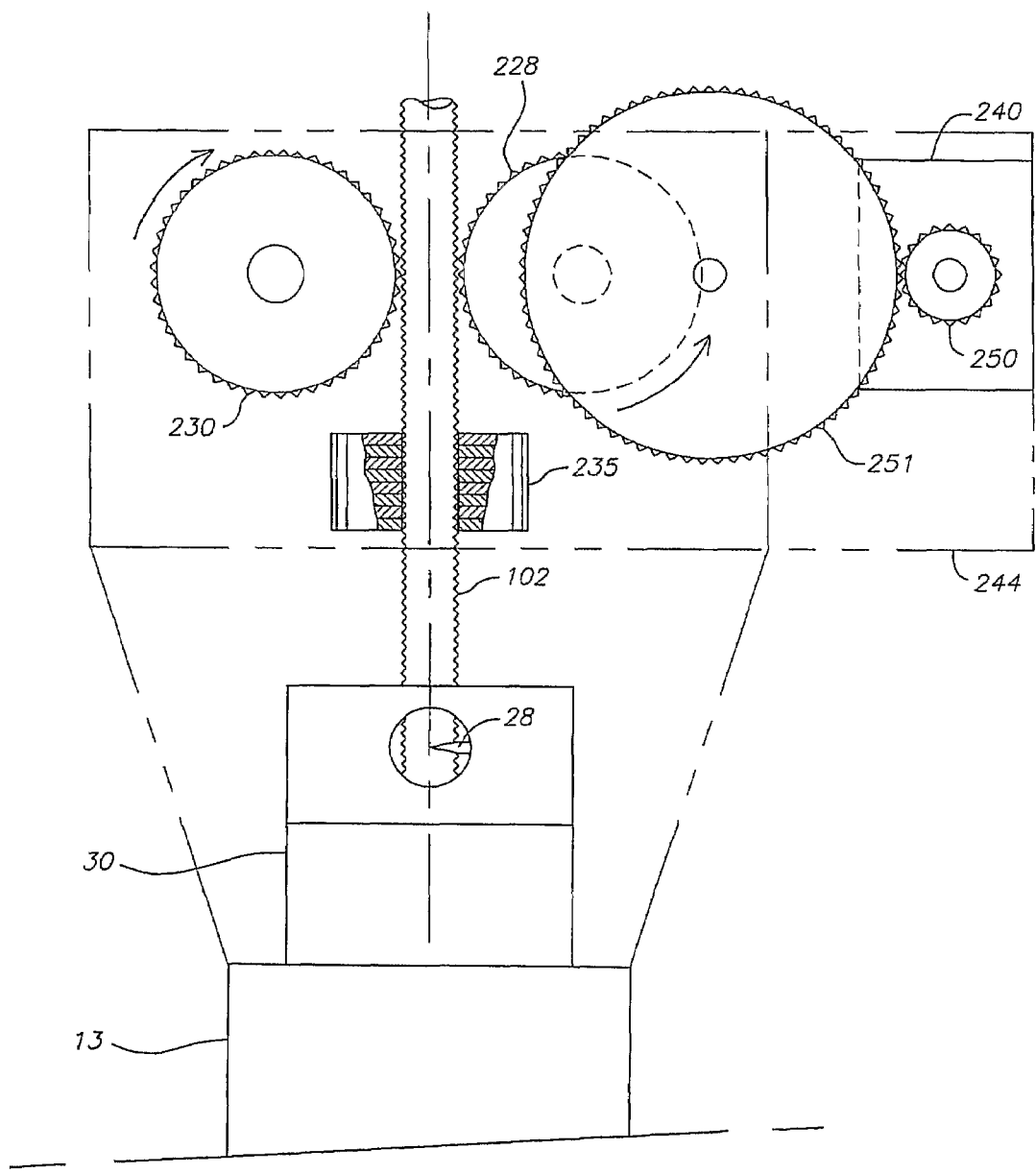
FIG. 60 is a front-elevation view of a motor driven gear mechanism for automated adjustment of the height of the inlet/outlet orifice of a tool, in accordance with the present invention.

The adjustment of the height of the orifice 50 or 140 is simplified by a gear mechanism with crank shown in FIGS. 58 and 59. A crank and gear assembly 222 is installed on top or above the mounting block 13 and body 30 of the gauge and locking assembly 1. The crank and gear assembly 222 is supported from the mounting block 13 or the body 30. The crank and gear assembly 222 includes a crank with an arm 223 and a handle 224. The crank rotates a first gear 225 that engages a first gear 226 of a pair of gears 226 and 227. Gear 226 drives gear 227 in the opposite direction as gear 226 is driven. That is, if gear 226 rotates clockwise, gear 227 rotates counter clockwise. There is a smaller gear 228 on the same axle 229 as gear 226. Another gear 230 is attached to the axle 231 on which gear 227 is mounted. Gears 228 and 230 engage opposite sides of the adjusting and measuring rod 2 or 102 to provide balanced pressure to the rod while the rod is being moved up or down. For this purpose, the rods 2 and 102 have indentations or gear teeth that are engaged by the gears 228 and 230. As an alternative to the graduated marks on the rods 2 and 102, which a person reads to determine the position of the orifice, a reader 232 is attached to the axle 233 that is turned by the crank, consisting of arm 223 and handle 224. As the crank turns the axle 233 the movement is read and recorded by recorder 232. The reader/recorder 232 is calibrated to read and record the exact height of the orifice 50 or 140 in the container. The exact height may be read out of reader/recorder 232 by a digital display or by a hand held interrogator that is carried by an operator on the ground, near the bottom of the tank. In this way, an operator on the ground can read the output of a level determining device and the output of the recorder/reader 232 to determine whether the height of the inlet/outlet assembly needs to be adjusted to remove a selected liquid or to add material to a selected liquid in the tank.

An alternative gear arrangement that has many advantages over a typical rack and gear arrangement is shown in FIGS. 74-79. For an adjusting rod 2 or 102 that has a one inch OD Woodruff-type cuts or crescent shaped slots 405 are ground on a radius that corresponds to the radius of teeth or Woodruff-type crescent tabs 406 formed on two gears 407 and 408. (Gear 407 is on the left in the front elevation view of FIG. 74 and gear 408 is on the right). The slots 405 are cut on a radius with a one-quarter inch depth and a one-quarter inch width on diametrically opposite sides of the rod, as best seen in the cross-sectional view of FIG. 76 taken along section lines 76-76 shown in FIG. 75.

Figure 11:
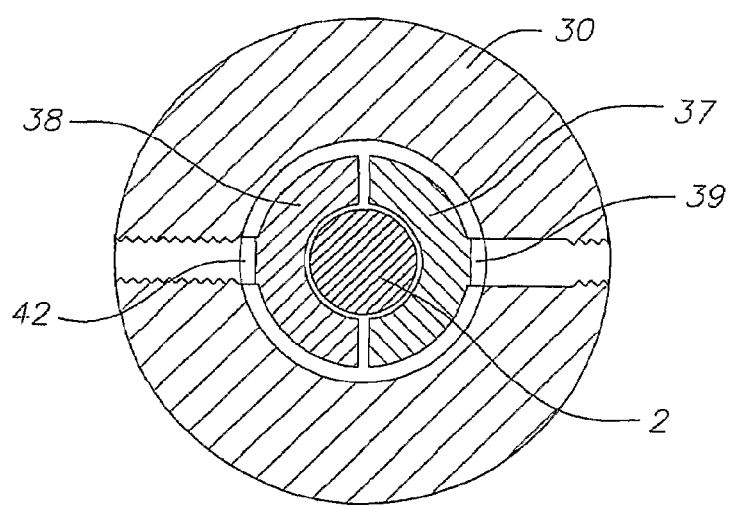
FIG. 11 is a cross-section view from the top along the section lines 11-11 of the gauge and locking assembly shown in FIG. 10, in accordance with the present invention.
Figure 12:
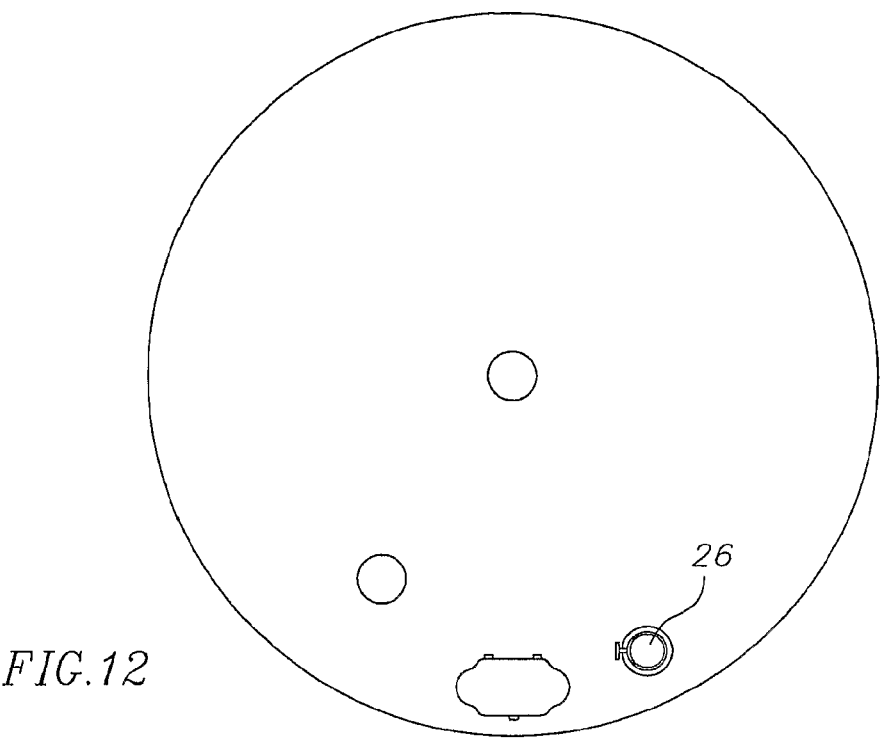
FIG. 12 is a top-plan view of a tank with the adjustable height apparatus installed, in accordance with the present invention.

The resultant gear assembly of FIGS. 74-79 provides an excellent seal when using the seal arrangement of FIGS. 10 and 11. Because of the relative smoothness of the rod, there is less wear on the seals for longer life of the seals. The slots 405 being cut on a radius have excellent drainage to keep the openings of the slots 405 clean for engagement by the tabs or teeth 406 on the gears 407 and 408. The rigidity and strength of the rod is little affected by the shallow slots 405.

Figure 74:
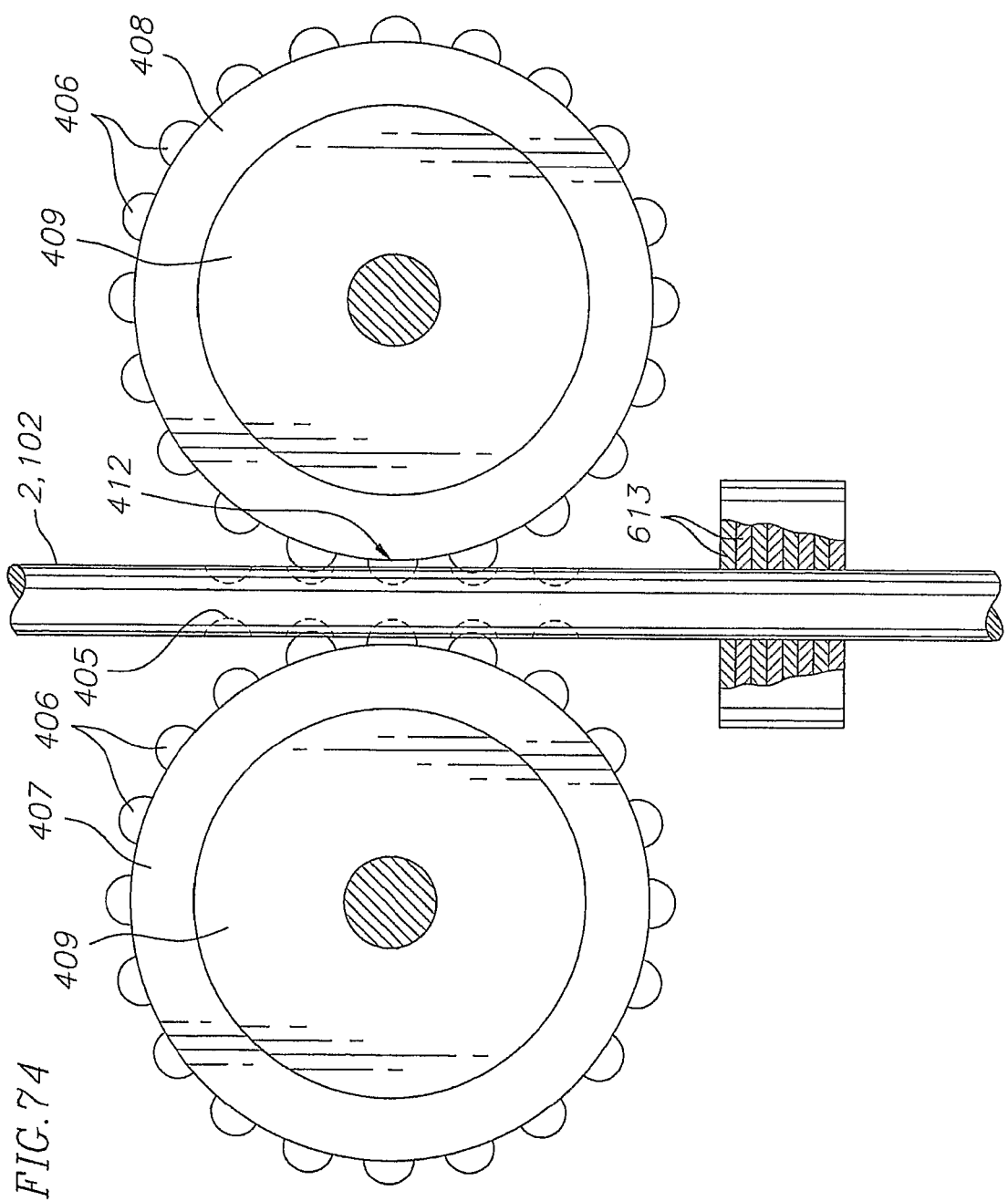
FIG. 74 is a front elevation view of an alternative gearing arrangement for adjusting the height of an orifice, in accordance with the present invention.
Figure 75:
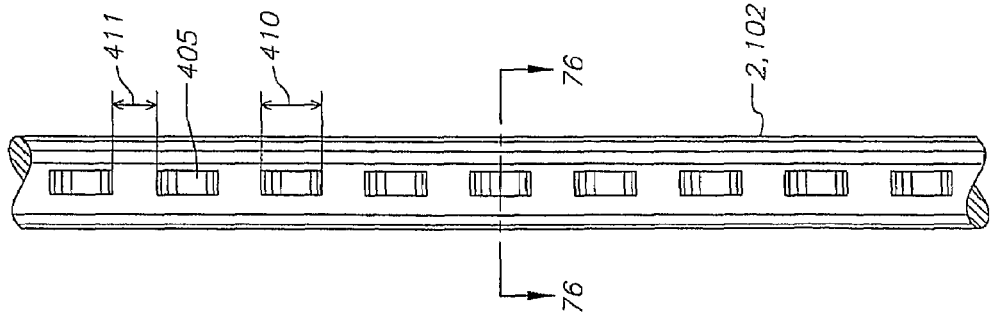
FIG. 75 is a right-side elevation view of the adjusting rod, in accordance with the present invention.
Figure 76:
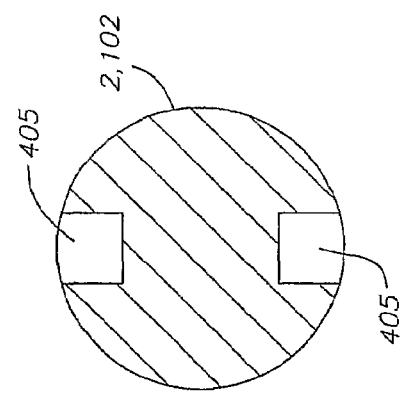
FIG. 76 is a cross-sectional view along section lines 76-76 of the rod shown in FIG. 75, in accordance with the present invention.
Figure 77:
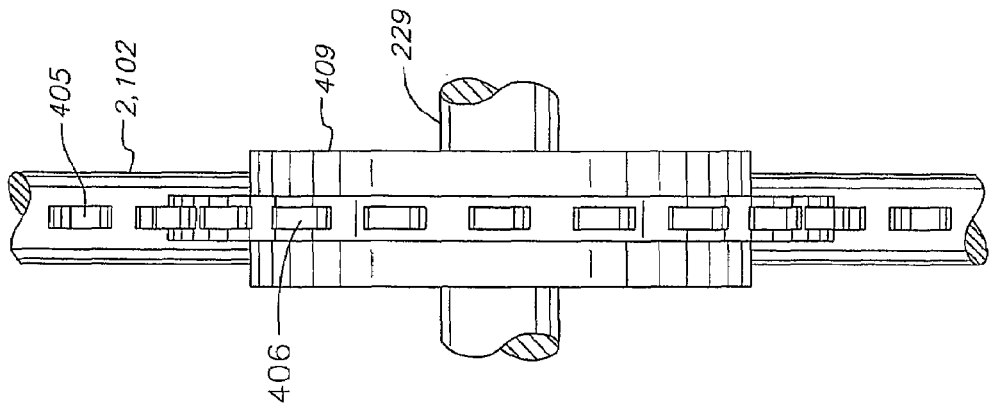
FIG. 77 is a right-side elevation view of a gear and the rod of the gearing arrangement, in accordance with the present invention.
Figure 78:
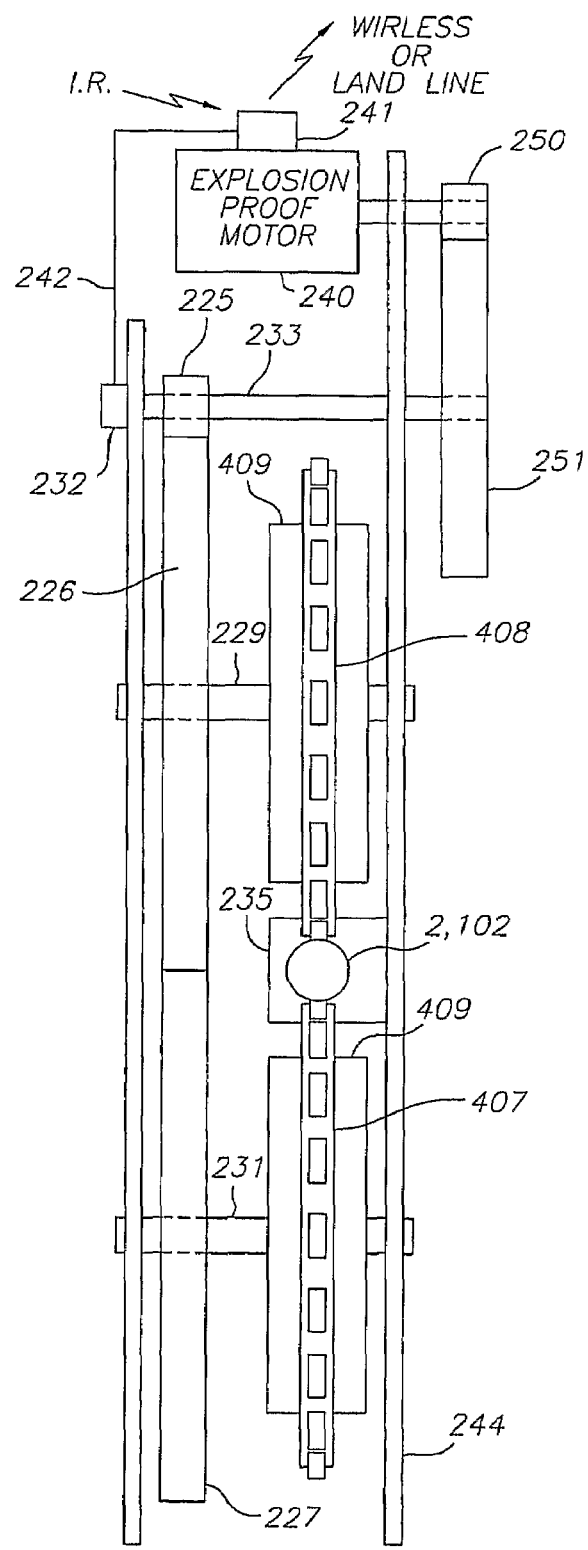
FIG. 78 is a top plan view of the gear arrangement, in accordance with the present invention.

The slots 405 have an opening or height 410 that is 0.707 inches with a spacing 411 between slots 405 of 0.418 inches. Each gear 407 and 408 is spaced 0.125 inches away from the rod 2 or 102 as indicated by spacing 412 (FIG. 74). This spacing is from the rod between slots 405 and the body of the gear 407 or 408 from which the tabs 406 protrude. Each tooth or tab 406 is slightly larger than a semi-circle having a radius of 0.375 inches, which is the same radius on which the slots 405 are formed.

Figure 79:
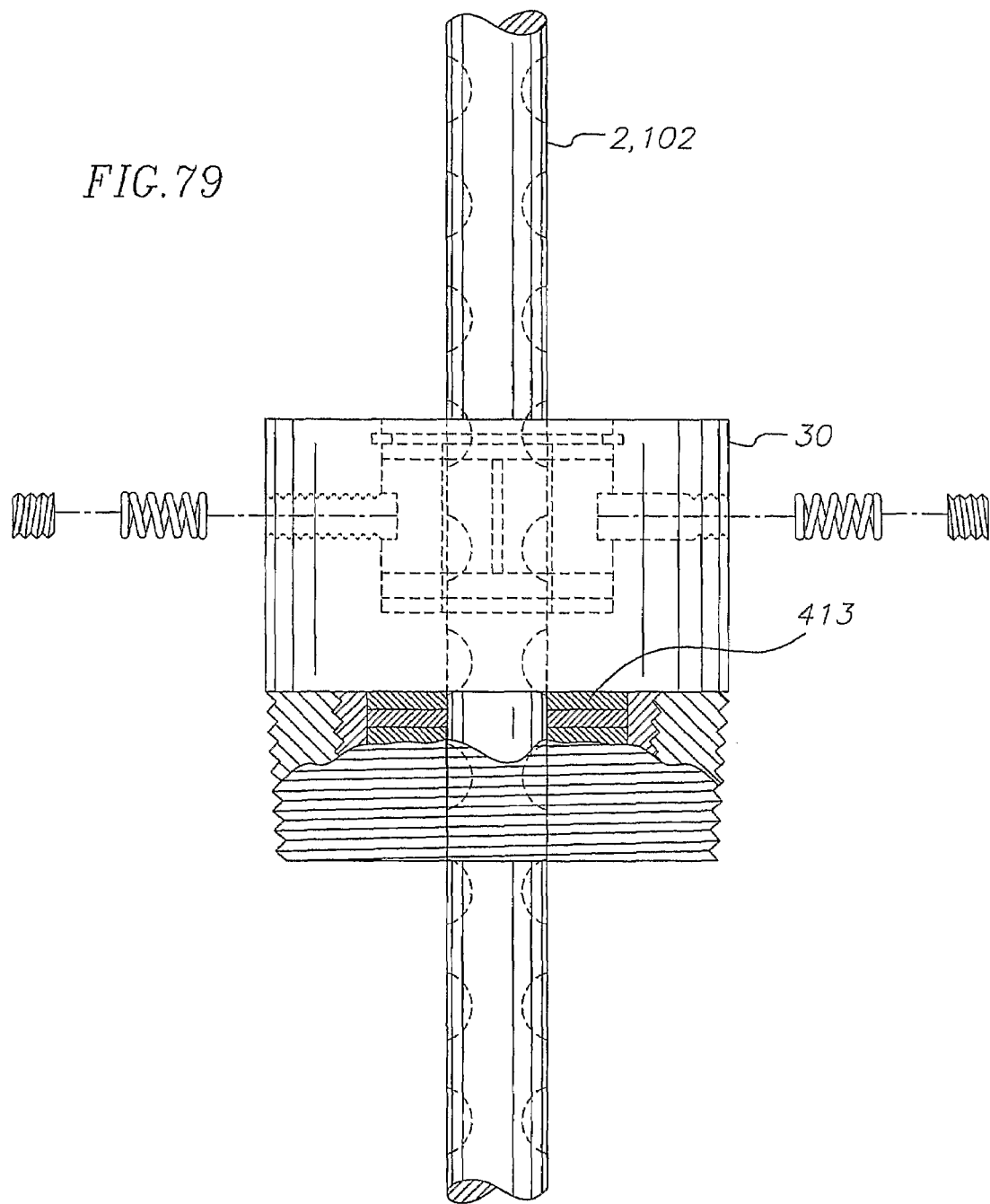
FIG. 79 is a front view partially broken away of a seal and cleaning assembly at the exit point of the adjusting rod, in accordance with the present invention.

Any liquids on the rod may be easily removed by wipers 413 (FIG. 79) positioned in the body 30 of the assembly 1. This assembly is modified by removing the locking bolt that screws into recess 42 (FIG. 10) and replacing it with a spring and set screw, like spring 40 and set screw 41. In this way, the pressure of sealing bushings 37 and 38 function as a seal only. Further, wipers 413 in the shape of wafers are placed in a cavity 414 formed in the bottom of body 30, as shown in FIG. 79. Additionally, dirt and other debris are removed from the slots 405 by fingers 613 that are flexible and extend into the slots for cleaning. These fingers are housed above and below the gears 407 and 408 as shown in FIG. 74.

Figure 90:
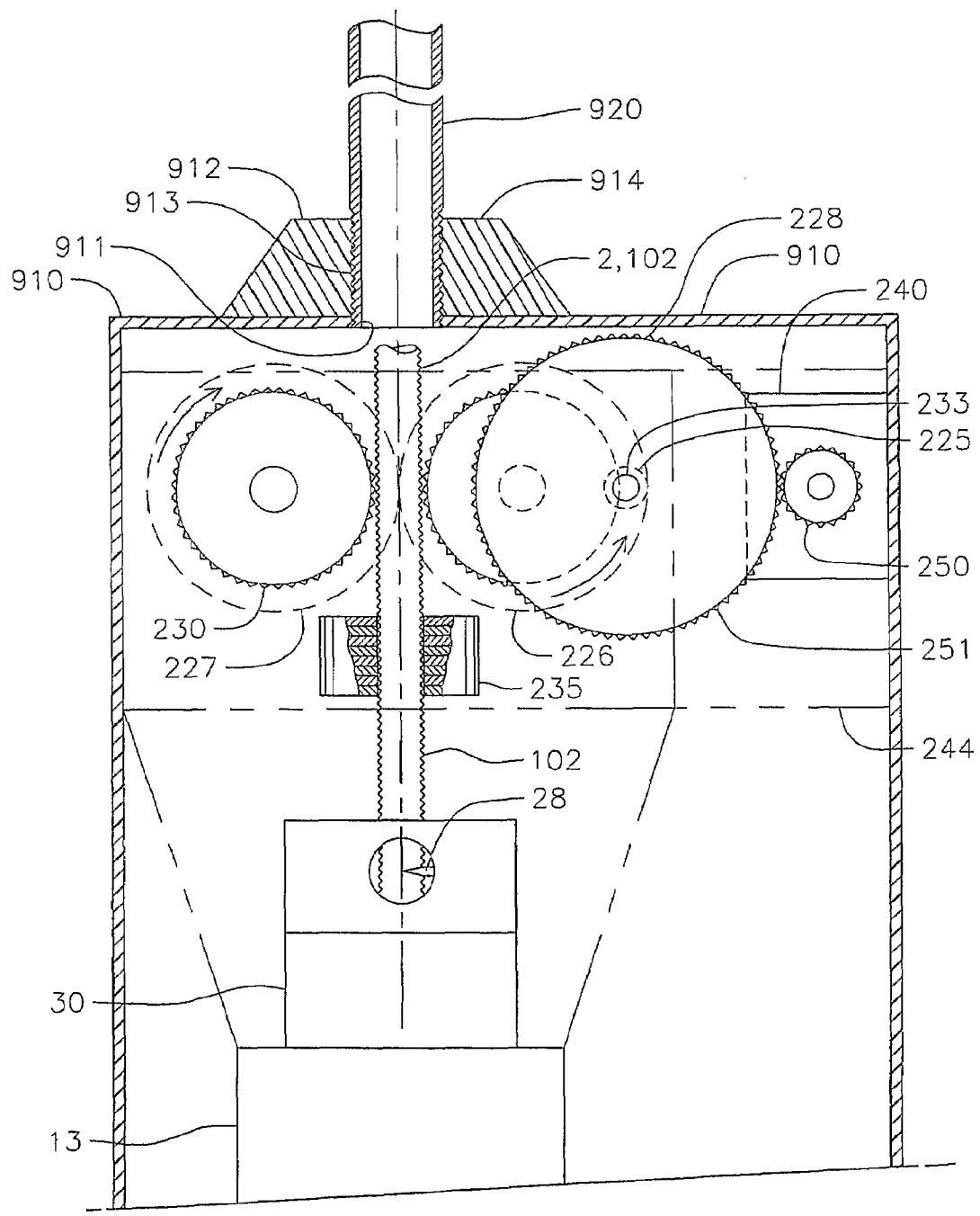
FIG. 90 is a cross-section view of a cover and weather shield for the transmission and adjusting rod, in accordance with the present invention.

The transmission for adjusting the position of the orifice, as shown in FIGS. 60 and 74 to 79, is best enclosed to minimize contamination and problems with weather. Additionally, it is best to provide a weather shield around the adjusting rod 2, 102. An enclosure and weather shield are shown in FIG. 90.

A cover 910 is attached to mounting plate 244 and extends over and around the gears 226-228 and 230 with an opening 911 for rod 2, 102.

A cylindrical tub 920 of sufficient height and rigidity extends above the cover 910 around the adjusting rod 2, 102 to provide weather protection for the adjusting rod. This tube 920 is screwed into and held in place by a truncated cone shaped housing 912 having internal threads 913 that match the external threads 914 of tube 920.

Automation

The positioning of the orifice by moving the rod 2 or 102, either manually or by the crank and gear assembly, requires that the pumper be at the top of the tank. Typically, the pumper climbs steps, which are provided on the outside of the tank. Risk to the pumper is present and is substantially increased in inclement weather because of the possibility of water, ice or snow on the steps.

To avoid the need for the pumper to position the orifice from the top of the tank, the positioning is automated and is accomplished from the ground in the area of the tank or from a remote control station.

Figure 61:
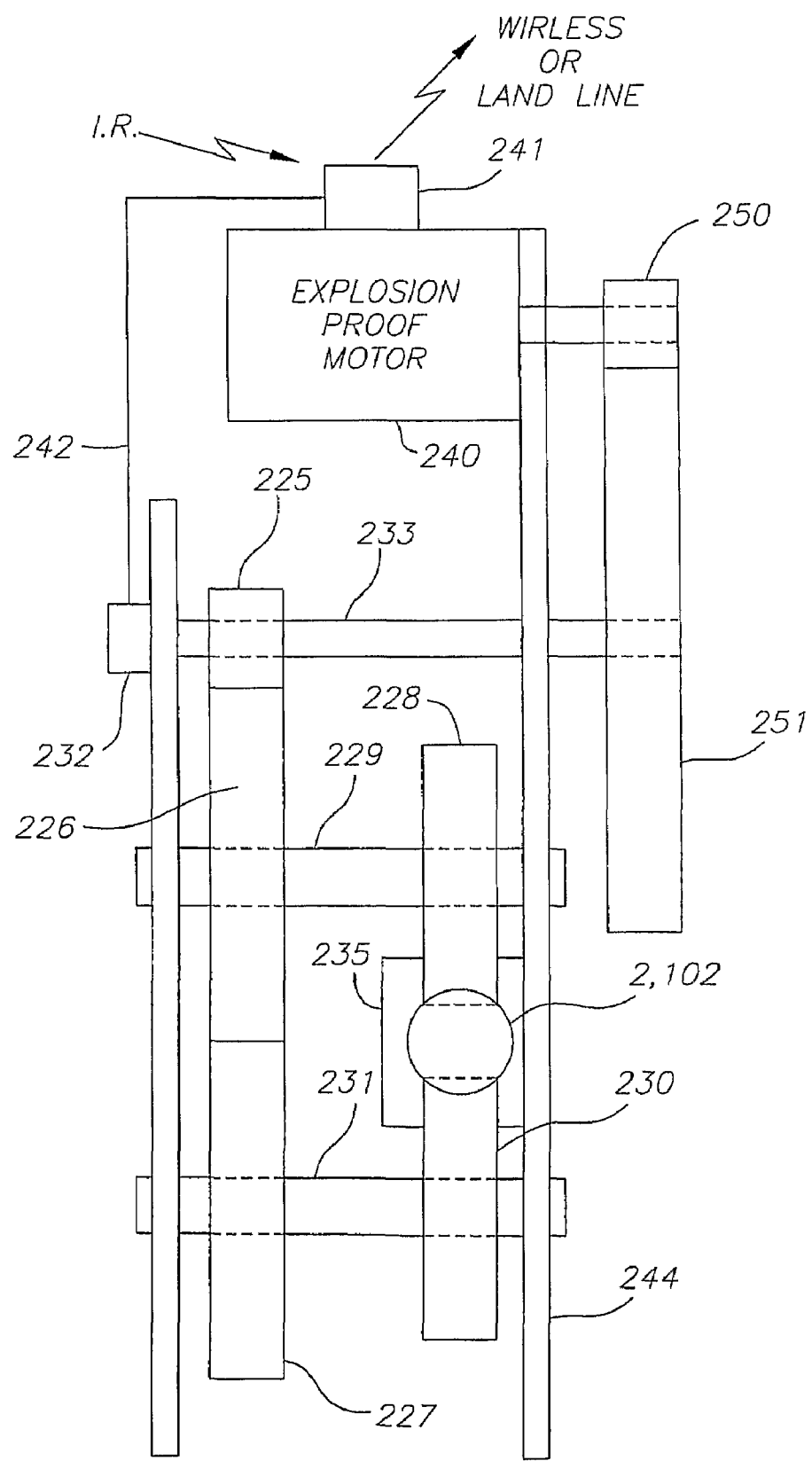
FIG. 61 is a top-plan view of the tool in FIG. 61, in accordance with the present invention.

The crank is replaced by a motor 240 and a control device 241 (FIG. 61). The motor 240 drives a first gear 250 that drives a second gear 251 that is connected to the axle 233 in place of the crank assembly of the manual device. The balance of the gears for the automated operation is the same as for the manual operation using a crank.

The signals to and from the control device 241 are provided by or received by a pumper operating a device on the ground or by an operator at a remote control station by a communication link, such as radio, other wireless links, or by wire. The motor 240 and control device 241 are explosion proof when used in an explosive environment.

Included in the signals from the control device 241 are the signals from reader/recorder 232, which provide the exact position of the orifice as determined by the position of the rod 2 or 102.

A separate improvement in automation, that may be used with the automated movement of the rod 2 or 102, for example, or may be used independently is a more accurate device for measuring and recording the transition between liquids or the level of each liquid. For example, a liquid level detector or sensor that detects liquid transitions based on electrical, chemical and/or physical properties of the liquids is used to measure the level of each liquid. When used in connection with a 20-foot high 400-barrel or 500-barrel tank, the level of a liquid is measured with an accuracy within one-quarter inch according to the manufacturer of a radar-based level detector or within one-tenth of an inch according to the literature for a sensor using floats which rely on the density of the liquids.

The position of the orifice relative to the liquid to be accessed and removed is dependent upon the ultimate use of the liquid and the requirements of the liquids, such as its purity. For example, some clean oil cannot have impurities in excess of 1%, while dirty oil, that is transferred to a tank for further processing, does not have an impurity requirement.

The transition between liquids may not be a line. For example, in storage tanks at wells, compressor stations and water plants associated with natural gas production, the transition between the clean oil and dirty oil is generally a zone. Consequently, the orifice is best positioned in the clean oil above the transition zone, but close to the zone to remove all or most of the clean oil. If there is a large quantity of clean oil of high purity then the orifice may be placed in the transition zone providing the accessed impurities in the removed liquid do not exceed the upper limit, such as 1%.

Figure 68:
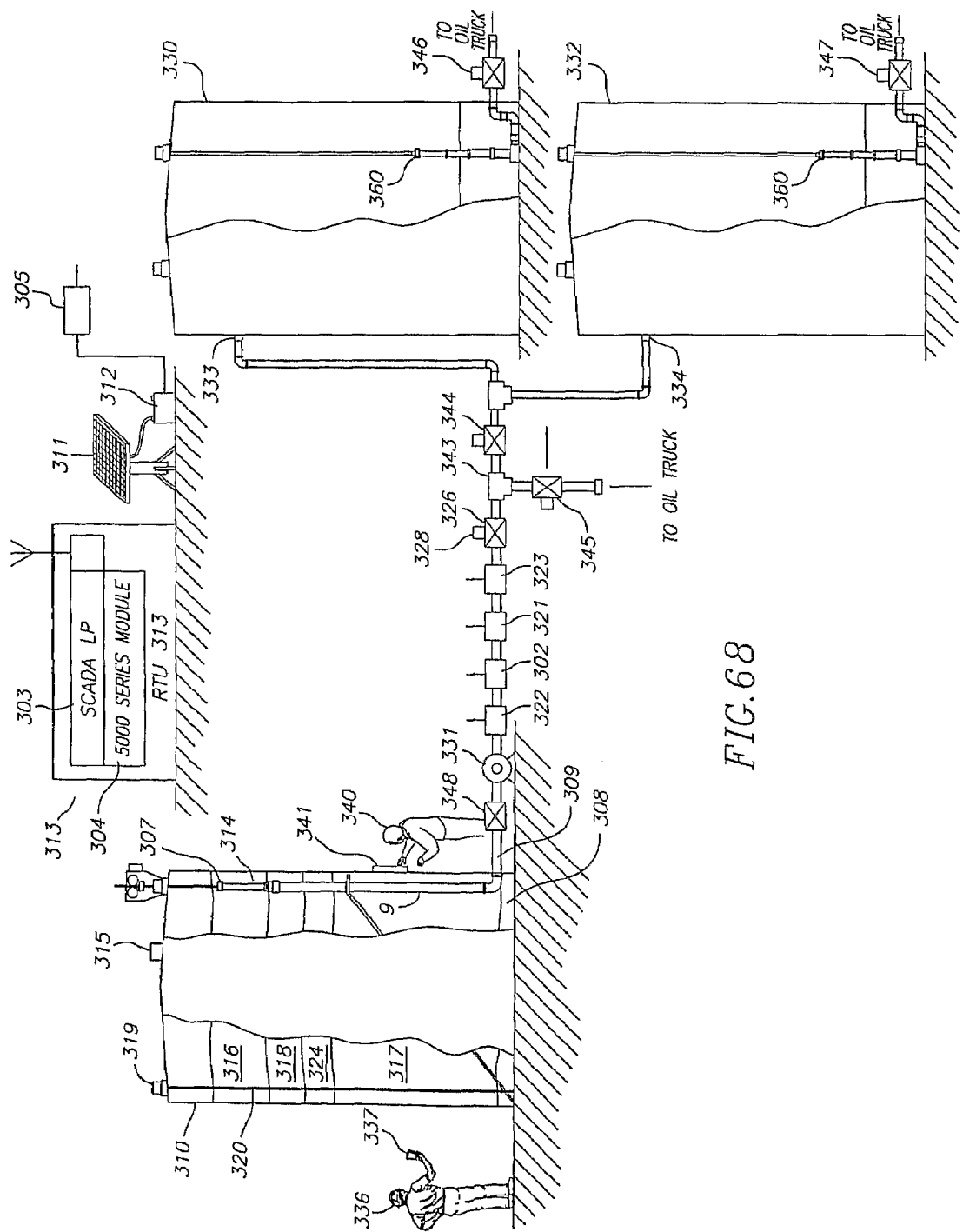
FIG. 68 is a schematic diagram of data acquisition and control of liquids in a container, in accordance with the present invention.

A tank 310 containing stratified liquids is shown in FIG. 68. The liquids may be any liquids of differing densities that have stratified into layers. For example, the layers in the illustrative example are condensate and light oil 316 on top, water 317 on the bottom above BS&W 308, a layer of dirty oil and water 318 between the clean oil 316 and a layer of waste oil 324. The thickness of each layer is only representatively shown in the drawings.

The position of the top surface of each layer is determined by a level-sensing device (sensor) 315 employing sonar and attached to the top of tank 310 with an opening (not shown) into the tank. The sonar-based detector may also have an opening in the side of the tank instead of on top of the tank. There are a number of sonar-based level detection instruments. In this embodiment, the sonar unit 315 is a Sensor Model P1 capable of use in hazardous areas, being explosion proof and a Class 1, Group C and D, Division 1 device. (See www.accugage.com). This instrument is available from C.T.I. Manufacturing, Inc.

An alternative level sensor mounted on top of tank 310 is a radar-based device 319, as shown in FIG. 68. This device is a Rosemount 3300 Series Guided Wave Radar Level and Interface Transmitter. As noted in the Rosemount Reference Manual 00809-0100-4811, dated March, 2005, for the Rosemount 3300 Series Level Detecting, Recording and Transmitting Unit, the Rosemount 3300 Series Radar Transmitter program is suited for aggregate (total) level measurements on most liquids, semi-liquids and liquid/liquid interfaces. Guided microwave technology offers highest reliability and precision which ensure measurements are virtually unaffected by temperature, pressure, vapor gas mixtures, density, turbulence, bubbling/boiling, low level, varying dielectric media, pH and viscosity. Guided wave radar technology, in combination with advanced signal processing, make the 3300 transmitters suitable for a wide-range of applications. The Rosemount 3300 radar system includes an explosion proof housing 319A, sitting on top of the storage tank 310, with a probe or leads 320 extending from the top of the tank 310 to the bottom of the tank 310 internally and passing through the stratified liquids. The leads 320 may be coaxial leads, rigid twin leads or flexible twin leads. The Radar 3300 device 319 being in an explosion proof housing is suitable for use around liquids from gas wells. Rosemount, Inc., is a wholly owned subsidiary of Emerson Electric and has principal place of business at 8200 Market Boulevard, Chanhassen, Minn. 55317.

Other devices, such as the ABB, Ltd., Level Master digital level sensor, may be used to provide the desired accurate level information.

A single-stage adjustable height inlet/outlet tool 314 is positioned in the storage tank 310. In FIG. 68, the walls of the storage tank 310 are broken away to show the tool 314 in place. Additionally, the position of the alternative level sensor 319 employing radar is also shown.

The level-determining device 315, employing sonar, detects and records the position of the inlet/outlet orifice 307 (orifice 50 of FIG. 14 or orifice 140 of FIG. 40, for example) relative to either the top or the bottom of the tank 310.

An operator, knowing the levels of the top surface and the bottom surface of each liquid layer can climb to the top of the tank and adjust the position of the orifice 307 for removal of a selected liquid. The adjustment of height or position of the orifice 307 may be accomplished by releasing the lock on a measuring and locking mechanism 1, as shown in FIG. 5-11, and adjusting the position as indicated by graduated marks. If a crank and gear assembly (FIGS. 58 and 59) is used, the position is adjusted by use of the crank. Advantageously, motor 240 is used to move the adjusting rod (2 of FIG. 5 or 102 of FIG. 38).

The position of the orifice 307 and the levels of the liquids are read by an operator 336 on the ground by using a hand-held device 337. One such device is a SCADA Pack Vision Operator interface made by Control Microsystems, Inc., available from Beabout Company, 5921 Middlefield Road, Littleton, Colo. 80123. Another hand-held device, that is also useful for this purpose, is made by Rosemount, Inc., a subsidiary of Emerson Electric. As an alternative to a hand held device for reading and recording the levels of the liquids and the position of the orifice, a control box 341 is attached to the side of the tank 310 or near the tank 310.

Alternatively, the levels of the liquids, the position of the orifice and the removal of or addition to a selected liquid may be controlled offsite. For example, if the tank 310 is located at a gas well, a compressor plant or a water station in Rifle, Colo., the liquids in the tank may be managed by an operator at a control station in Houston, Tex.

Off-site management of stratified liquids in a container is possible by use of SCADA (supervisory control and data acquisition) protocol. A programmable logic controller (PLC) or a remote terminal unit (RTU) 313 is provided as a controller at the tank site (FIG. 68), and a master terminal unit (MTU) 350 (FIG. 69) is provided at a central control station. Liquids in a plurality of containers may be managed remotely at the central control station.

The data sensed concerning the liquids in a container and/or transferred from a container and the viewing and management of the liquid levels in a container including the removal of and addition to a liquid is accomplished by using software commonly used in the oil and gas industry, such as Wonder Ware and Totalflow.

The remote terminal unit 313, includes in a housing 306, a SCADA pack LP 303 made by Control Microsystems and available from Beabout Company. The SCADA pack LP is a programmable logic circuit (PLC) remote terminal unit with a plurality of input circuits and a plurality of output circuits capable of receiving sensor inputs and transmitting the data to an offsite control station with an MTU. The communication may be by landlines or wirelessly, such as by radio. The SCADA pack LP includes a radio for sending data to and receiving data from the master terminal unit 350. The capacity of the SCADA pack LP may be increased to monitor and manage liquids in a plurality of containers at the site of tank 310 by adding an expansion and communication module. Such a module is available from Control Microsystems in their 5000 Series Expansion and Communication Modules.

Other remote terminal units (controllers) and master terminal units may be used in place of the SCADA units. For example, a Model 3202, Smart Application Module may be employed as part of an RTU, with the Radar 3300 unit from Rosemount, Inc. This module is described in Product Datasheet 00813-0100-4646, Catalog 2002-2003 provided by Rosemount, Inc.

The power for the various devices, such as the sensors 315 or 319, tool 314, RTU 313, and various other sensors and motors, is provided at a tank site by a solar panel 311 and associated battery 312. An inverter 305 is coupled to the battery 312 for providing alternating-current power at the site.

Figure 69:
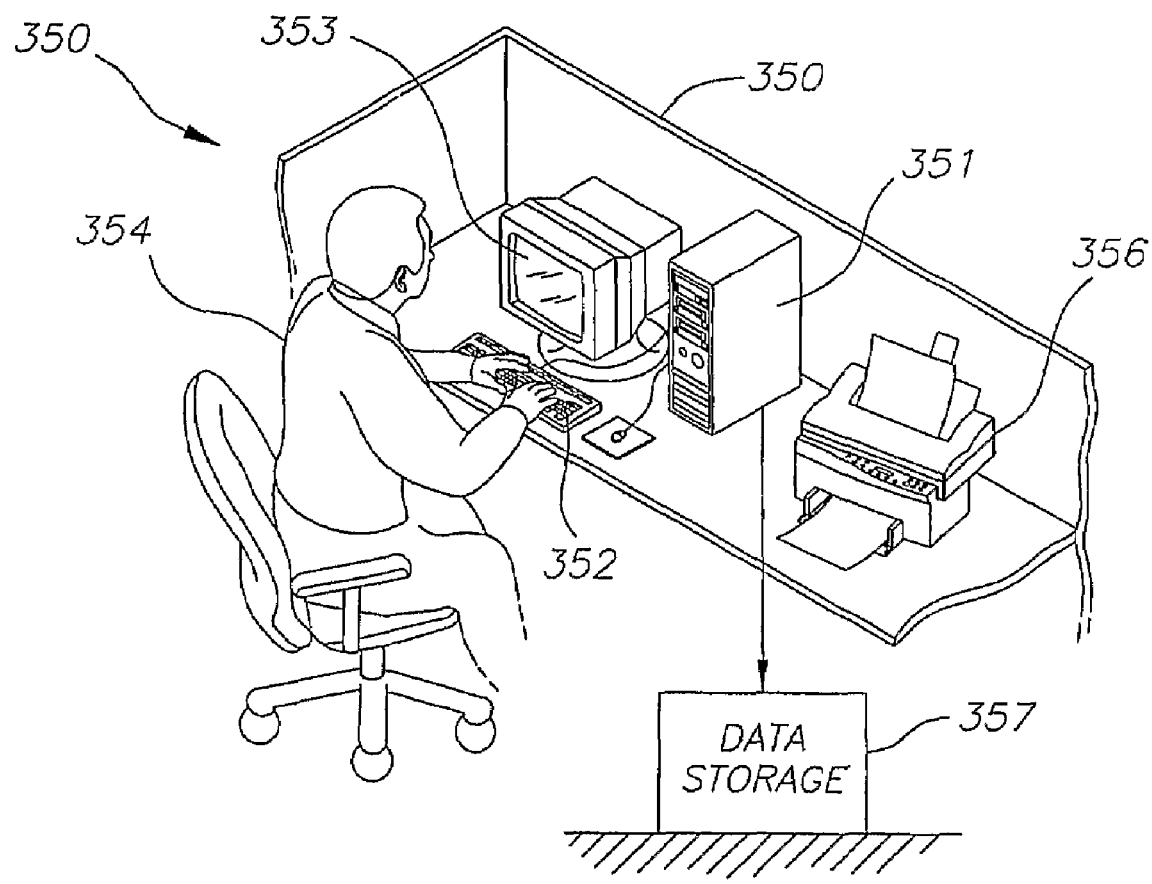
FIG. 69 is a schematic diagram of a central control station (master terminal unit) for managing liquids in remote containers, in accordance with the present invention.

Liquids in a container at a remote site may be managed at a control station (FIG. 69) by knowing the liquid levels and the position of the orifice at the site. A remote controlled valve 326 with a motor 328 coupled, wirelessly or by wire, to the RTU 313 is used to access the liquid at the level of the orifice 307 as controlled by an operator 354 at the control station (FIG. 69).

The quantity of liquid removed from a container, such as tank 310, is calculated by employing the empirical data about the tank and the levels of the liquid removed. As noted above in a 400-barrel tank, one inch of liquid is 1.667 barrels and in a 500-barrel tank, one inch of liquid is 2.083 barrels.

Some agencies, such as the Bureau of Land Management, require the accurate determination of liquid quantities. This is required for "custody transfer" and is also necessary in many cases for inventory control. See 43 CFR 3160 and American Petroleum Industry (API) Standard 2545 "Method of Gauging Petroleum and Petroleum Products."

The top level of the liquid removed and the position of the orifice, when the liquid is removed down to the orifice, gives an accurate measurement of the amount of liquid removed. However, this may be insufficient in some cases. Then, knowledge of the temperature of the liquid is used to accurately determine the quantity of a liquid transferred from a tank 310. The temperature sensor may be placed in the tank 310 or in the output line 309. An averaging resistance temperature device (not shown) is placed in the tank 310 to detect and record the temperature of the liquids in the tank. Such a device is available from Weed Instrument. See www.weedinstrument.com and particularly, www.weedinstrument.com/news/news. Alternatively, a temperature sensor 302 is placed in the output line 309 for sensing and recording the temperature of the liquid as it passes through the line. The temperature information is accessed by the RTU 313 and sent to the MTU 350 (FIG. 69).

For further improved accuracy of the quantity of fluid transferred to or from tank 310, a specific gravity sensor 321 is placed in the output line 309. A densitometer is used to measure the specific gravity. This information is also accessed by RTU 313 and sent to the MTU 350.

For transfer of clean oil, it is generally required that there be less than 1% or 1½% contaminants in the oil. Thus, a contaminant monitor 322 is included in the output line 309. This monitor generates a signal when the contaminants exceed the selected amount. The removal of the liquid may be discontinued by the operator at the site or at the control station (FIG. 69). Alternatively, the operator can move the orifice up in the tank 310 to where the liquid has the acceptable purity or is above the liquids to discontinue the removal of a liquid.

The calculation of quantity of liquid transferred based on temperature and specific gravity is made at the site of the tank or off site at a control station. Alternatively, to measure the amount of liquid being transferred, a positive displacement meter 323 is placed in the output line 309. The information about the quantity of liquid transferred as recorded by the meter 323 is sent to the central control station by way of the RTU 313. This information is also available at the tank site by transferring the information from the meter 323 to the handheld unit 337 and/or the control box 341.

The output of the meter 323 gives a raw indication of the quantity of the liquid transferred. A more accurate measurement of the amount of liquid transferred is available by a adjusting the quantity using the temperature and specific gravity of the liquid that passes through the output line 309. The calculation of the adjusted quantity, based on temperature and specific gravity, is accomplished at the central control station (FIG. 69). Additionally, the raw value of quantity of liquid transferred, as measured by meter 323, may be compared to the quantity of liquid transferred determined by the change in level of the liquid in the tank 310. As noted above, some level sensing instruments, such as the Level Master level sensor from ABB, Ltd., are accurate enough to measure and record this change in level.

The liquid removed from tank 310 may be transferred to a first oil sales tank 330 or an oil sales truck. The oil sales tank 330 has an inlet 333 above the output line 309 with the tank 330 being positioned at about the same elevation as tank 310. Consequently a pump 331 is provided to pump the liquid from tank 310 to tank 330. If a second oil sales tank 332 is positioned below the elevation of tank 310 so that the inlet 334 to tank 332 is below the output line 309, the liquid will flow from the tank 310 into the tank 332 by gravity flow. A T-fitting 343 is provided in the output line 309 so that the liquid may be transferred either to an oil sales tank, such as tank 330 or tank 332, or to an oil truck at the tank site. A pair of remote controlled valves 344 and 345 are coupled to two legs of the T-fitting 343 for directing the liquid either to an oil sales tank or to the oil truck. There is also a remote controlled valve 346 on the output of oil sales tank 330 for transfer of oil in the tank to an oil truck and a remote control valve 347 on the output of the oil sale tank 332 for control of transfer of the liquid in the tank 332 to an oil truck.

The remote control valves 326, 344, 345, 346 and 347 can be controlled by the hand-held device 337 or at the control box 341. These valves may also be controlled from MTU 350 through the SCADA LP 303 providing control signals to the individual remote controlled valves and, more particularly, to the motor associated with each valve. Additionally, as a safety feature, there is an output from each valve to the RTU 313 or the control box 341 or the hand-held unit 337 to indicate whether the valve is open or closed.

The control station (FIG. 69) includes a computer 351 for performing the calculations required to convert from the raw measured quantity to the adjusted measured quantity, based on temperature and specific gravity of the liquid being transferred. The control station further includes a printer 356 for providing a hard copy of each event that includes the site and tank accessed or interrogated and the quantity of liquid added or removed from the tank. The control station also includes a data storage unit 357 which provides a record in memory of each event, which record may be transferred from the data storage unit 357 to a floppy disk or to a tape to provide an archive copy of each event. Some agencies require that the event logs involving transfer of liquids, particularly the transfer of oil, be kept for at least six years.

Figure 71:
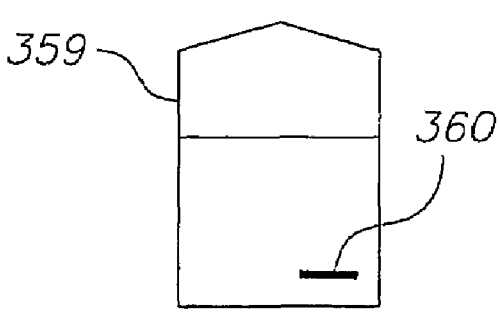
FIG. 71 is an enlarged view of the display screen at the central control station of an event of managing a liquid in another container with an adjustable height inlet/orifice tool, in accordance with the present invention.

An input terminal or keyboard 352 is provided at the control station for use by an operator 354 to access a selected site and tank and to manage the liquids in the selected tanks. Further, there is provided at the control station a video display terminal 353 on which is displayed the information concerning each tank that is accessed by the operator 354. Representative displays on the display terminal 353 are shown in FIGS. 70 and 71. The information displayed includes the silhouette 357 of the tank that has been accessed. There is shown in the silhouette of the tank 357 which is representative of the storage tank 310, the liquid levels in the storage tank and the position of the outlet orifice 307 in the tank 310. Preferably, the individual liquids in the silhouette 357 are color coded to easily distinguish between the liquids. Additionally, the contents of the tank are displayed in a table 358 as shown in the upper-left hand portion of the display 353 in FIG. 70.

The information set forth in the table 358 includes the top and bottom surface level for the clean oil, dirty oil, waste oil, water and BS&W. Additionally, the table 358 includes the quantity of liquids in barrels of each of the liquids. For example, the storage tank 310 is a 500-barrel tank and the quantity in the tank as displayed on the table 358, is 500 barrels which includes the open space or space above the liquids which has 20 barrels or is equivalent to a space for 20 barrels. Additional information that is displayed for the operator 354 is the identification of the site and tank that has been selected and the name of the contact person for that tank. Whenever an operator wants to transfer a particular liquid from a tank the operator takes the cursor on the display and clicks on the liquid that is to be transferred. For example, in the display in FIG. 70 the operator has clicked on clean oil and the information concerning the clean oil that is transferred appears in the right hand part of the display 353. Once the operator has selected the liquid to be transferred, then he must set the orifice level as indicated at the bottom right portion of the display 353. From there the operator must select the destination of the liquid and must send the signals to cause the appropriate valves to be opened. For example, the valve 328 from the tank must be open and then the operator must select either valve 344 to transfer the liquid to a tank 330 or 332 or valve 345 to transfer the liquid to a truck, such as an oil truck. Part of the information that is required when the liquid is to be transferred to an oil truck is the identification of the truck, which includes the name of the driver of the truck and the company for whom the driver works or by whom the driver is employed. A manual valve 348 is provided in the output line 309 for isolating the output line 309 from the tank 310. This isolation may be done for the servicing of any of the instruments or components that appear downstream in the output line 309.

The parameters of the liquid being transferred and the completion of the transfer are displayed on the display 353. These parameters as well as the identification of the operator 354 and the date and the time are recorded on an event log as shown in FIG. 72. The event log representatively shown in FIG. 72 is a printout from the printer 356 that is printed at the completion of the event, which is the transfer of the liquid.

An oil sales tank, rather than a storage tank, may be accessed by the operator 354 and set forth on the display 353, as shown in FIG. 71. The display includes a silhouette of the oil sales tank, for example tank 330 of FIG. 68. The silhouette 359 includes the level of the oil in the tank as well as the position of the outlet orifice 360. The information displayed on the display 353 for the oil sales tank 330 includes the site and tank identification and the quantity of clean oil in the tank. Additionally, the information includes the levels of the liquids in the event there is dirty oil or BS&W also in the tank with the clean oil. To transfer the oil from the tank 330 the operator sets the position of the orifice 360. Thereafter, the quantity of oil transferred appears on the display as well as the truck identification.

The management of liquids by manual use of the liquid management tools in containers of stratified liquids reduces costs and vehicular traffic and provides versatility not available before the adjustable height inlet/outlet tools were available. The automation of the management of liquids using adjustable height outlets and inlets greatly reduces vehicular traffic and significantly simplifies the management and tracking of liquids. Automation with adjustable height outlets and inlets is applicable in a container holding stratified liquids in general but has been disclosed in detail in connection with oil and gas fields and more particularly in connection with gas fields.

The liquids in containers, such as tanks, may also be sensed, with levels and other parameters recorded, for on-site management. An operator, either in a vehicle or on foot can interrogate the sensors for their recorded data to determine what action, if any, needs to be taken with respect to the liquids in the container. The operator's pin number or other identification, such as a magnetic card, may be required to access the information and to record the identification and the conduct of the operator.

Gas wells produce liquids that need to be managed at three different locations, namely, the gas well, the compressor station and the water plant.

Figure 62:
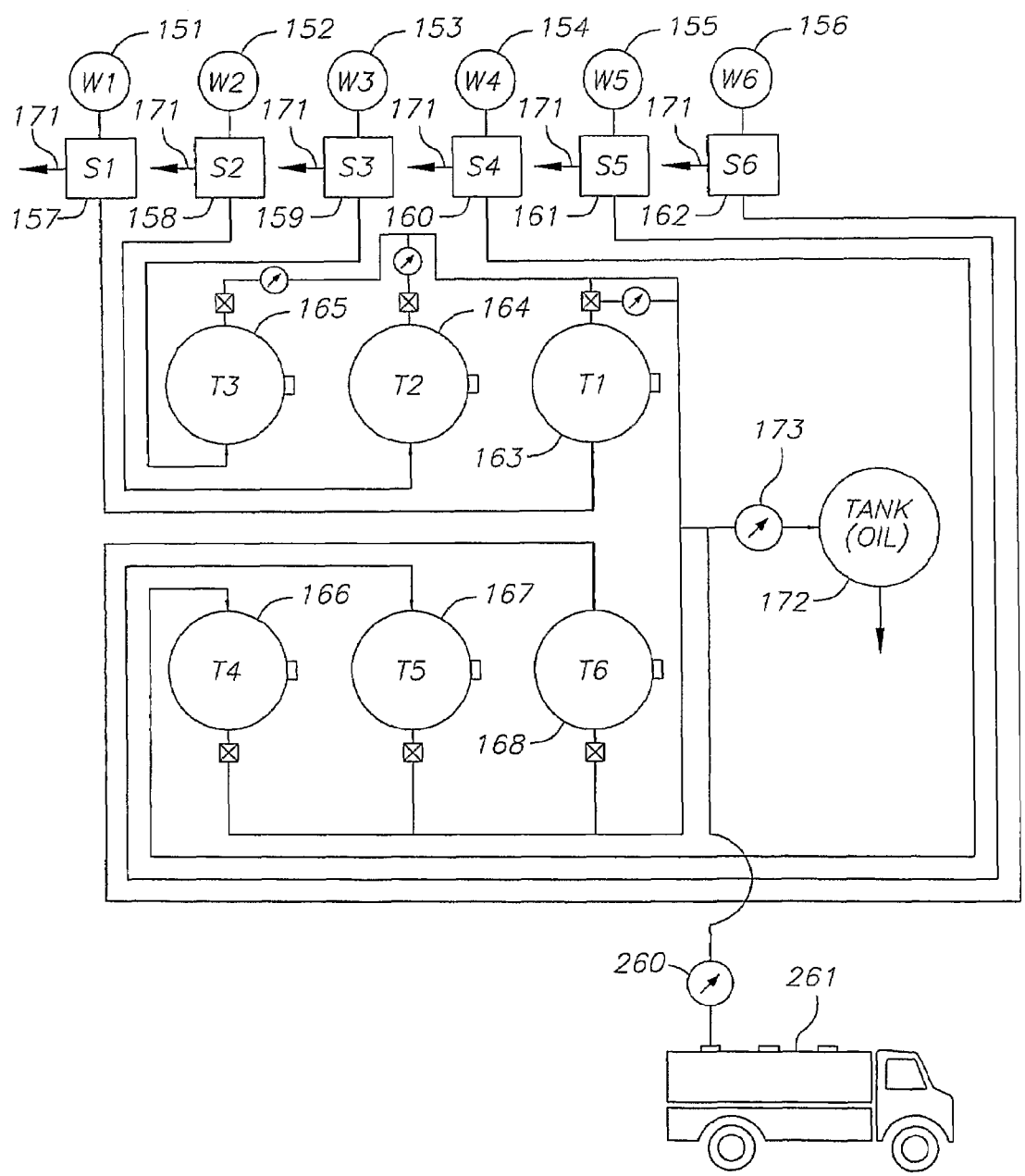
FIG. 62 is a schematic diagram of the apparatus employed at a representative well site, in accordance with the present invention.

A schematic diagram of a representative arrangement of pumps, separators and storage tanks at a gas well is shown in FIG. 62. A plurality of gas wells 151 through 156 are individually owned so that it is necessary to store the liquids from each well in a separate tank. The gas and liquid from each well first passes through a separator 157 through 162, respectively. The gas is separated from the liquids at the output of each well in the separator and the gas is metered and transported by pipeline 171 to a compressor station.

The liquids from each well are placed in storage tanks 163 through 168. Each well has its own personality and the amount of gas and the amount and constituent parts (water, oil, dirt, etc.) of the liquids varies. There are different amounts of gas and liquids recovered from each well and therefore different amounts of liquids stored in the storage tanks 163-168. Generally, sufficient oil separates and floats to the top of the liquids in the tank to make it worthwhile to recover and sell this oil. It is required at many wells to keep an accurate record of the amount of oil extracted and sold for each particular well so the owner of the well will receive the proper royalties for the gas and oil extracted from the well. The amount of oil from a tank can be monitored by a measuring device 259 on the output of the tank or by a measuring device 260 carried by the oil truck, or by empirical data gauging using the size of the tank and levels of liquids provided by a sensor.

Efficient management of the liquids is possible by using one of the variable height inlet/outlet liquid management tools disclosed in FIGS. 5-37 and 38-57. Further, improved management results from the addition of an oil storage tank 172 at the well site. Thereafter, the oil level in each storage tank 163-168 is monitored and when there is sufficient oil in a tank, the outlet of the adjustable height tool, such as the single-stage tool 175 shown in FIGS. 5 and 6, is adjusted to the selected level in the light oil that is to be accessed and recovered. Once the outlet is at the desired level, the oil is transferred and metered into the oil tank 172. A meter 173 is provided at the inlet to the oil storage tank 172 for this purpose.

Figure 63:
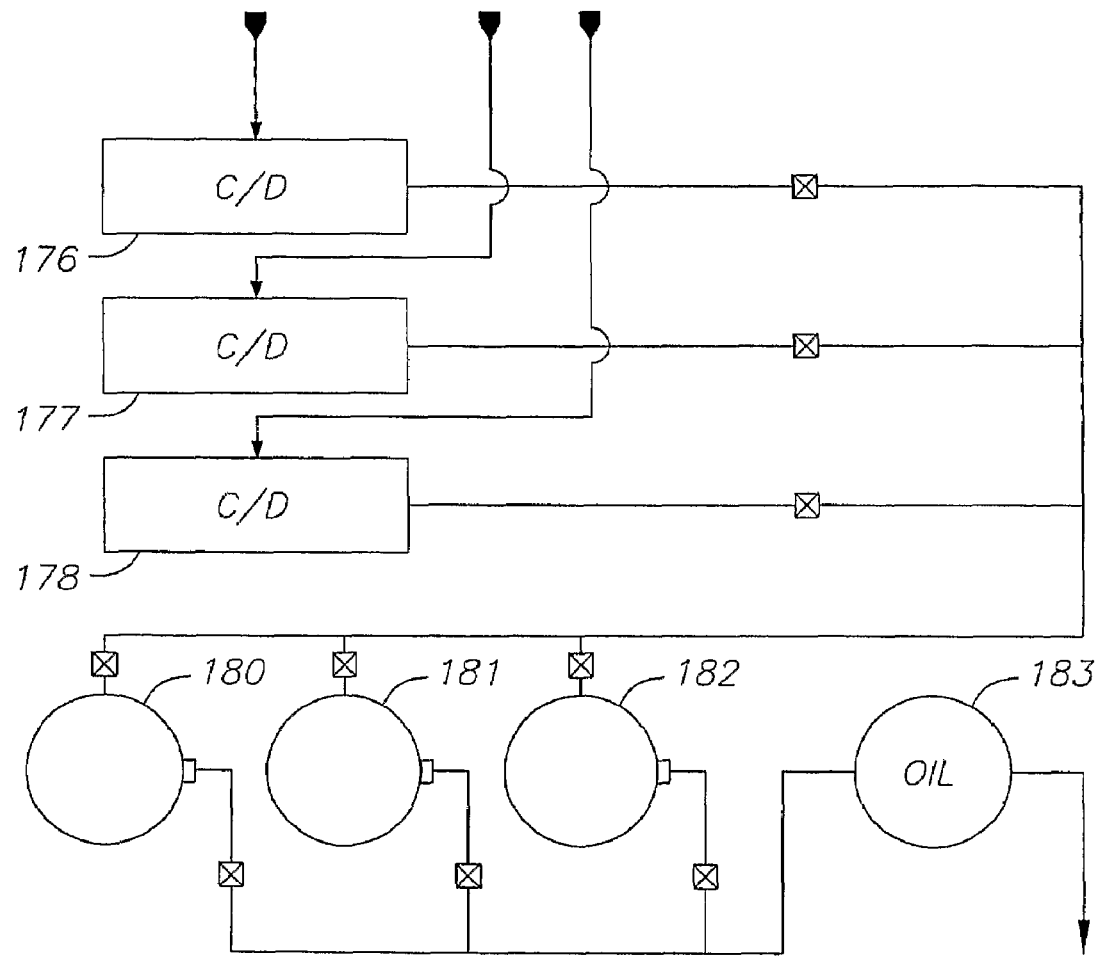
FIG. 63 is a schematic diagram of the apparatus employed at a representative compressor station, in accordance with the present invention.

The liquids at a compressor station may be managed more efficiently by using one or more variable height inlet/outlet tools. A compressor station handles gas from a plurality of gas wells; for example, 300 gas wells may have gas piped to a single compressor station. A representative compressor station is shown in FIG. 63. At the compressor station there is a plurality of compressor dryers 176, 177 and 178 where liquid is removed from the gas as it is compressed and dried. The liquid is transferred to liquid storage tanks 180, 181 and 182. As the liquid is permitted to sit in a storage tank the liquids stratify, with the oil again going to the top of the liquids. The oil is accessed and recovered from the storage tanks 180, 181 and 182. Presently, a water truck is required to remove the water and interface layer from a storage tank before the oil may be accessed and removed. Once the oil level is reached, an oil truck can access and recover the oil in the tank or the oil may be transferred to another tank that contains oil, such as an oil storage tank 183.

Figure 64:
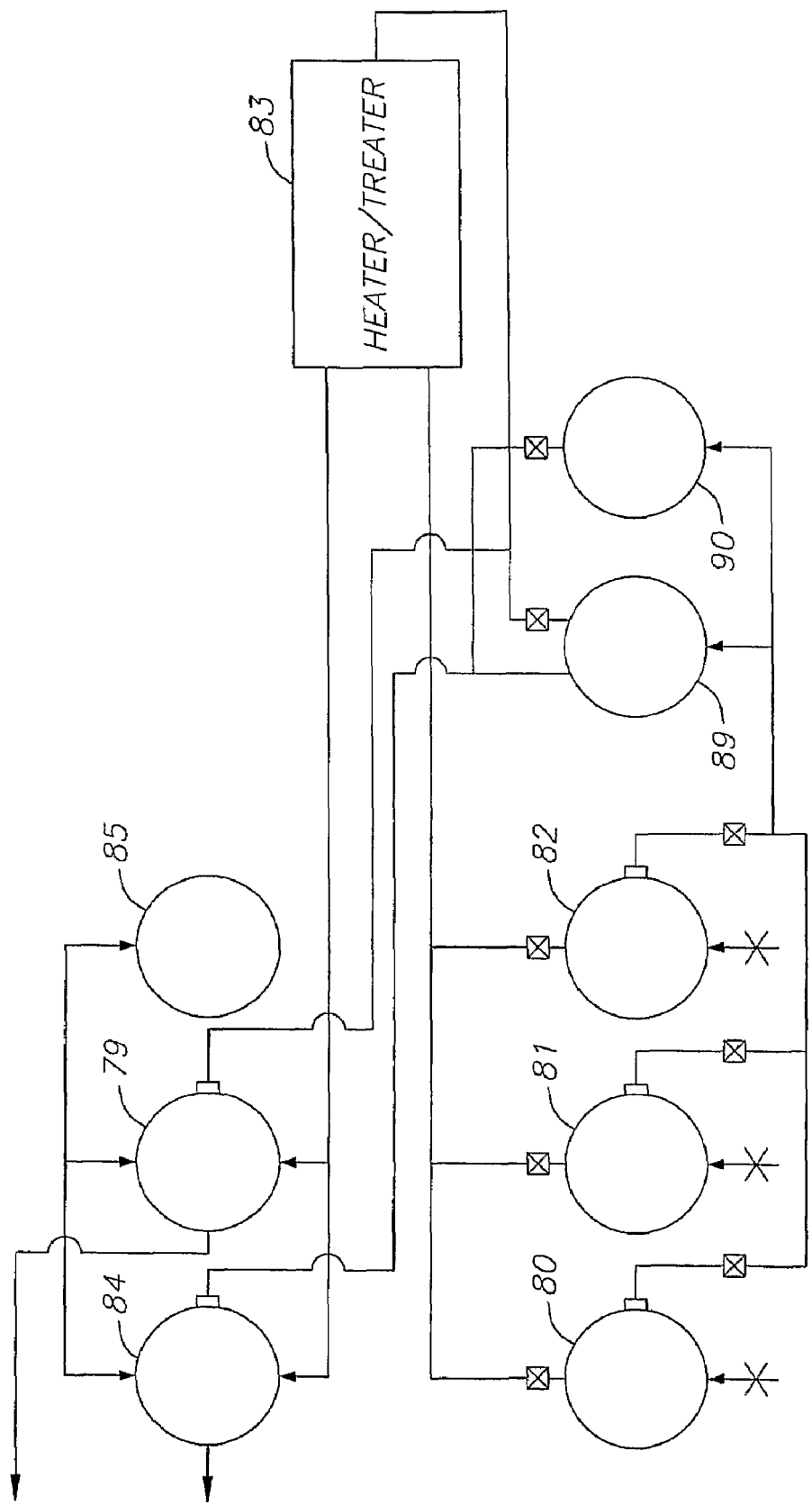
FIG. 64 is a schematic diagram of the apparatus at a representative water plant, in accordance with the present invention.
Figure 65:
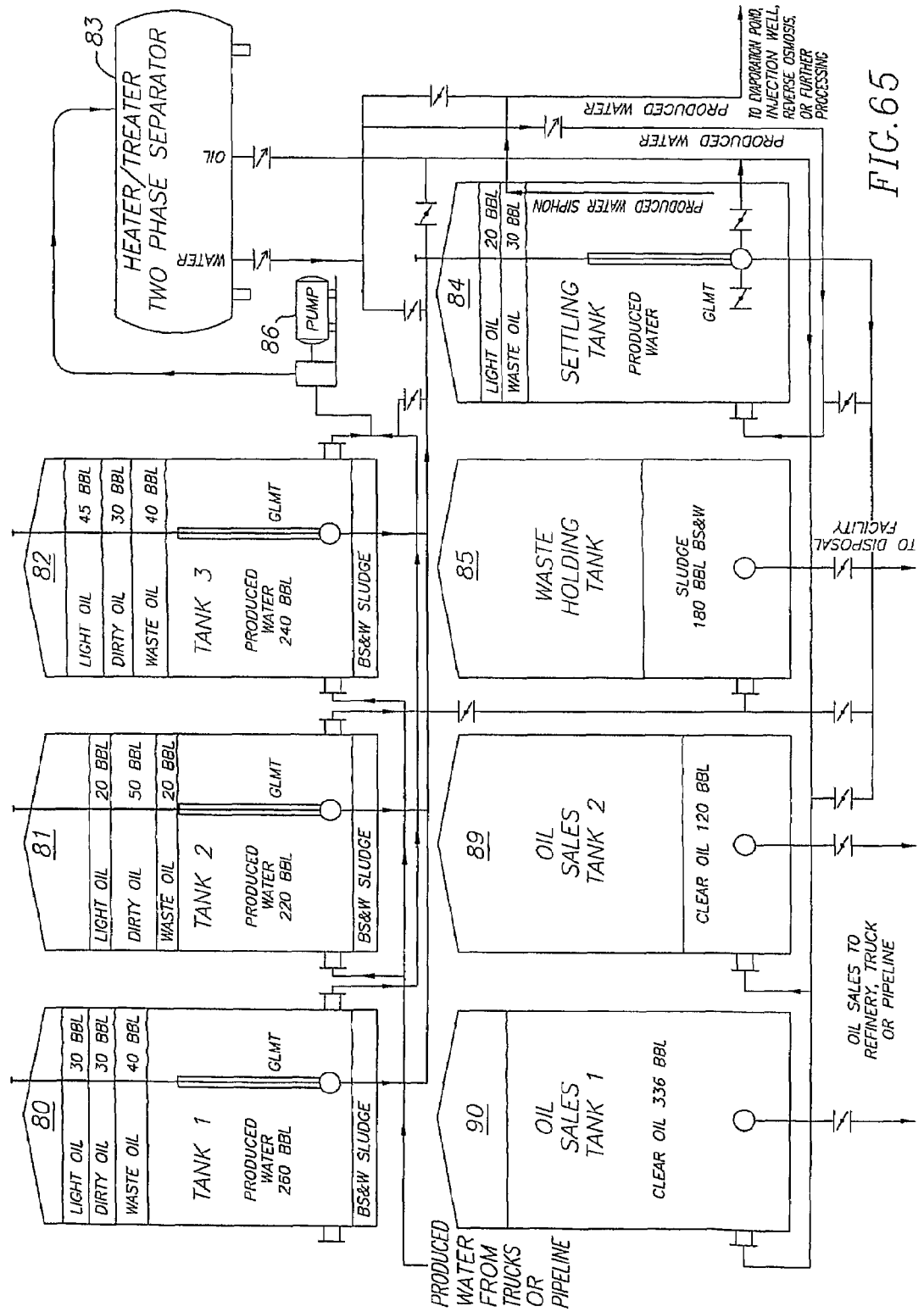
FIG. 65 is another schematic diagram of the devices at a representative water plant, in accordance with the present invention.
Figure 66:
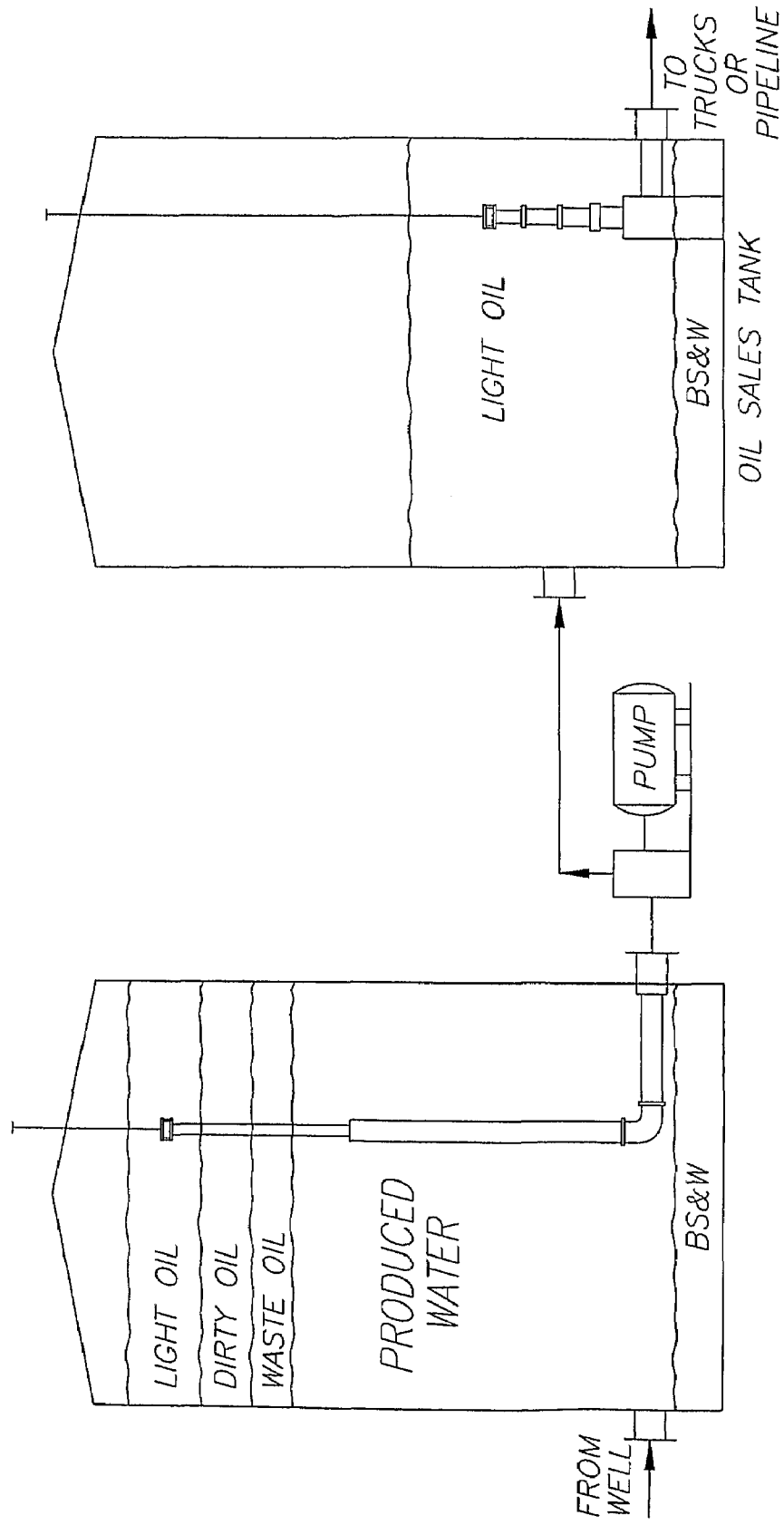
FIG. 66 is a schematic diagram of the use of the tool between a produced water tank and a light oil sale tank and in an oil sale tank, in accordance with the present invention.

Representative water plants are shown in FIGS. 64 and 65. The water pulled off from the storage tanks at the well pad and also at the compressor station typically contains some of the valuable oil that was not recovered at the well pads or the compressor station. This water is trucked to a water plant. A plurality of produced-water tanks, which are typically 500-barrel tanks such as tanks, 80, 81 and 82, are located at a water plant for processing the water transported from the individual wells and/or the compressor plant.

A representative water plant (FIGS. 64 and 65) includes a plurality of produced water tanks 80, 81 and 82. The liquids in these tanks stratify, and the oil may be removed from these tanks and placed in an oil sales storage tank 89 and 90. The produced water in tanks 80, 81 and 82 is transferred to a heater/treater separator 83 for further separation of the oil and water. The water output of separator 83 is transferred to a settling tank 84 (FIG. 65) or to one or both settling tanks 79 and 84 (FIG. 64). The liquids stratify in these tanks, and the oil is recovered from these tanks.

Scenario 1 (Reference FIGS. 64 and 65).

You need to deliver for sale 650 bbls of oil today to meet contract obligations. Oil sales tanks 80 and 81 have a total of 456 bbls. Produced water flows into tanks 1, 2, and 3 at a rate of 3 to 6 barrels a minute. The discharge pump rate from these tanks to the heater/treator 83 is 5 bbls per minute. Tanks 80, 81 and 82 contain more produced water than you have time to remove by using a fixed height outlet to a discharge pump. The total light or clear oil in tanks 80, 81 and 82 and settling tank 84 is 115 bbls, which is still 79 bbls less than needed. However, by processing some of the dirty oil through the heater/treator 83 there would be enough to meet contractual obligation. By using the height adjustment apparatus and setting inlet/outlet at the bottom of light oil zone you can quickly remove the light oil and send it to the oil sales tanks without further processing. Therefore, 30 bbls from tank 80, 20 bbls from tank 81, 45 bbls from tank 82, and 20 bbls from settling tank 84 have been removed. By changing inlet/outlet positions in each tank to the dirty oil level, flow can be directed to heater/treator 83. By lowering the inlet/outlet to the bottom of the dirty oil stratified zone in tanks 80 and 81, 80 bbls can be processed in heater/treator 83 and sent to oil sales tank to complete the order on schedule.

Scenario 2

The disposal facility is scheduled for a one week maintenance shutdown and is only accepting waste liquids for the next twenty-four hours. The waste holding tank can not hold one week's volume.

The height adjusting apparatus is set at the bottom of the waste zone in tanks 80, 81 and 82 and settling tank 84 are set from each apparatus to the waste holding tank 85. Thereby 40 bbls are removed from tank 80, 20 bbls from tank 81, 40 bbls from tank 82 and 30 bbls from settling tank 84. The 130 bbls just removed are combined with the 180 bbls already in the waste holding tank 85. The waste is sent to disposal and there is now enough capacity to operate the facility until the next disposal opportunity.

Scenario 3

The heater/treater's pump 86 fails and stops the continuous flow of produced water to an injection well.

By lowering the inlet/outlet of the apparatus to the bottom of the operating range and setting the valves the flow is directed to the injection well pipeline 87.

Scenario 4

The electrical power fails, regardless, you need at least 200 bbls of light oil in oil sales tank 81 for a transport truck that is already in route.

In this case gravity will be used to transfer the oil in tanks 80, 81 and 82 and the settling tank 84, to the oil sales tank 89. Beginning with the tank that has the least height differential with oil sales tank 89, in this case tank 81, the inlet outlet of the apparatus is set to bottom of the light oil zone. Valves are changed to direct the light oil to oil sales tank 89 and thereby transfer 20 bbls. Next the inlet/outlet in tank 82 (it has the next least differential) is set to transfer 45 bbls. Using the same method on tank 80, and the settling tank 84, an additional 50 bbls is transferred. The oil sales tank now contains 235 bbls total. Without electrical power, the transport truck is loaded.

Scenario 5

An oil company is looking for ways to be more profitable by cutting unnecessary expenses. One way to accomplish this it to reduce the number of trips that water trucks, hot oil trucks and crude oil transports make to a specific well location in order to prepare and transport a load of clean light oil. These trucks charge by the hour and many wells are in remote locations with poor roads. Therefore, the expenses are high. Crude oil transports will not accept oil with more than 1 to 1½% BS&W or other containments. Also the BS&W must not be more than eight inches above the tank bottom. Pumpers are responsible to prepare the oil for shipment and sale. Generally, pumpers visit each well location only once a day, or even less often. Oil companies commonly use two methods of storing the produced water and oil. The first method is to set one tank at each well site. As the produced water and oil builds in the tank the pumper calls a water truck to remove the water, leaving mostly oil on the top of the tank and BS&W on the very bottom. This routine may be repeated many times before there is finally enough oil to make an oil sale. Usually in this cases a water truck is scheduled to remove the water and BS&W immediately before the crude oil transport arrives. Because many of the roads to the wells are poor and distant, coordinating the arrival of both trucks is difficult. Another problem is that a tank may be ready for sale and conditions such as BS&W height or water level change before the load is transported. In this case these trucks and possibly a hot oil truck need to be called back to the tank to prepare it again. Another method is to have two tanks set side by side. The produced water enters into the first tank which has a cross over pipe attached to the second tank near the top. As the produced water level rise, with some stratified oil on top, the oil being the first to reach the cross over pipe flows into the previously empty second tank. The amount of liquid transferred in this manner depends on the liquid level in the first tank. This method works as long as only the oil flows into the second tank. However, this method takes a lot of supervision and rarely works without the oil and water being combined.

By installing the height adjustment apparatus in the first of a two tank system, the pumper adjusts the height of the outlet to the bottom of the light oil and pumps this into the second and previously empty tank. After a period of time the first tank will again have more light oil and the process is repeated again until there is enough oil for an oil sale. The pumper may choose to extract the dirty oil if he feels it is cost effective to call in a hot oil truck to prepare it for sale. Occasionally the pumper will need to call in a water truck to remove the produced water and BS&W. However, he now has the option to wait until there is a full load thereby greatly reducing the cost per barrel removed. Judicious use of the apparatus may reduce water and hot oil truck use significantly, in some cases even greater than ½ to ¼ as often. Also crude oil transports can be assured that the oil in the second tank will meet the requirements to be sold, thereby saving the oil company stand-by charges if it is not accepted. An additional advantage to the use of the apparatus to eliminate the need to closely coordinate water truck and crude oil truck arrival times.

Scenario 6

The goals and conditions are the same as Scenario 6 except the well location depicted is in a remote area without electricity, therefore pumping from one tank to another using an electric pump is not an option.

Figure 67:
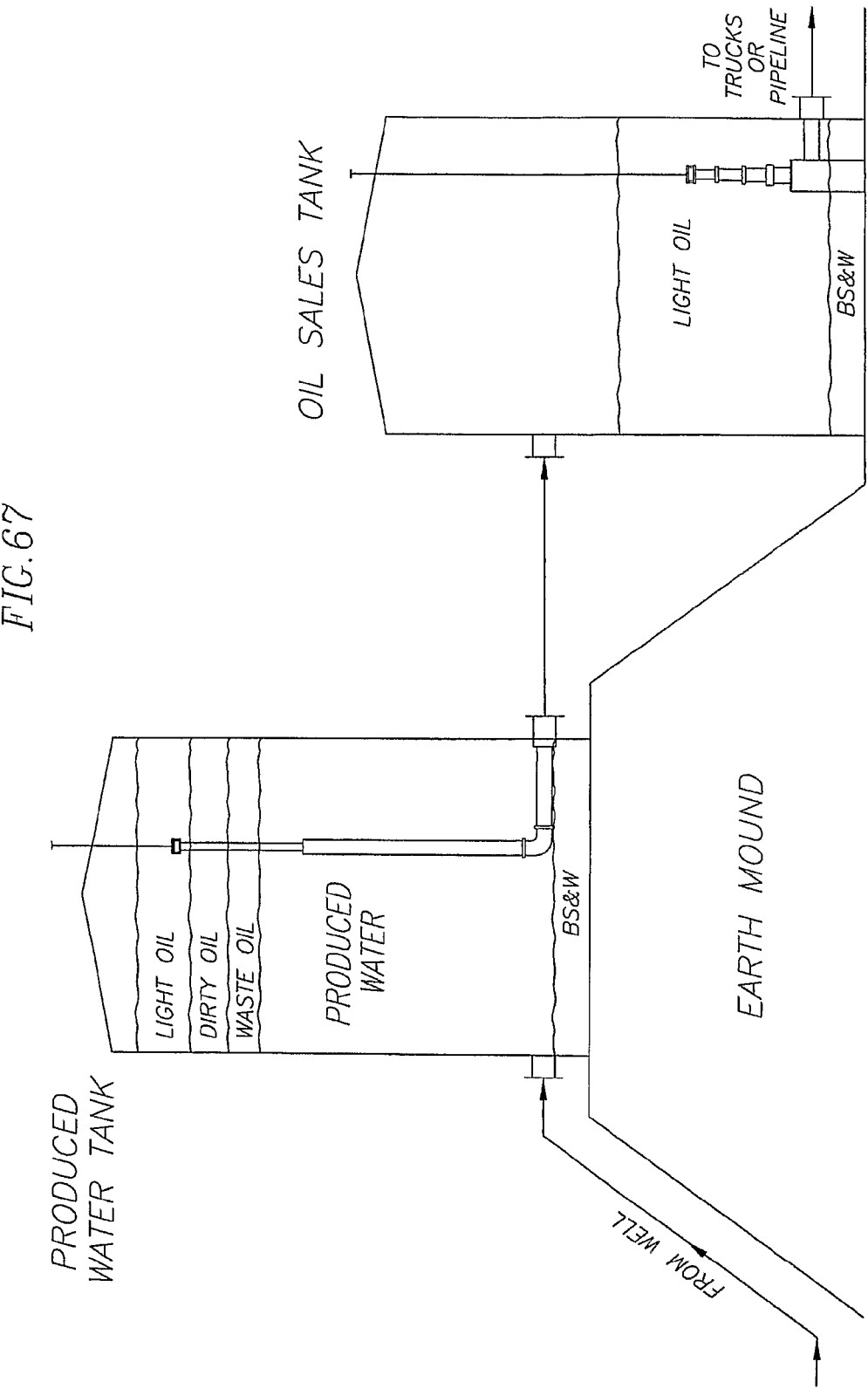
FIG. 67 is a schematic diagram of the use of the tool between a produced water tank and a lower elevation oil sales tank, in accordance with the present invention.

An earthen mound (FIG. 67) is created that is eight to twelve feet higher than the rest of the well location. The produced water tank is set on this elevated mound and the oil sales tank is set at normal ground level. Pressure from the oil and gas well will fill the produced water tank. There is now an elevation differential between the two tanks sufficient to allow gravity to move the light oil in the produced water tank through the outlet of the apparatus to the oil sales tank. The process of removing oil from the higher to lower tank may be repeated several times until there is enough light oil for an oil sale. If the pumper is careful to set the apparatus at the proper level the oil sales tank will only contain good oil. Other tanks could be set at ground level and connected to the apparatus but used to store only waste liquid or BS&W. This would further increase efficiency and profitability by removing full truck loads of like liquids instead of many partial loads of blended liquids that have to be re-processed to prepare for disposal or re-use. Using this method allows for the transfer of specific stratified liquids to appropriate tanks without the use of electric or other mechanical pumps.

In the above scenarios, with the exception of Scenario 3, a suitable solution would be impossible with the prior art, fixed height outlets, unless an additional bypass line to the injection well pipeline is installed. Scenario 2 would appear possible but all the produced water in tanks 80, 81 and 82 would first have to be removed, if they share a common manifold which is a standard industry practice. The interface zones would be reached at differing times, therefore, the produced water from one tank would be blended with the interface from another. This would create problems by sending too much water in the waste liquids or too much waste to the water disposal line. This would cause the combined liquids to be out of compliance with regulations governing the reuse and/or disposal of liquids.

Minimal operator attention and opportunity for error are primary objective of liquid management. Accordingly, the apparatus preferred use is the extraction of the highest stratified liquid zone first. By using this technique, with the outlet set at desired height, once the liquid is removed there is no possibility of mixing with the lower stratified liquids. This pre-supposes that the tank in use during this process is isolated, by closing valves, from other extraction or input sources to maintain constant liquid level. The next highest stratified zone is likewise dealt with and so on. However, if the process requires removing a specific stratified liquid zone with other zones above it the operator must shutoff the discharge valve or pump immediately once this is done. This method will also allow the target zone to be extracted without co-mingling of zones, but requires operator diligence.

Figure 80:
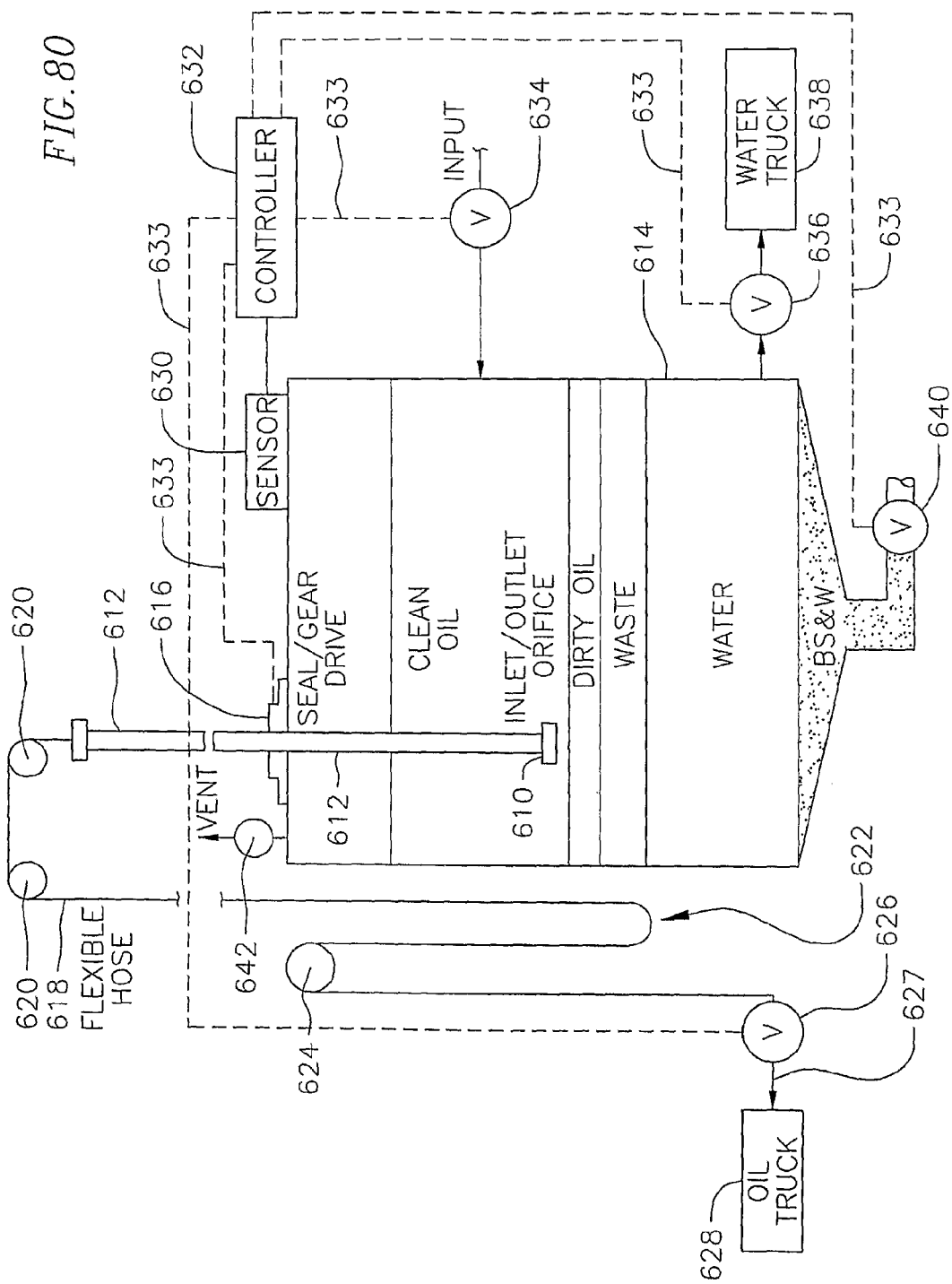
FIG. 80 is a schematic diagram of the invention mounted to handle liquids in a tank through an orifice on the lower end of a vertically movable tube extending through the top of the tank.

In the alternate embodiment of the invention shown in FIG. 80, an inlet/outlet orifice 610 at the lower end of a vertical collection tube 612 permits liquid to be introduced into, or removed from a tank 614.

The collection tube is moved up and down through a seal/gear drive 616 of the type described above with respect to FIGS. 10, 11, 60, 61, and 73-79. In general, the drive 616 includes the outwardly opening Woodruff-type or crescent shaped (not shown in FIG. 80) to receive Woodruff-type crescent tabs (not shown in FIG. 80) in the drive. A flexible hose 618 connected to the upper end of tube 612 extends over pulleys 620, down into a loop 622, and back over a support 624 before extending down again to an oil valve 626 in an oil line 627, which can be connected to an oil truck 628. A sensor 630, which is of the sonar, radar, or infrared types (described above with respect to FIGS. 68-79) on top of the tank measures the positions of different layers of liquid in the tank, and sends appropriate signals to a controller 632 connected through control lines 633 as shown in FIG. 80 to operate the drive 616, oil valve 626, a liquid input valve 634, a water outlet valve 636 (which can be connected to a water truck 638), and a cleanout valve 640 at the bottom of the tank. A vent valve 642 at the top of the tank can also be operated by the controller to prevent excessive positive or negative pressure in the tank. Alternatively, the vent valve 642 is a pressure relief type which automatically opens when the pressure difference across it exceeds a preset limit.

When space is limited at the top of the tank, the tube 612 is made up of threaded sections of convenient length, which can be added or removed as the tube is lowered or raised.

As with the embodiments using a stand pipe as described above, the apparatus of FIG. 80 can be used to remove oil and water simultaneously from the tank. In this case, the sensor measures the height of the bottom boundary of the clean oil layer, and moves the inlet/outlet orifice to the appropriate position to remove clean oil without including dirty oil. The controller also closes oil valve 626 when the top layer of the clean oil reaches the desired level. Alternatively, if the oil valve is not closed by the controller, removal of clean oil automatically stops after the top level of the clean oil layer reaches that of the inlet/outlet orifice.

Figure 81:
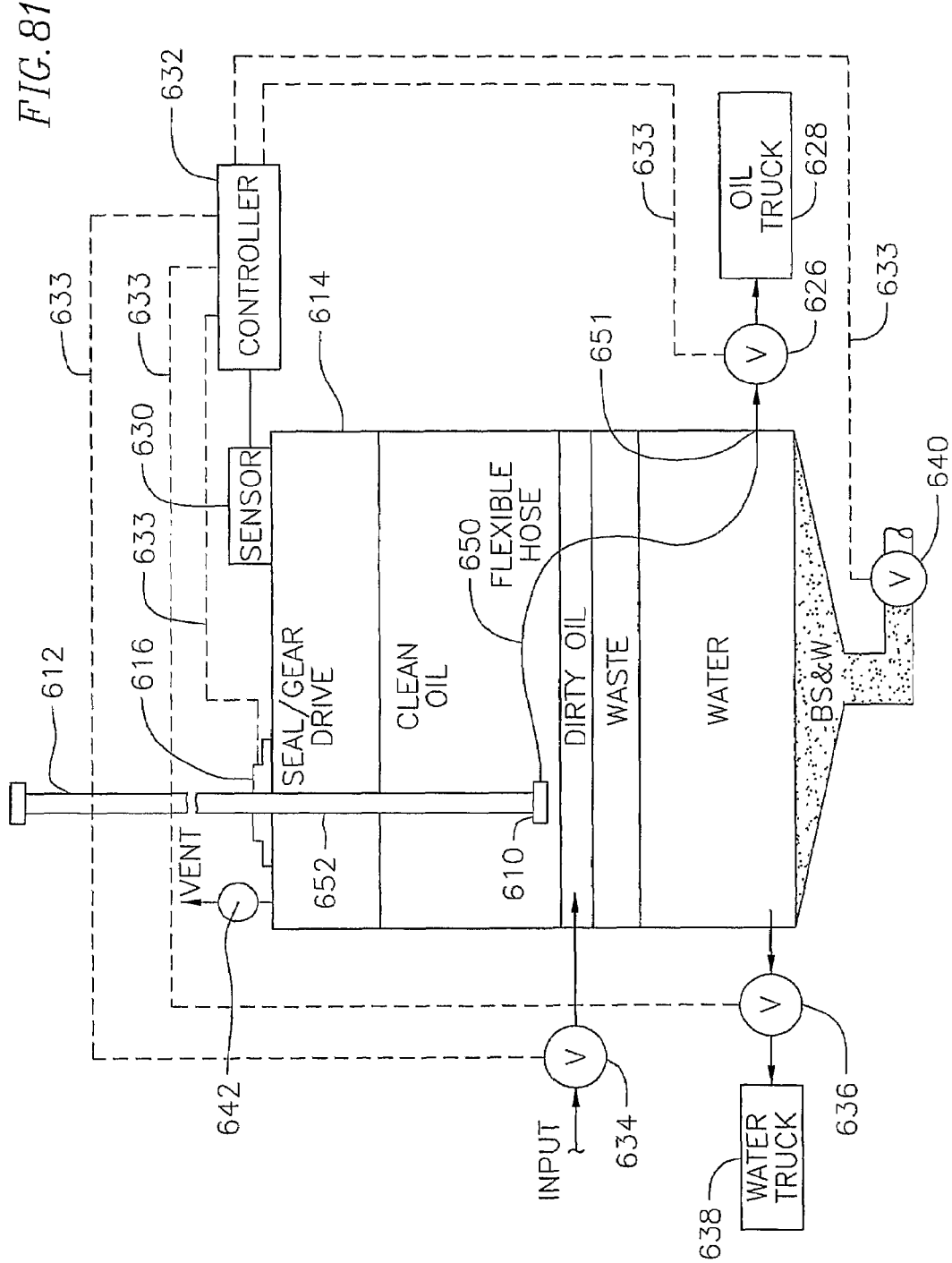
FIG. 81 is a schematic diagram of the invention which includes a flexible hose in a tank for transferring liquid into or out of the tank.

The embodiment shown in FIG. 81 is similar to the apparatus shown in FIG. 80, except that in FIG. 81 the inlet/outlet orifice 610 is connected to the inlet end of a flexible hose 650 in the tank. The outlet end of the hose is connected to the oil valve 626 through a pipe 651 which extends from the interior to the exterior of the tank. The collection tube 612 of FIG. 80 is replaced in the apparatus of FIG. 81 by a solid rod 652 which extends up through the seal/gear drive 616 so the inlet/outlet orifice 610 can be precisely positioned by the controller 632 to any desired level in the tank in response to signals from the sensor 630. The rod 652 is made up of threaded sections (not shown in FIG. 81) when space is limited on top of the tank.

Figure 82:
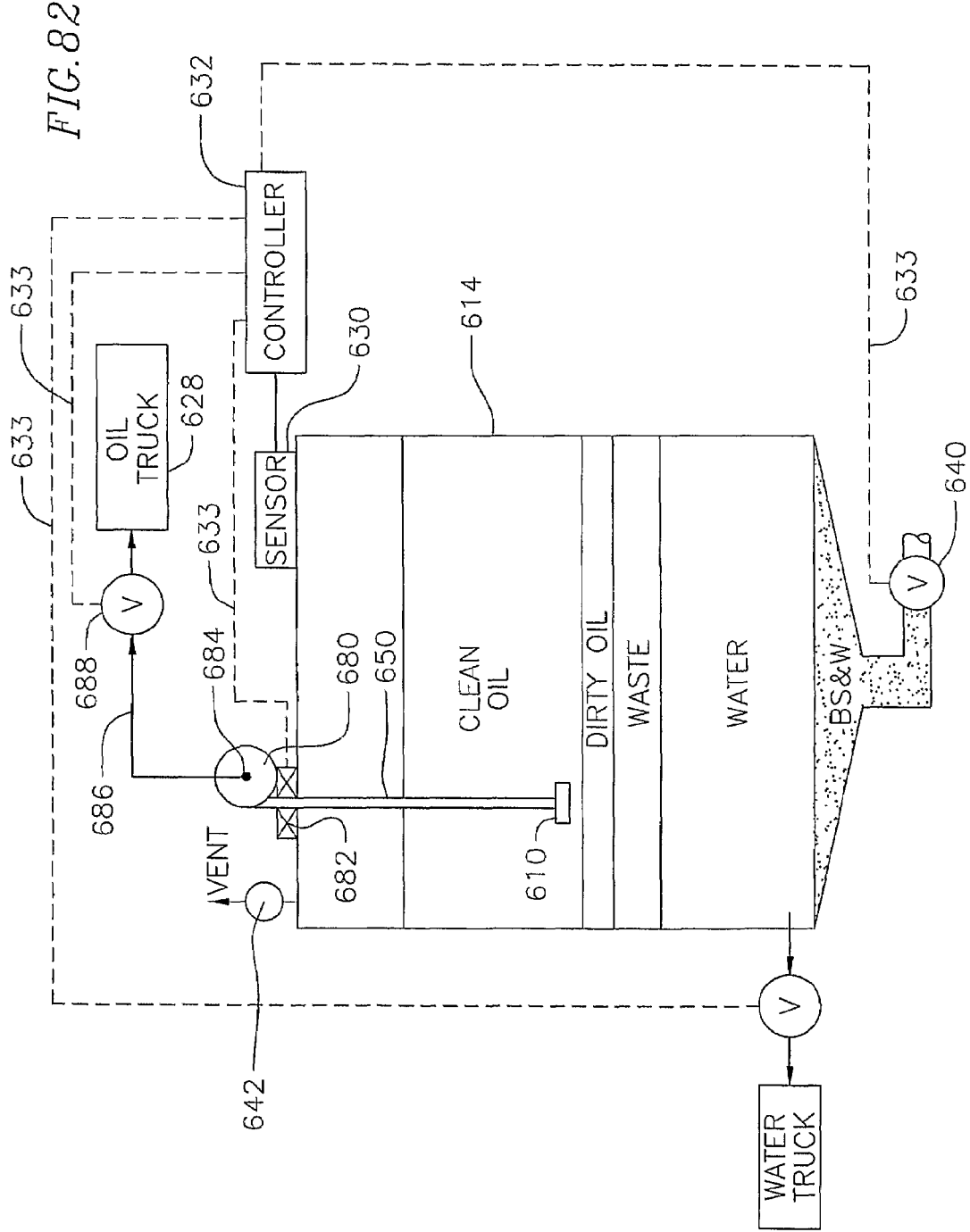
FIG. 82 is a schematic diagram of the invention which uses a reel on top of a tank to raise and lower a flexible hose extending down into the tank, the inlet/outlet orifice being on the lower end of the hose.

In the embodiment shown in FIG. 82, the inlet/outlet orifice 610 is on the lower end of an elongated flexible hose 650, which is lowered and raised in the tank 614 by an electrically powered reel 680 mounted on top of the tank. A releasable seal 682 on top of the tank is disposed around a flexible hose when the hose extends through the tank top down into the tank. The releasable seal is operated in the same manner as a blowout preventor by a signal from a control line 633 (not shown in FIG. 82) connected to the controller 632. The upper end of a the flexible hose is connected to a hollow shaft 684 for the reel. A swivel (not shown in FIG. 82) at one end of the hollow shaft 684 connects to an oil outlet line 686, which includes a valve 688 for controlling flow of oil into the oil truck 628.

The reel is operated by signals from the controller 632 (which receives signals from the sensor 630 as previously described) to position the inlet/outlet orifice at the required depth. The flexible hose includes marks (not shown in FIG. 82) to indicate the location of the orifice. Alternatively, the reel is indexed to provide precise positioning of the orifice within the tank.

Figure 83:
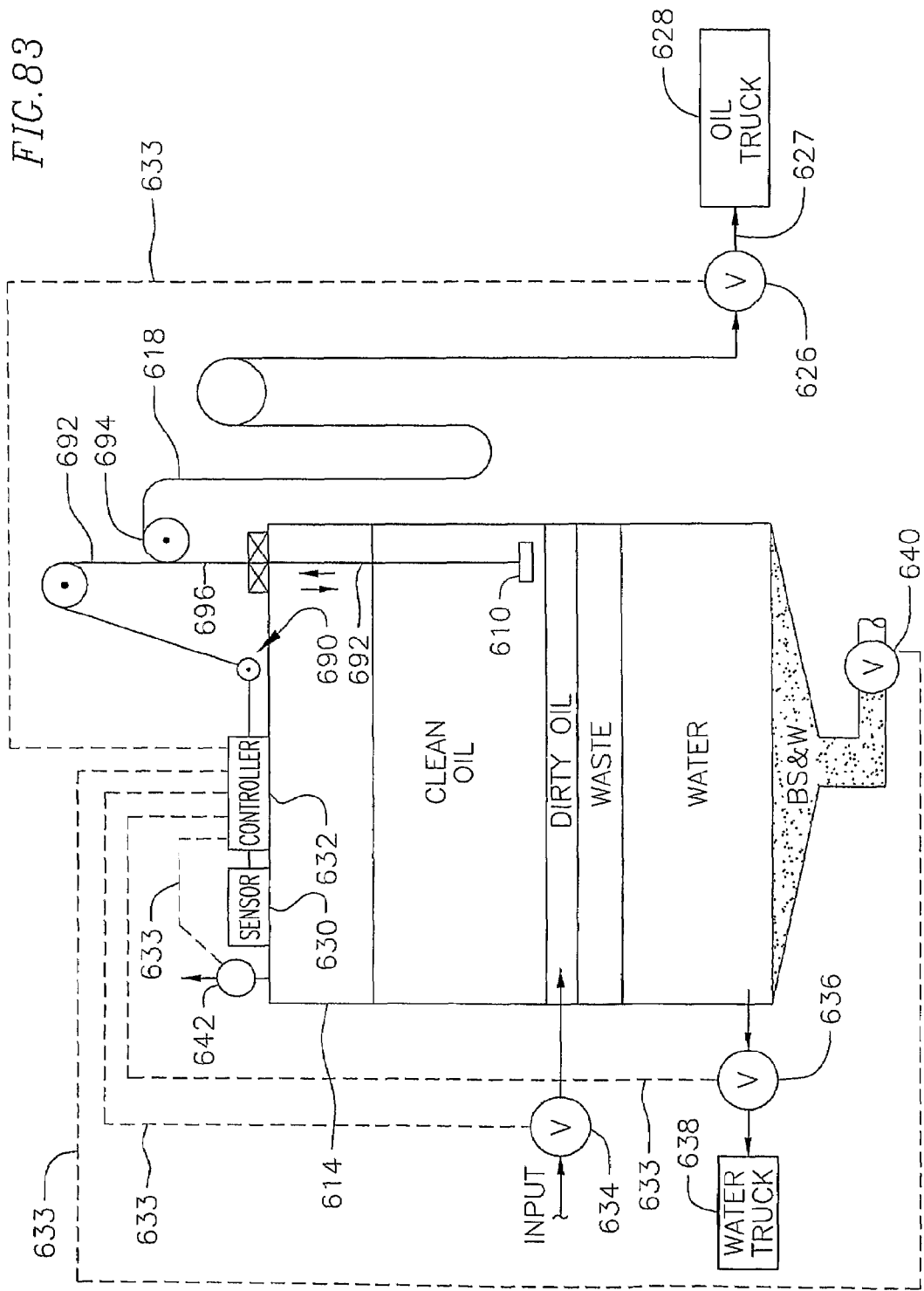
FIG. 83 is a schematic diagram of the invention which uses a draw works on the top of a tank to move an inlet/outlet orifice up and down in the tank.

The embodiment shown in FIG. 83 is similar to that shown in FIG. 80, and like reference numerals are used in each figures for corresponding elements. With the apparatus shown in FIG. 83, the inlet/outlet orifice 610 is on the lower end of a vertical collection tube 692, which makes a sliding fit through a blowout preventer 682 mounted on top of the tank 614. The tube is raised and lowered by draw works 690 mounted on top of the tank. A hoisting cable 692 in the draw works is secured at one end to a lifting eye 694 welded to an elbow 696 on the upper end of the tube. A flexible delivery hose 618 connects the upper end of the tube (through the elbow) to the oil truck 628 through the oil valve 626 and oil line 627. The inlet/outlet orifice 610 is positioned by operating the draw works in response to signals from the controller 632, which receives information from the sensor 360 as previously described.

As with the embodiments of the invention using a standpipe with a telescoping tube mounted in it, the embodiments shown in FIG. 83 can be used to transfer liquid either into or out of selected levels of the tank.

Figure 84:
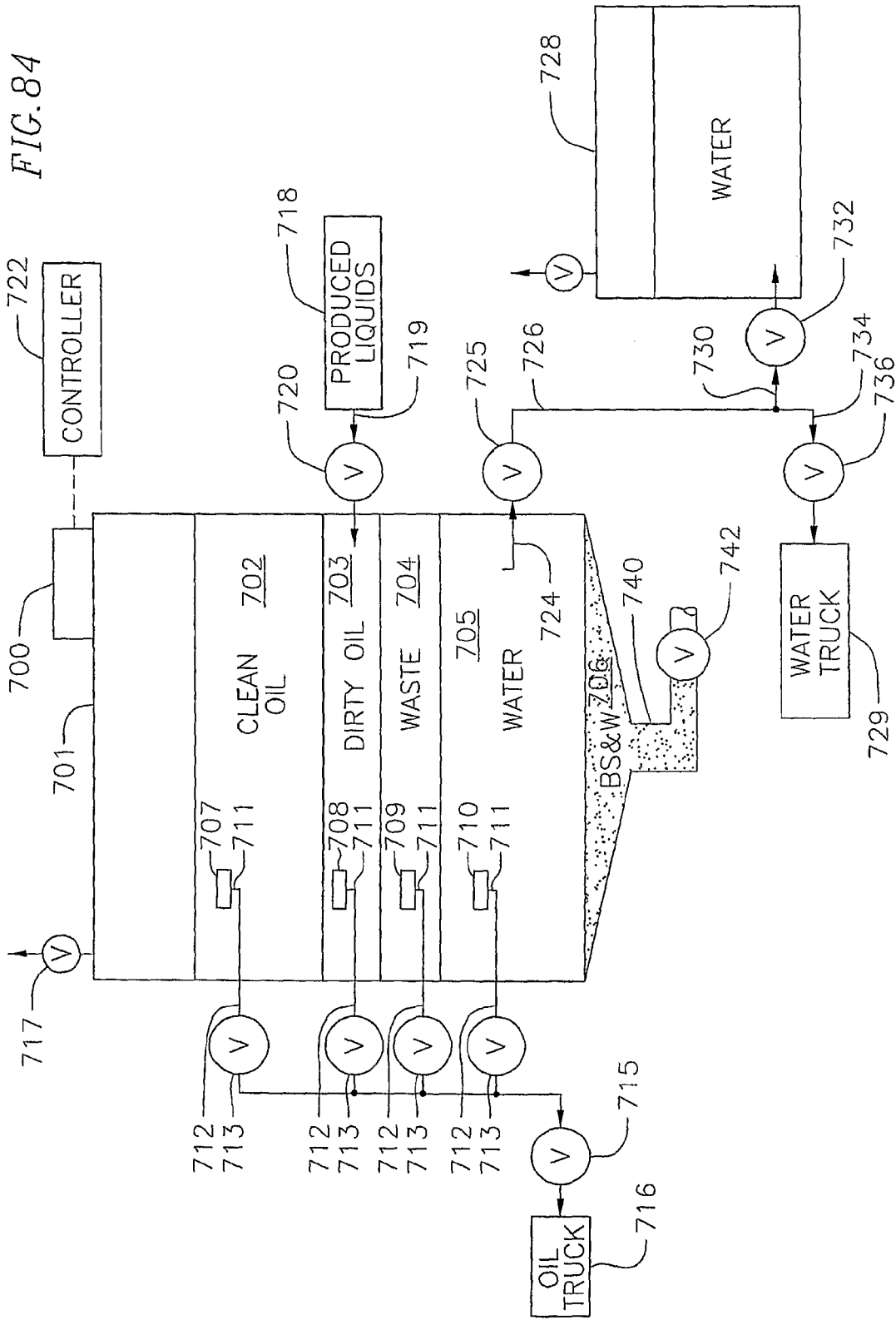
FIG. 84 is a schematic diagram of the invention which uses a plurality of inlet/outlet orifice.

Referring to FIG. 84, a sensor 700 (such as the level-determining device 315 or 319 described above with respect to FIGS. 68-79) on top of a storage tank 701 measures the respective locations of clean oil layer 702, dirty oil layer 703, waste layer 704, and water layer 705 in the tank. A BS&W layer 706 rests on the bottom of the tank.

First, second, third, and fourth inlet/outlet orifices 707, 708, 709, and 710 similar to that described above with respect to FIG. 40 are respectively disposed in each of layers 702, 703, 704, and 705.

Each orifice is connected to the upper end of a respective vertical pipe 711. Each vertical pipe 711 is connected to a respective horizontal pipe 712 which extends through a sealed joint (not shown in FIG. 84) to a respective control valve 713 exterior of the tank. Each control valve 713 is connected through a collection line 714 to a valve 715, which can be connected to an oil truck 716. An automatic venting valve 717 on top of the tank keeps the pressure in the tank within safe limits. The inlet/outlet orifices permit liquid to be added to or removed from the tank at the levels where the orifices are mounted. If liquid is to be added to the tank instead of removed, the oil truck is replaced by a pump (not shown) and a source of liquid (not shown) to be added to the tank.

Ordinarily, produced liquids 718 from a well (not shown) is admitted to the tank through a production line 719 and a filling valve 720. The respective positions of the inlet/outlet orifices ordinarily remain fixed, but each can be adjusted vertically by changing the length of the respective vertical pipe 711.

A controller 722 (which can be an automated system for managing the levels of the stratified liquids in the tank as described above with respect to FIGS. 68 and 69) receive signals from the sensor 700, and regulates the flow of produced liquids into and out of the tank so that at least one of the orifices is always in a layer of clean oil. Managing the level of the clean oil layer can also be effected by removing water from the water layer through a water outlet line 724 connected through a water control valve 725 and a distribution line 726 to either a water accumulation tank 728 or a water truck 729. A first water filling line 730 is connected to line 726 and through a valve 732 to the water tank 728. A truck water line 734 is connected to line 726 through a control valve 736 to the water truck.

A sensor 738 on top of the water accumulation tank measures the water level in that tank and sends information to the controller, which is used to operate the various valves shown in FIG. 84 to manage the flow of liquids as required by the operator. The valves can be operated either remotely by a wireless system, or can be wired to the controller.

BS&W is removed from the bottom of the tank through a clean-out line 740 and a clean-out valve 742.

For those installations handling produced liquids from a well which initially produces a high ratio of clean oil to water, the storage tank 701 may have a clean oil layer which extends from above the first orifice 707 down below the fourth orifice 710. In this case, clean oil can be removed through the fourth orifice 710 until the oil/water ratio of the produced liquids from the well drops to the point that the lower boundary of the clean oil layer is above the fourth orifice 711. Thereafter, the control valves 713 are operated in response to signals from the controller so that only clean oil is removed from the tank through an appropriate orifice.

As shown in FIG. 84, the water accumulation tank 728 is below that of the primary tank 701 so that water can flow by gravity from the primary tank to the water accumulation tank. This facilitates management of the clean oil layer in the primary tank to the desired level. Moreover, the water accumulation tank can receive water from one or more other storage tanks to facilitate adjustment of the clean oil layers in those tanks. The water accumulation tank also facilitates scheduling water trucks for efficient pick up of water loads.

Figure 85:
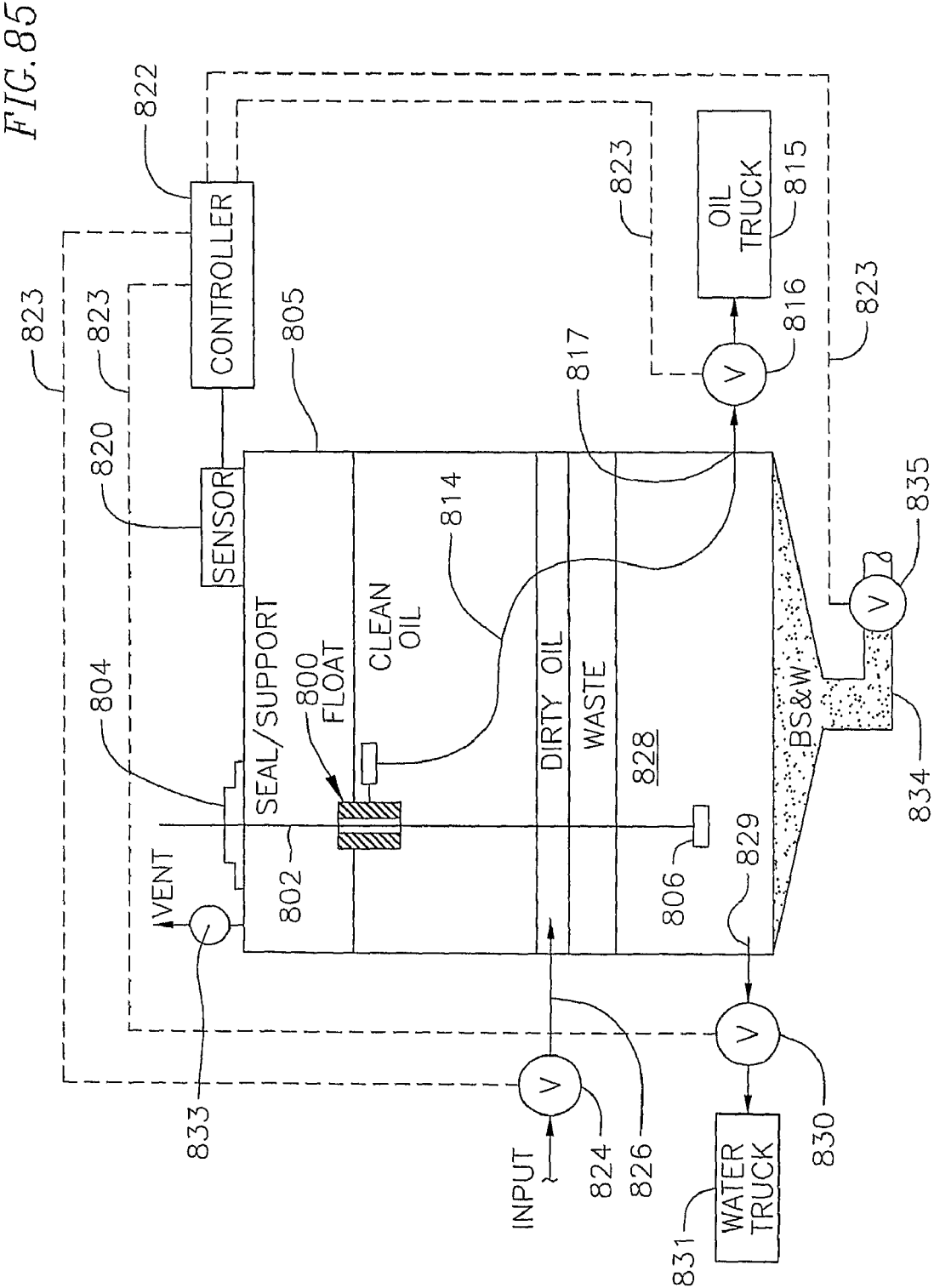
FIG. 85 is a schematic diagram of the invention which uses a plurality of inlet/outlet orifice which uses an inlet/outlet orifice carried by a float.

Referring to FIG. 85, an annular float 800 is disposed around a vertical guide rod 802 which extends up through a seal/support 804 (of the type described above with reference to FIGS. 10, 11, 60, 61, and 73-79) on top of a storage tank 805. The lower end of the guide rod carries an outwardly extending flange 806 so the float remains captured on the guide rod, and so the rod can be used to retrieve the float when the seal/support is disconnected from the tank top.

An inlet/outlet orifice 808 of the type previously described above with respect to FIG. 40 is secured by a bracket 810 to the float so the orifice is just below the upper boundary of a layer 812 of clean oil when the float is buoyed entirely by clean oil as shown in FIG. 85. The upper end of a flexible hose 814 is connected to the inlet/outlet orifice. The lower end of the hose is connected to an oil truck 815 through an oil outlet valve 816 and an oil line 817 sealed through the side of a lower portion of the tank.

As with the previously described embodiments, a sensor 820 of a type previously described with respect to FIG. 68 measures the thickness and position of each layer in the tank, and generates signals for a controller 822 so that oil is removed as required from the clean oil layer. Control signals from the controller are transmitted either wirelessly or by wires 823 to the various valves to manage flow of liquids as required.

As shown in FIG. 85, the lower end of the float 800 is disposed slightly below the level of the inlet/outlet orifice 808. Therefore, as clean oil is removed, the float moves downwardly until it enters the dirty oil layer a sufficient distance to achieve increased buoyancy which limits further travel of the float into the dirty oil layer, and which is at a level that keeps the inlet/outlet orifice 808 in the clean oil layer. At this point, the sensor closes the oil valve 816, or it can permit clean oil to be further withdrawn from the tank until the level of the clean oil reaches that of the inlet/outlet orifice. If the oil valve is left open, flow through the flexible hose stops when the level of the oil in the hose balances the pressure in the oil truck.

An automatic venting valve 833 on top of the tank keeps the pressure in the tank within safe limits. BS&W is removed from the bottom of the tank through a cleanout line 834 and a cleanout valve 835.

As with the previous embodiments, produced liquids from a production well (not shown in FIG. 85) are added to the tank through a filler valve 824 and fill line 826. Water is removed from a water layer 828 through water line 829 and water valve 830, and delivered to a water truck 831. Water can be removed from the apparatus shown in FIG. 85 simultaneously with oil removal. In this case, the float automatically keeps the inlet/orifice in an appropriate position for removal of only clean oil as liquid is taken from the tank. If desired, oil, water, and BS&W can all be removed simultaneously from the tank, or be removed in series.

As with the embodiments of the invention using a standpipe with a telescoping tube mounted in it, the embodiments shown in FIGS. 84 and 85 can be used to transfer liquid either into or out of selected levels of the tank.

Figure 91:
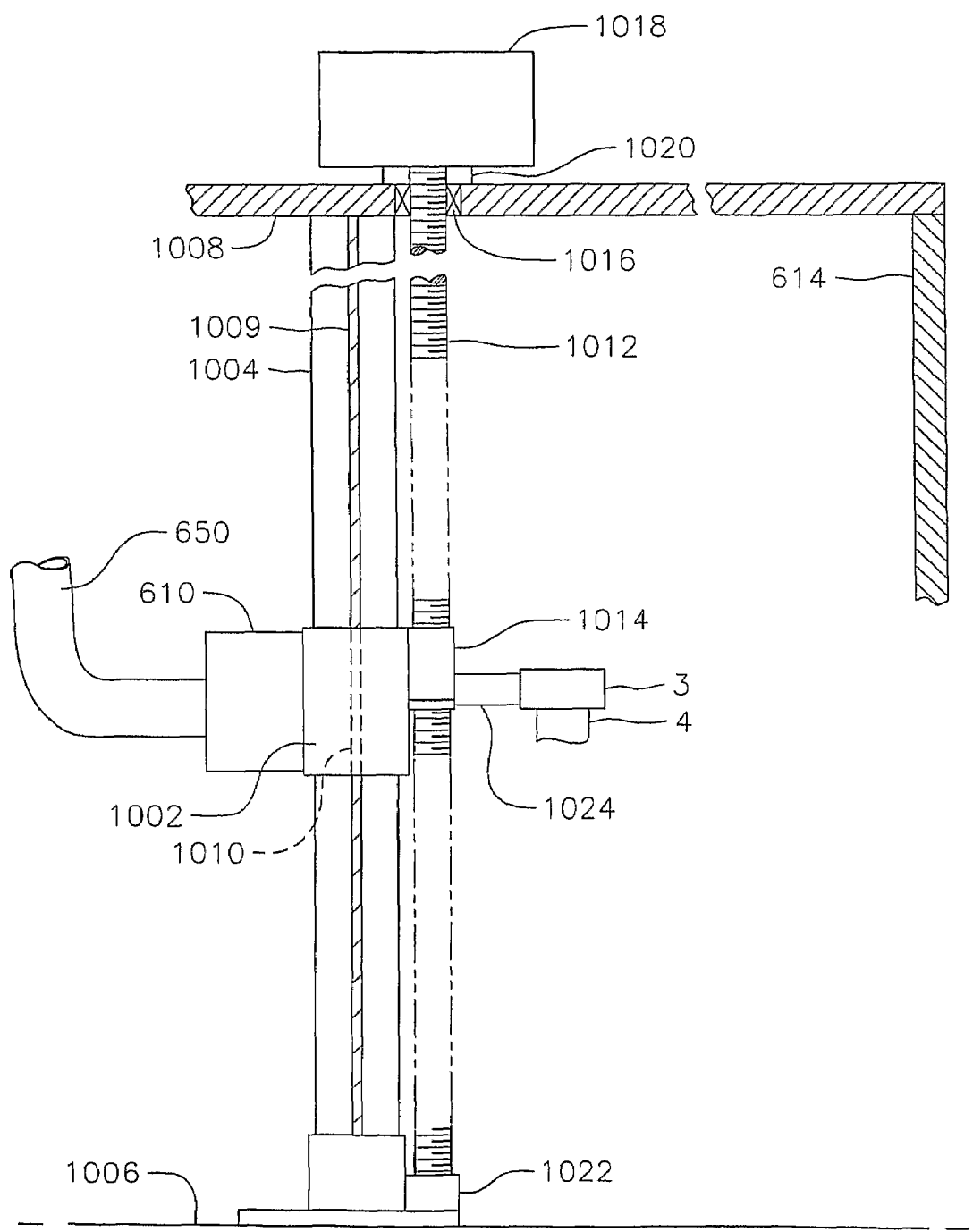
FIG. 91 is a fragmentary elevation of a vertical threaded screw or rod mounted in a tank to move a drive sleeve up and down to change the position of the inlet/outlet orifice in the tank.

The embodiment shown in FIG. 91 is similar to the apparatus shown in FIG. 81, except that the inlet/outlet orifice 610, which is connected to the inlet end of the flexible hose 650, is secured to the exterior of a cylindrical guide sleeve 1002 mounted to slide up and down a vertical guide column 1004, which extends from the bottom 1006 to the top of 1008 of tank 614. An external vertical rib 1009 on the exterior of guide column 1004 makes a close sliding fit in a mating vertical internal slot 1010 in the guide sleeve to prevent the guide sleeve from rotating around the guide column.

A vertical, externally threaded positioning (height-adjusting) rod 1012 is threaded through an internally threaded drive sleeve 1014 secured to the exterior of the guide sleeve. The upper end of the positioning rod 1012 is not threaded, and extends up through a rotatable seal 1016 in the tank top, and into a gear box 1018 mounted on the exterior of the tank top. A thrust bearing 1020 between the gear housing and tank top is grounded and secured to the positioning rod to support it against vertical loads in both the up and down direction. A lower thrust bearing 1022 on the tank bottom supports the lower end of the positioning rod against vertical loads in both the up and down direction. Alternatively, the lower end of the positioning rod can simply make a close sliding fit in a collar (not shown) secured to the lower end of the column and above the tank bottom.

The gear box 1018 is automated as previously described (for other embodiments with reference to FIGS. 68-72) to operate in response to signals from the sensor 630 (FIG. 81) and controller 632 to rotate the positioning rod to move the drive sleeve and inlet/outlet orifice to any desired height within the tank. A readout shaft (not shown) in the gear box generates a signal which is sent to the controller to show the precise position of the inlet/outlet orifice 610. The advantage of the apparatus shown in FIG. 91 is that the positioning rod does not have to move vertically, and therefore does not have to project various distances above the tank top during the operation of the equipment. FIG. 91 also shows an alternate embodiment in which the drive sleeve 1014 is connected by a bracket 1024 to the inlet/outlet assembly 3 mounted on the upper end of vertical telescoping pipe 4, such as that shown in FIG. 1, 5, or 7. Thus, as the drive sleeve moves up and down, the inlet/outlet assembly 3 is also moved to the required height in the tank.

By using a low friction lead screw or thread in the drive sleeve (mating with the external thread on the height-adjusting rod 1012), in some applications the vertical guide column 1004 can be omitted because either the flexible hose 650, or the telescoping pipe 4 provides sufficient resistance to rotation of the drive sleeve that the drive sleeve moves up and down the height-adjusting rod rather than merely rotating with it.

Moreover, if the vertical guide column 1004 is used, it need not be circular. For example, it can have a non-circular cross section, such as square, hexagonal, or the like, and the guide sleeve is provided with a mating opening. With that arrangement, external vertical rib 1009 is not required. In addition, the guide sleeve need not to be continuous but can be formed in the shape of two opposing shoes (not shown) secured to the drive sleeve, and extending on opposite sides of the vertical guide column to prevent rotation of the drive sleeve when the positioning rod 1012 is rotated.

Figure 92:
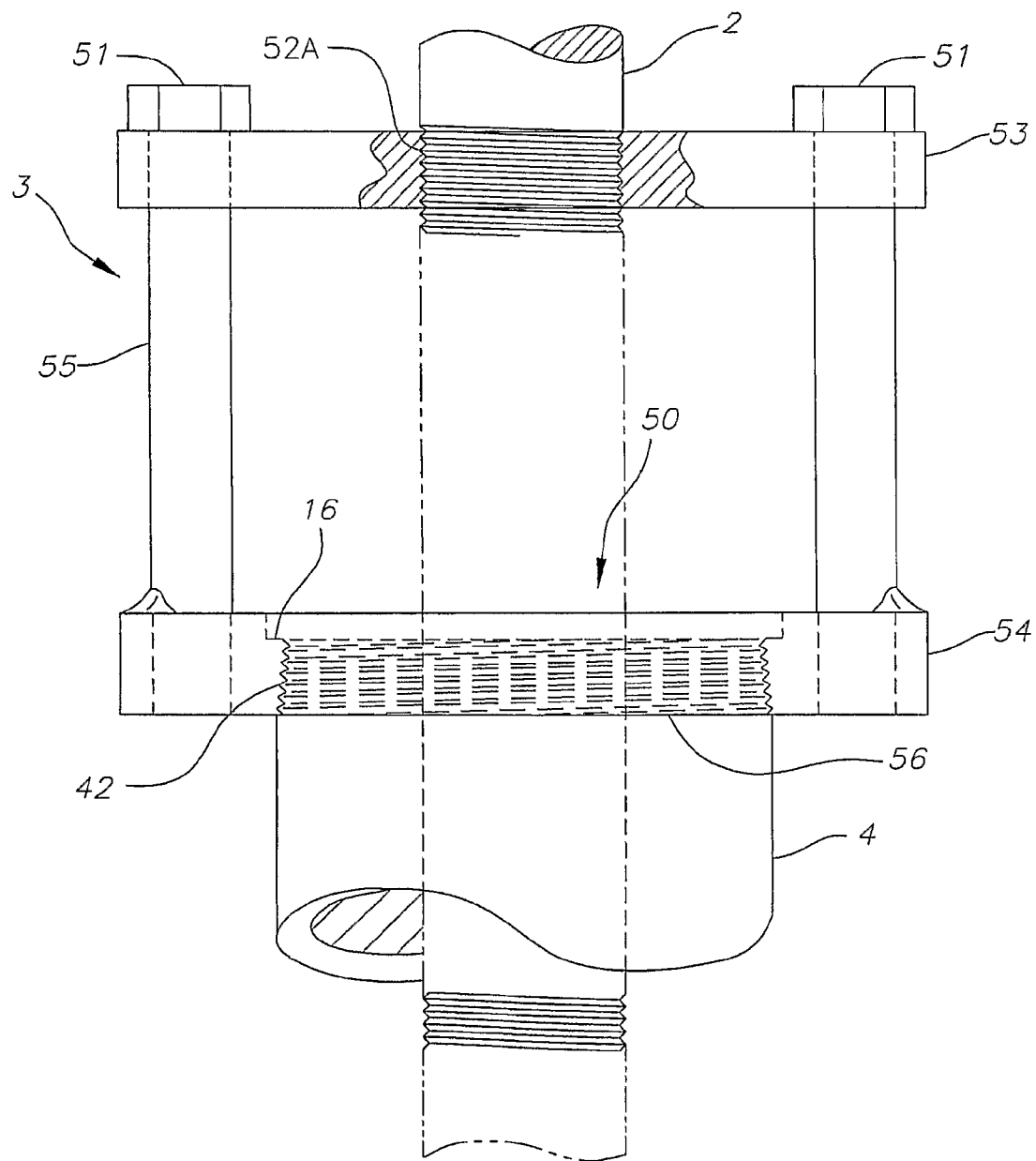
FIG. 92 is a fragmentary elevation partly in section showing a threaded screw or rod connected to the inlet/outlet assembly.

FIG. 92 shows apparatus similar to that of FIG. 14 for moving telescoping pipe up or down in standpipes 9 (shown in FIG. 1). With the apparatus of FIG. 92, the measurement or positioning rod 2 is externally threaded, and is threaded through internally threaded hole 52A in top plate 53 of the inlet/outlet assembly 3. The upper and lower ends of rod 3 are supported as previously described with respect to 1012 shown in FIG. 91. Thus, as rod 2 is rotated with the gear box shown in FIG. 91, the inlet/outlet assembly 3 is adjusted vertically to the required position. Rotation of the telescoping portions of telescoping pipe 4 relative to each other and the standpipe is prevented by suitable mating vertical ribs and grooves (not shown in FIG. 92) such as that described with respect to FIG. 91. Alternatively, the telescoping pipe and standpipe 9 can be slightly non-circular so they cannot rotate relative to each other, but can still be provided with effective sliding seals. As with the arrangement in FIG. 91, the embodiment shown in FIG. 92 avoids having to move the rod 2 vertically, and thereby avoids the rod having to project any significant distance above the tank top.

Figure 93:
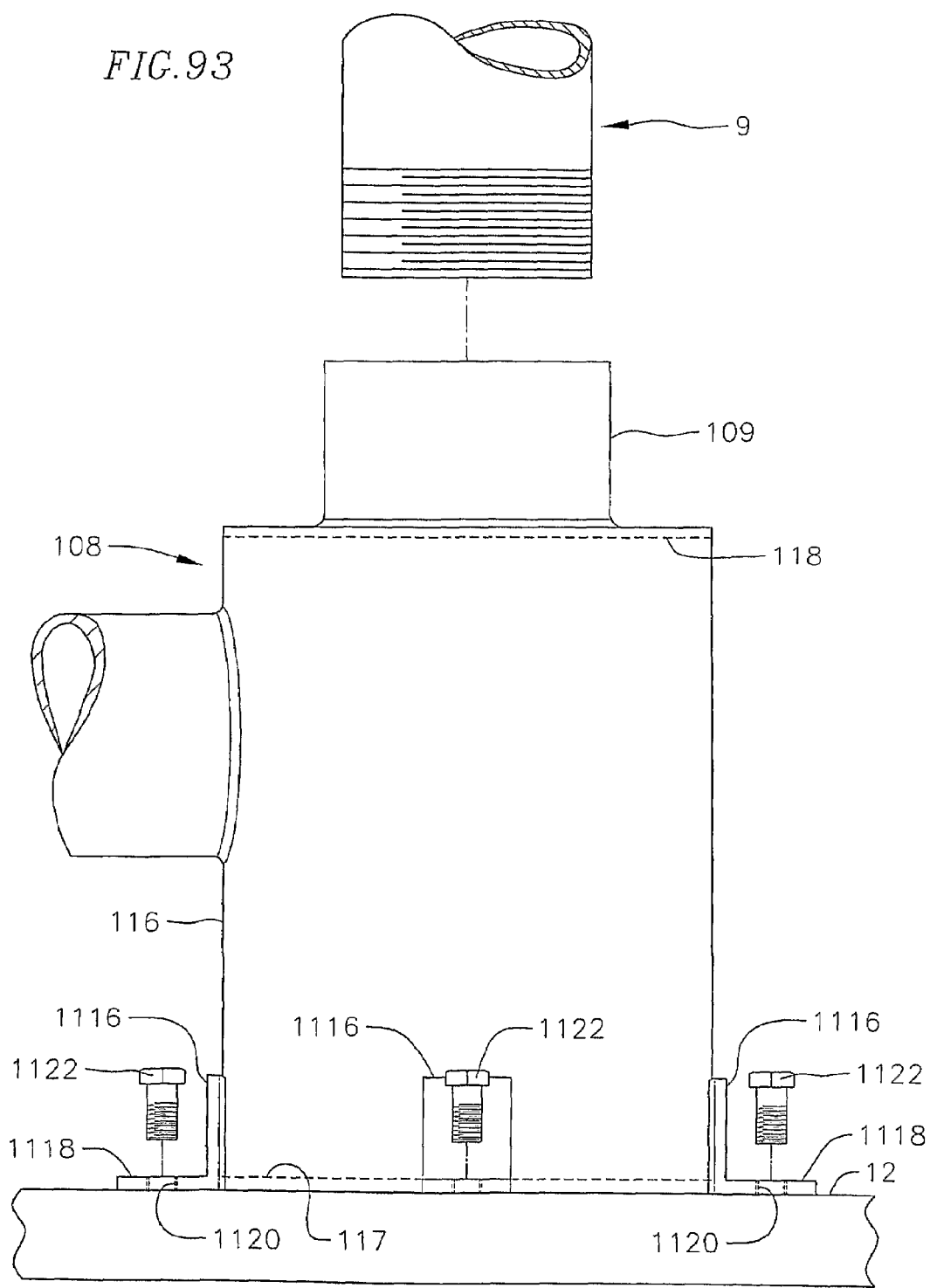
FIG. 93 is a fragmentary elevation of adjusting screws to align the standpipe support to be collinear with coupling threads in the top of the tank.

FIG. 93 shows an embodiment identical with that shown in FIGS. 38-41, except that 4 L-shaped tabs 1116 are welded at intervals of 90° to the exterior of the lower end of cylindrical wall 116 of the transition housing 108. (The same reference numerals are used in FIG. 93 to identify corresponding parts shown in FIGS. 38-41). Each tab includes an outwardly extending horizontal foot 1118 with a vertical internally threaded bore 1120 to receive a respective threaded adjusting bolt 1122. The bolts are turned to adjust the orientation of the transition housing 108 so the longitudinal axis of the standpipe 109 is collinear with the coupling threads on the top of the tank to which the transmission bushing attaches. With the transition housing properly oriented, it is welded to the tank bottom as previously described. A laser tool is used in the conventional way to determine proper orientation of the transition housing with the adjusting bolts before the housing is welded to the tank bottom. The embodiment of FIG. 93 can also be used to replace the elbow 11, bracket 10, and associated elements shown in FIG. 5 to provide for easier installation of standpipe 9.

Referring to FIGS. 94-99, the inner end of a flexible hose (conduit) 650 is connected to an inlet/outlet assembly 3000, which is connected to the exterior of an internally threaded cylindrical drive sleeve 1030 on a vertical externally threaded height-adjusting rod 1032, the lower end of which is journaled in an upwardly opening cup 1034 secured to the bottom 1036 of a cylindrical tank 12, such as that shown in FIG. 6 or FIG. 81, and having an upright cylindrical wall 1037.

The upper end of the height-adjusting rod is not threaded so that it presents a smooth cylindrical external surface 1038 (FIG. 96) which makes a fluid-tight rotatable seal through electrically conductive seals 1040 seated on an upwardly facing annular shoulder 1042 in a stepped vertical bore 1044 in an annular bushing 1046 seated on an inwardly extending and upwardly facing annular shoulder 1048 of an externally threaded support ring 1049 threaded into an internally threaded standard coupling 1050 welded in an opening 1051 of the tank top 1052. An externally threaded adjustable lock ring 1053 is threaded into the top of the standard coupling to lock the lock ring and bushing 1046 firmly in support ring 1049.

A thrust bearing 1054, secured in the usual manner to the height-adjusting rod 1032, rests on an upwardly facing annular shoulder 1056 in stepped bore 1044 of the bushing 1046.

A first snap ring 1058 locks the seals 1040 in place, and a second snap ring 1059 secures the thrust bearing in place. A pair of O-rings 1060 seal the annular space between the exterior of the bushing and the interior of the support ring. The height-adjusting rod 1032 is rotated about its longitudinal axis by a crank 1062 secured at its inner end by a bolt 1064 to the upper end of the rod. A crank handle 1066 on the outer end of the crank 1062 facilitates rotation of the rod. Alternatively, a drive gear 1068 secured to the rod just above the thrust bearing engages a gear-driven position indicator (not shown), which can be automated for remote operation.

A sensor 1069 is mounted on an elongated horizontal arm 1070 secured to the drive sleeve 1030 to be spaced 180° from the inlet/outlet 3000. The sensor includes a sonar transducer 1075 mounted on the outer end of the horizontal arm. A sonar receiver 1074 on the inner end of arm 1070 receives sonar signals from the transducer 1075. A flexible instrument signal cable 1076 extends down through a fluid-tight connection 1077 in the top of the tank, and includes a power line 1078 connected to the transducer, and a signal output line 1080 connected to the sonar receiver. Preferably, a temperature gauge 1081 is also included in the sonar receiver to generate an electrical signal indicating the temperature of the liquid surrounding the sensor 1069. Other detection and information devices, such as a BS&W meter, turbidity sensor, and the like can be used in addition to, or in place of the sonar transducer and receiver. A radar system can also be used for determining the nature of the surrounding liquid, and locating interfaces between various layers of liquids. With the sensor 1069 shown in FIG. 97 a sound signal transmitted from the transducer to the receiver indicates the nature of the fluid surrounding the sensor, and this information is transmitted through the signal line 1080 to the tank exterior so the position of the inlet/outlet assembly 3000 can be set at the desired height in the tank, as described below. A signal indicating the temperature of the fluid surrounding the sensor is also sent to the tank exterior so the standard volume of the transferred liquid can be determined for proper accounting.

The height-adjusting rod and the drive sleeve can be made of any suitable material. Stainless steel is presently preferred for the rod, and polytetrafluroethylene (PTFE) filled with carbon fibers or graphite for the drive sleeve. Preferably, low-friction square threads are used on the rod and sleeve to promote vertical movement of the sleeve when the rod is rotated, and without causing the sleeve and attached inlet/outlet 3000 and sensor arm 1070 to rotate with the rod.

Figure 97:
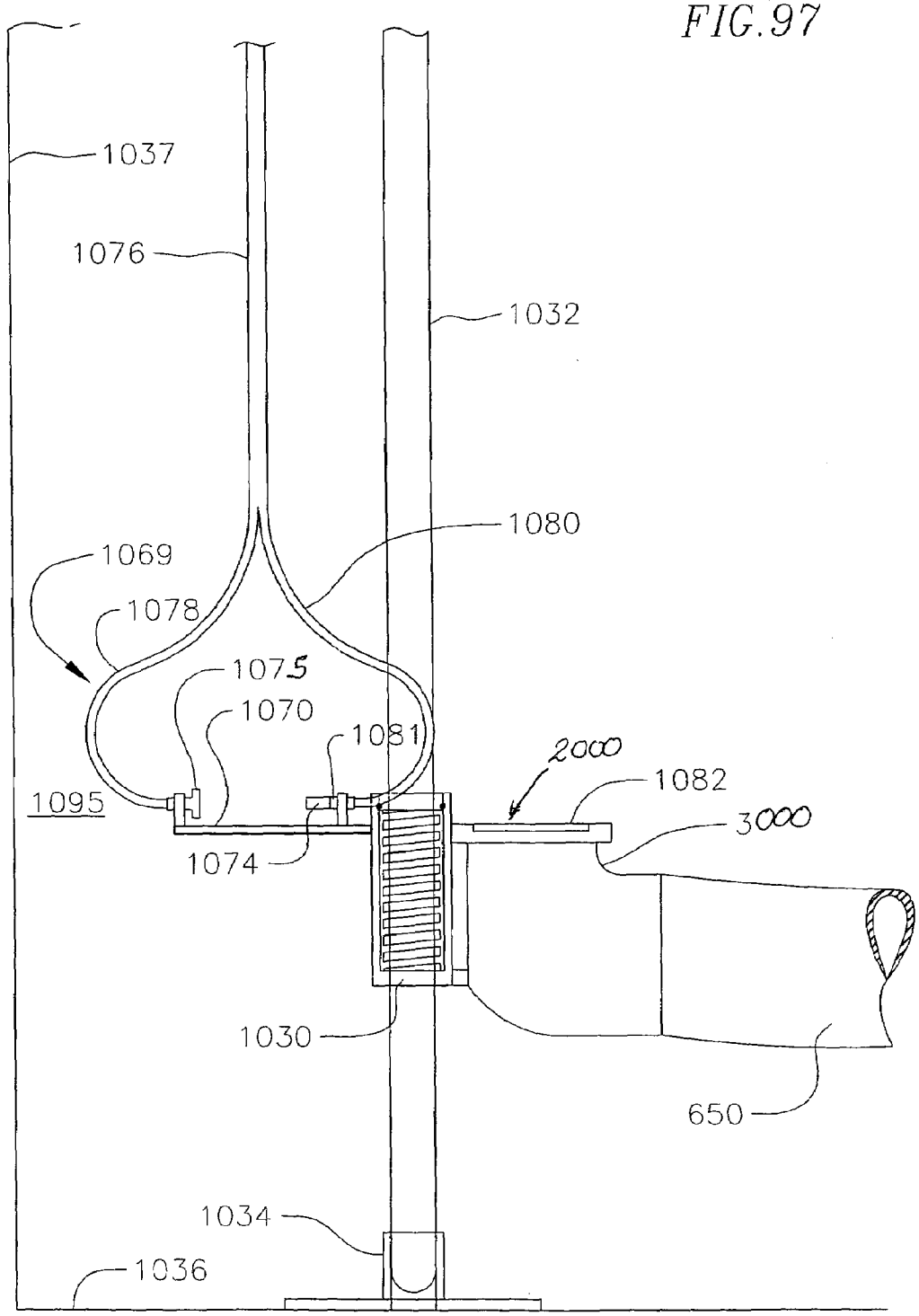
FIG. 97 is an enlarged view taken in the area of the box labeled "Detail C" of FIG. 94.
Figure 98:
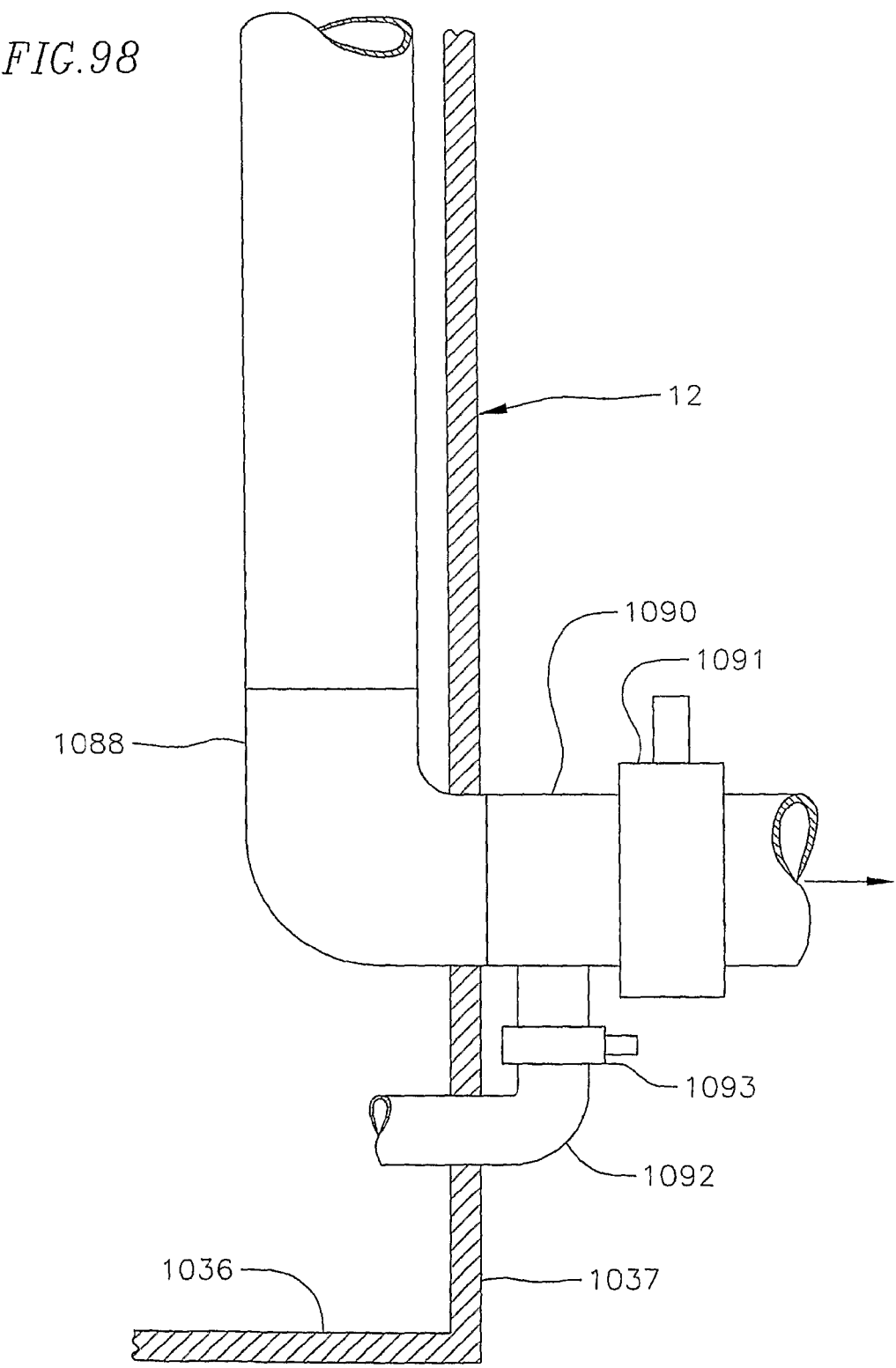
FIG. 98 is an enlarged view taken in the area of the box labeled "Detail D" of FIG. 94.

As shown best in FIG. 97, the upper end of the inlet/outlet 3000 includes an upwardly opening recess 1082 in the opening or orifice 2000 for receiving a screen, check valves, vortex preventers, flow directors, and the like, depending on the use of the equipment.

Figure 94:
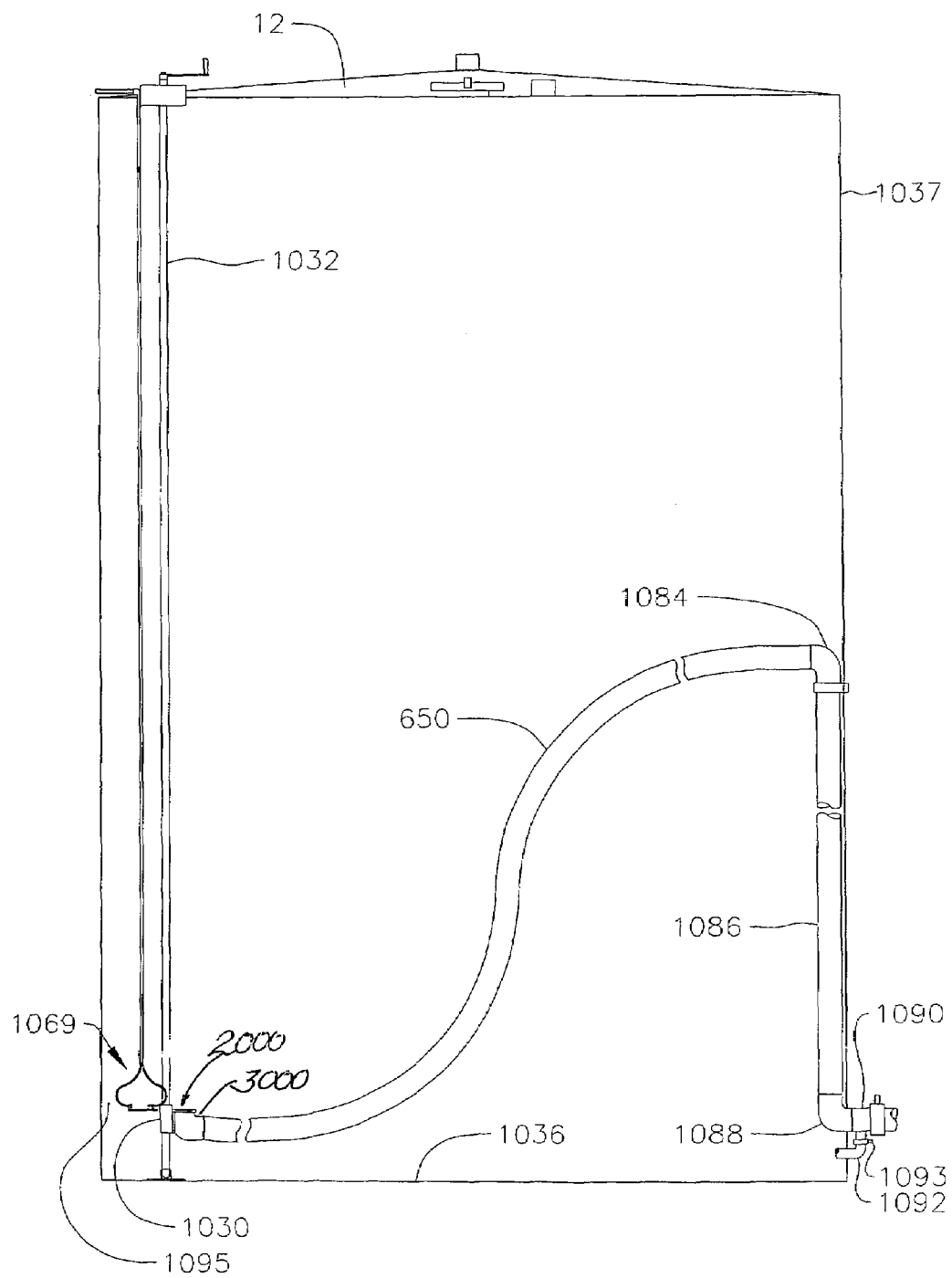
FIG. 94 is a sectional elevation of a sensor and inlet/outlet assembly mounted on an internally threaded drive sleeve on a vertical rotatable screw in the tank.
Figure 95:
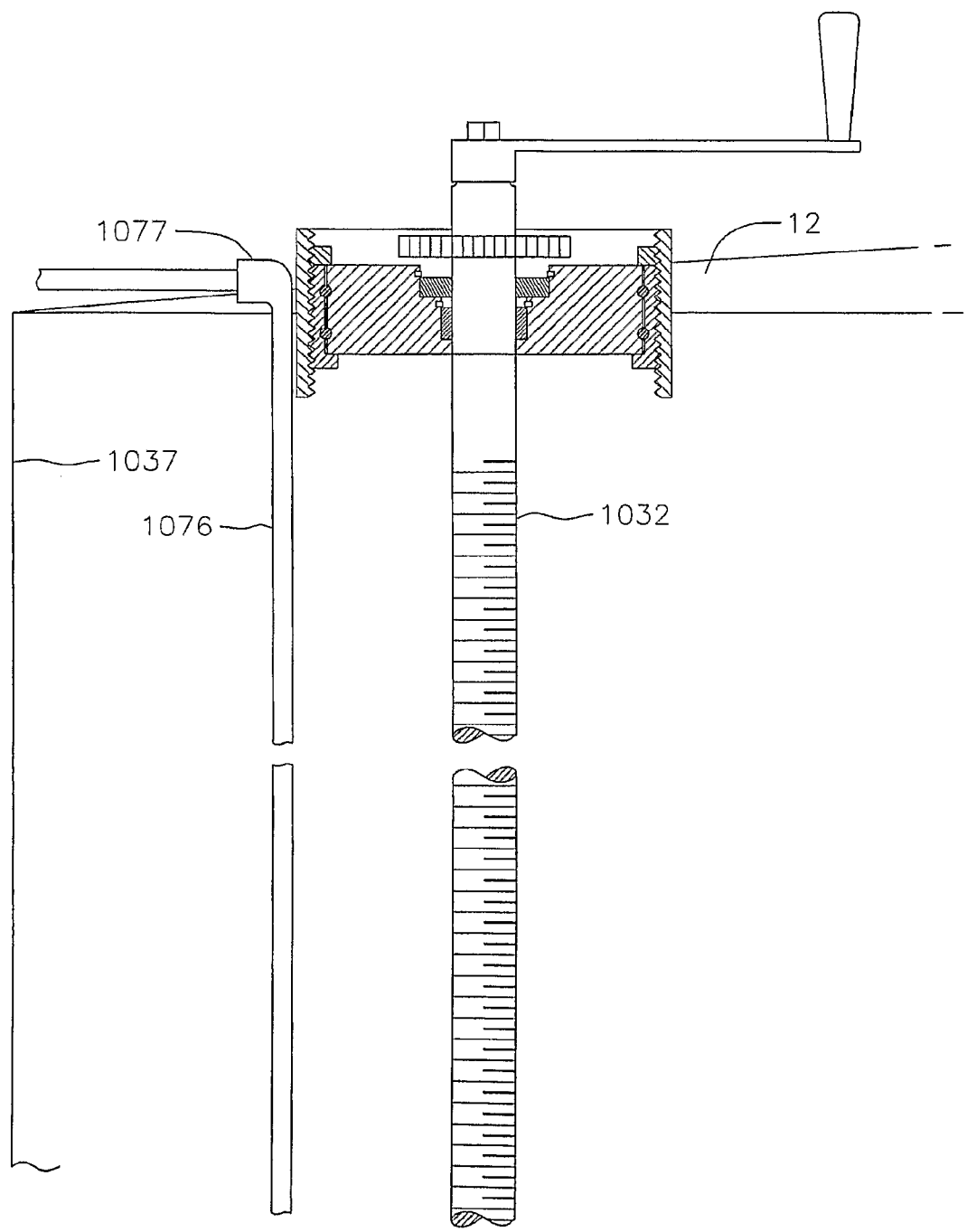
FIG. 95 is an enlarged view taken in the area of the box labeled "Detail A" of FIG. 94.
Figure 96:
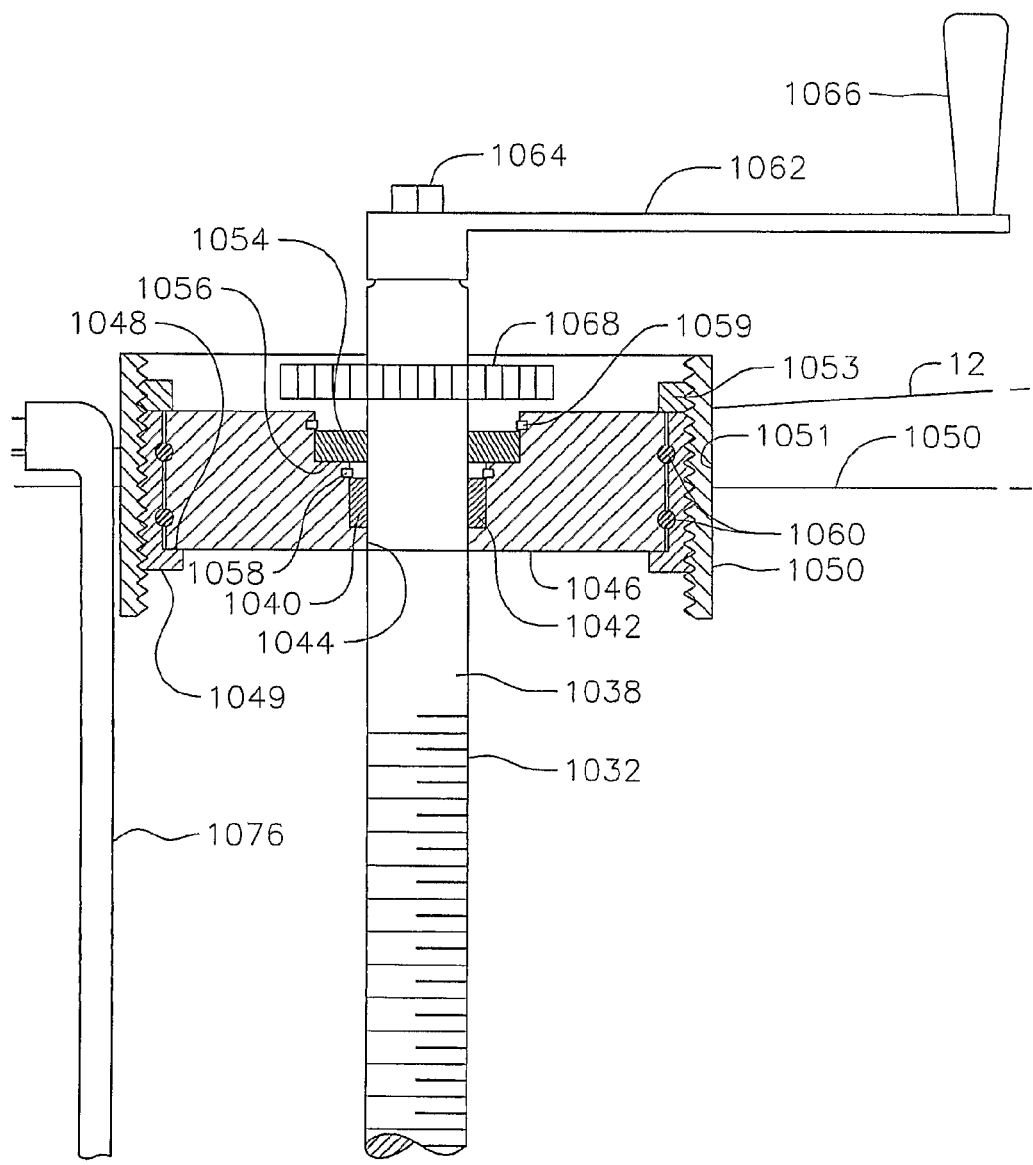
FIG. 96 is an enlarged view taken in the area of the box labeled "Detail B" of FIG. 94.

As shown in FIGS. 94 and 99, the outer end of the flexible hose 650 is connected to an elbow 1084 on the upper end of a vertical riser pipe 1086 secured by a support strap 1087 to the inside of the upright tank wall at a position diametrically opposed to the height-adjusting rod 1032 located near the upright tank wall on the opposite side of the tank. The lower end of the riser pipe is connected to an elbow 1088 (FIG. 9F) sealed through a lower portion of the upright tank wall. The outlet end of elbow 1088 is connected to a loadout pipe 1090. A loadout valve 1091 controls the flow of liquid from or into the tank. A purge line 1092 extends through the side wall of the tank near the bottom 1036 and is connected to the loadout line between the exterior of the tank and the loadout valve. A purge line valve 1093 in the purge line controls the flow of liquid through that line when it is desirable to purge fluid in the hose and riser pipe by dumping that fluid into the tank at the level of the purge line.

In operating the embodiment shown in FIGS. 94-99, the height-adjusting rod is rotated (either by the hand crank, or automatically by remote control through an explosion proof motor (not shown in FIGS. 94-99). If a motor is used, it includes a built-in encoder or separate encoder to send the position of the guide sleeve on the rod to the Programmable Logic Circuit.

As the height-adjusting rod is rotated, the drive sleeve on it moves up or down, depending on the direction of rotation of the rod. When the friction between the drive sleeve and the rod is low, the sleeve does not rotate relative to the rod, and therefore has to move up or down as the rod turns. If there is substantial static (starting) friction between the rod and the drive sleeve, that friction is overcome by resistance offered by the inlet/outlet 3000 and hose 650 connected to the drive sleeve. Under extreme conditions, the sleeve may rotate with the rod, but no more than about 170° before encountering the adjacent portion of the upright wall 1037 of the tank. To this end, the height-adjusting rod is spaced from the adjacent portion of the upright wall of the tank by a distance sufficient to provide a small clearance 1095 (FIGS. 94 and 97) between the sensor 1069 and sensor arm 1070 when the longitudinal axis of the arm coincides with a radius of the tank. Thus, if the drive sleeve does tend to rotate with the initial movement of the rod, the sensor and sensor arm are clear to rotate away from the adjacent portion of the upright wall of the tank. In that event, the rotation of the drive sleeve cannot extend beyond the point where the inlet/outlet 3000 or inlet end of hose 650 contacts the adjacent part of the upright wall of the tank.

As shown in FIGS. 94, the hose has sufficient length for the inlet end of the hose to reach near the bottom of the tank and also near the top of the tank, depending on the position of the guide sleeve on the height-adjusting rod. For example, in a typical tank which has a diameter of about 12 feet and a height of about 20 feet, and with the outer end of the hose connected near the mid-height of the tank as shown in FIG. 94, a hose length of about 16 or 17 feet is adequate for reaching all required levels in the tank for most operations. Of course, the hose can be made longer if required, but should be as short as practical. Moreover, the buoyancy of hose should be as near neutral as possible. For example, in separating oil and water, the specific gravity of the hose material should be between that of the oil and the water to minimize torque on the drive sleeve when the sleeve is in the extreme up or down position in the tank. To minimize the effect of torque on the sleeve, the inlet/outlet 3000 is attached to the drive sleeve by a pivot connection (not shown) which permits the inlet/outlet to pivot relative to the drive sleeve about a substantially horizontal axis.

As previously described with respect to the other embodiments of the invention, information can be sent to and from the apparatus shown in FIGS. 94-99 to provide for automatic removal or introduction of liquids from or to the tank at different levels, and by remote control.

The use of the Liquid Management Apparatus gives plant operators several cost-effective process options not available with standard prior art fixed height outlets. The above scenarios are strictly exemplary and not intended to be inclusive of all liquid management processes possible with the apparatus.

I claim:

1. Apparatus for managing stratified liquids comprising:
   a) a tank for holding layers of the liquids stratified because of differing densities;
   b) an inlet/outlet orifice moveable vertically in the tank;
   c) a flexible hose having an inner end connected to the orifice, and an outer end connected to the tank exterior;
   d) a drive for moving the orifice to different levels within the tank comprising at least one lead screw, the lead screw being rotatable to control the position of the orifice; and
   e) an internally threaded drive sleeve on the screw and connected to the orifice.

2. Apparatus according to claim 1 which includes an upright guide column in the tank, and a guide sleeve disposed to slide up and down the guide column, the guide sleeve being secured to the drive sleeve.

3. Apparatus according to claim 2 in which the guide sleeve is restricted from rotating relative to the guide.

4. Apparatus in accordance with claim 1 further comprising a control exterior of the tank for operating the drive to adjust the position of the orifice in a layer in the tank.

5. Apparatus in accordance with claim 1 wherein the orifice at the inner end of the flexible hose is above the outer end of the hose during operation of the apparatus.

6. Apparatus for managing liquids in accordance with claim 1 wherein the liquids are from a gas well which have stratified in the storage tank.

7. Apparatus for managing liquids from a gas well according to claim 6 wherein the orifice at the inner end of the flexible hose is above the outer end of the hose during operation of the apparatus.

* * * * *